US009894387B2

(12) United States Patent
Sato

(10) Patent No.: US 9,894,387 B2
(45) Date of Patent: *Feb. 13, 2018

(54) IMAGE PROCESSING APPARATUS AND METHOD

(71) Applicant: SONY CORPORATION, Tokyo (JP)

(72) Inventor: Kazushi Sato, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/988,418

(22) Filed: Jan. 5, 2016

(65) Prior Publication Data

US 2016/0134898 A1 May 12, 2016

Related U.S. Application Data

(63) Continuation of application No. 13/978,492, filed as application No. PCT/JP2012/050016 on Jan. 4, 2012, now Pat. No. 9,270,987.

(30) Foreign Application Priority Data

Jan. 11, 2011 (JP) .................. 2011-003245

(51) Int. Cl.
H04N 19/82 (2014.01)
G06T 9/00 (2006.01)
(Continued)

(52) U.S. Cl.
CPC ............ H04N 19/82 (2014.11); G06T 9/007 (2013.01); H04N 19/117 (2014.11);
(Continued)

(58) Field of Classification Search
CPC combination set(s) only.
See application file for complete search history.

(56) References Cited

U.S. PATENT DOCUMENTS 5,335,116 A  8/1994  Onishi et al.
5,485,283 A  1/1996  Kaneko
(Continued)

FOREIGN PATENT DOCUMENTS

CN  101031086 A  9/2007
JP  2004-135251  4/2004
(Continued)

OTHER PUBLICATIONS

Oct. 8, 2015, Chinese Office Action for related CN application No. 201280004667.8.
(Continued)

Primary Examiner — Tsung-Yin Tsai
(74) Attorney, Agent, or Firm — Paratus Law Group, PLLC

(57) ABSTRACT

The present technology relates to an image processing apparatus and method that are capable of enhancing encoding efficiency while suppressing a decrease in the efficiency of encoding processing. The image processing apparatus includes an encoding mode setter that sets, in units of coding units having a hierarchical structure, whether a non-compression mode is to be selected as an encoding mode for encoding image data, the non-compression mode being an encoding mode in which the image data is output as encoded data, and an encoder that encodes the image data in units of the coding units in accordance with a mode set by the encoding mode setter. The present disclosure can be applied to, for example, an image processing apparatus.

6 Claims, 24 Drawing Sheets

(51) Int. Cl.

| | | |
|---|---|---|
| *H04N 19/176* | (2014.01) | |
| *H04N 19/70* | (2014.01) | |
| *H04N 19/46* | (2014.01) | |
| *H04N 19/30* | (2014.01) | |
| *H04N 19/117* | (2014.01) | |
| *H04N 19/12* | (2014.01) | |
| *H04N 19/132* | (2014.01) | |
| *H04N 19/152* | (2014.01) | |
| *H04N 19/157* | (2014.01) | |
| *H04N 19/184* | (2014.01) | |
| *H04N 19/85* | (2014.01) | |
| *H04N 19/124* | (2014.01) | |
| *H04N 19/44* | (2014.01) | |

(52) U.S. Cl.
CPC .......... *H04N 19/12* (2014.11); *H04N 19/124* (2014.11); *H04N 19/132* (2014.11); *H04N 19/152* (2014.11); *H04N 19/157* (2014.11); *H04N 19/176* (2014.11); *H04N 19/184* (2014.11); *H04N 19/30* (2014.11); *H04N 19/44* (2014.11); *H04N 19/46* (2014.11); *H04N 19/70* (2014.11); *H04N 19/85* (2014.11)

(56) References Cited

U.S. PATENT DOCUMENTS

| | | | | |
|---|---|---|---|---|
| 5,661,576 | A | 8/1997 | Kaneko | |
| 6,671,413 | B1 * | 12/2003 | Pearlman | G06T 9/00 |
| | | | | 382/240 |
| 6,965,700 | B2 | 11/2005 | Pearlman et al. | |
| 7,936,931 | B2 | 5/2011 | Mizuno | |
| 8,503,809 | B2 | 8/2013 | Fukuhara et al. | |
| 8,768,077 | B2 * | 7/2014 | Sato | H04N 19/115 |
| | | | | 382/232 |
| 2001/0043731 | A1 | 11/2001 | Ito et al. | |
| 2004/0175048 | A1 | 9/2004 | Pearlman et al. | |
| 2005/0249289 | A1 | 11/2005 | Yagasaki et al. | |
| 2007/0133892 | A1 | 6/2007 | Chiba et al. | |
| 2007/0223585 | A1 | 9/2007 | Fujisawa et al. | |
| 2007/0230572 | A1 | 10/2007 | Koto et al. | |
| 2007/0237412 | A1 * | 10/2007 | Mizuno | H04N 13/0454 |
| | | | | 382/240 |
| 2007/0280353 | A1 | 12/2007 | Arakawa et al. | |
| 2009/0016626 | A1 | 1/2009 | Zhang et al. | |
| 2009/0103530 | A1 * | 4/2009 | Fartmann | H04L 47/15 |
| | | | | 370/389 |
| 2009/0154560 | A1 | 6/2009 | Hong et al. | |
| 2009/0175548 | A1 * | 7/2009 | Fukuhara | H04N 19/63 |
| | | | | 382/233 |
| 2009/0274209 | A1 | 11/2009 | Garg et al. | |
| 2009/0316788 | A1 * | 12/2009 | Techernatinsky | H04N 19/105 |
| | | | | 375/240.16 |
| 2010/0086029 | A1 | 4/2010 | Chen et al. | |
| 2013/0089265 | A1 * | 4/2013 | Yie | G06T 9/004 |
| | | | | 382/238 |
| 2013/0223518 | A1 * | 8/2013 | Shibahara | H04N 19/70 |
| | | | | 375/240.03 |

FOREIGN PATENT DOCUMENTS

| | | |
|---|---|---|
| JP | 3992303 | 10/2007 |
| JP | 4240283 | 3/2009 |
| WO | WO2004/034330 A1 | 4/2004 |
| WO | WO2009/011279 A1 | 1/2009 |
| WO | WO 2009/031648 A1 | 3/2009 |
| WO | WO2010/002214 A2 | 1/2010 |
| WO | WO2012/008130 | 1/2012 |
| WO | WO2012/070232 | 5/2012 |

OTHER PUBLICATIONS

Oct. 28, 2015, Singaporean Office Action for related SG application No. 2014014526.
Jul. 23, 2015, JP communication issued for related JP application No. 2011-003245.
Thomas Wiegand, Editor's Proposed Draft Text Modifications for Joint Video Specification (ITU-T Rec. H.264 ISO/IEC 14496-10 AVC), Geneva modifications draft 37, Joint Video Team (JVT) of ISO/IEC MPEG and ITU-T VCEG, Oct. 9-17, 2002, pp. i-122, 5$^{th}$ Meeting: Geneva, CH.
Ken McCann, et al., Samsung's Response to the Call for Proposals on Video Compression Technology, Joint Collaborative Team on Video Coding (JCT-VC) of ITU-T SG16 WP3 and ISO/IEC JTC1/SC29/WG11, Apr. 15-23, 2010, 1$^{st}$ Meeting: Dresden, DE.
Jul. 23, 2015, JP communication issued for related JP application No. 2014-002802.
Jun. 25, 2015, EP communication issued for related EP application No. 12733885.3.
Apr. 16, 2015, EP communication issued for related EP application No. 12733885.3.
Anthony Joch, et al., UB Video comments on the draft text (JVT-E146d37), Joint Video Team (JVT) of ISO/IEC MPEG & ITU-T VCEG (ISO/IEC JTC1/SC29/WG11 and ITU-T SG16 Q.6), Dec. 5-13, 2002, pp. 1-5, 6$^{th}$ Meeting: Awaji, Island, JP.
Takeshi Chujoh, et al., Internal bit depth increase for coding efficiency, ITU—Telecommunications Standardization Sector, Study Group 16 Question 6, Video Coding Experts Group (VCEG), Jan. 15-16, 2007, pp. 1-6, 31$^{st}$ Meeting: Marrakech, MA.
H. Hu, et al., Classification-based Hybrid Filters for Image Processing, Eindhoven University of Technology, Philips Research Laboratories Eindhoven, 2006.
Feb. 12, 2015, JP communication issued for related JP application No. 2014-002802.
Feb. 12, 2015, JP communication issued for related JP application No. 2011-003245.
Mar. 9, 2015, SG communication issued for related SG application No. 2013052105.
Sep. 30, 2014, JP communication issued for related JP application No. 2014-002802.
Sep. 30, 2014, JP communication issued for related JP application No. 2011-003245.
Takeshi Chujoh, et al., "Block-based Adaptive Loop Filter", Jul. 16-18, 2008, pp. 1-6, ITU—Telecommunications Sector, Video-Coding Experts Group (VCEG), 35$^{th}$ Meeting: Berlin, Germany.
"Test Model under Consideration", Jul. 21-28, 2010, pp. 1-198, Joint Collaborative Team on Video Coding (JCT-VC) of ITU-T SG16 WP3 and ISO/IEC JTC1/SC29/WG11, 2$^{nd}$ Meeting: Geneva, Switzerland.
Takeshi Chujoh, et al., "Internal bit depth increase except frame memory", Apr. 20-21, 2007, pp. 1-4, ITU—Telecommunications Standardization Sector, Video Coding Experts Group (VCEG), 32$^{nd}$ Meeting: San Jose, USA.
Keiichi Chono, et al., "Pulse code modulation mode for HEVC", Jan. 20-28, 2011, pp. 1-9, Joint Collaborative Team on Video Coding (JCT-VC) of ITU-T SG16 WP3 and ISO/IEC JTC1/SC29/WG11, 4$^{th}$ Meeting: Daegu, Korea.
Gary Sullivan, "Seven Steps Toward a More Robust Codec Design", May 6-10, 2002, pp. 1-7, Joint Video Team (JVT) of ISO/IEC MPEG & ITU-T VCEG (ISO/IEC JTC1/SC29/WG11 and ITU-T SG16 Q.6), 3$^{rd}$ Meeting: Fairfax, Virginia, USA.
Keiichi Chono, et al., "Proposal of enhanced PCM coding in HEVC", Mar. 16-23, 2011, pp. 1-12, Joint Collaborative Team on Video Coding (JCT-VC) of ITU-T SG16 WP3 and ISO/IEC JTC1/SC29/WG11, 5$^{th}$ Meeting: Geneva, Switzerland.
Oct. 28, 2015, Singapore Search Report for related SG Application No. 2014014526.
Chujoh, et al., Internal bit depth increase for coding efficiency, ITU—Telecommunications Standardization Sector Study Group 16 Question 6 Video Coding Experts Group (VCEG), Jan. 15-16, 2007, pp. 1-6, 31$^{st}$ Meeting: Marrakech, MA.
Dec. 20, 2016, JP communication issued for related JP application No. 2015-229616.
Dec. 20, 2016, JP communication issued for related JP application No. 2015-229617.
Nov. 29, 2017, Korean Office Action issued for related KR application No. 10-2013-7017198.

(56) References Cited

OTHER PUBLICATIONS

Dec. 12, 2017, Japanese Office Action Issued for related JP application No. 2017-040115.
Chujoh, et al., Specification and Experimental Results of Quadtree-Based Adaptive Loop Filter, ITU—Telecommunications Standardization Sector STUDY GROUP 16 Question 6 Video Coding Experts Group (VCEG) 37$^{th}$ Meeting, Apr. 15-18, 2009, pp. 1-10, Yokohama, Japan.
Dec. 12, 2017, Japanese Office Action Issued for related JP application No. 2017-040116.

* cited by examiner

| macroblock_layer(){ | C | Descriptor |
|---|---|---|
| mb_type | 2 | ue(v)| ae(v) |
| if(mb_type==I_PCM){ | | |
| while(!byte_aligned()) | | |
| pcm_alignment_zero_bit | 3 | f(l) |
| for(i=0; i<256; i++) | | |
| pcm_sample_luma[i] | 3 | u(v) |
| for(i=0; i<2*MbWidthC*MdHeightC; i++) | | |
| pcm_sample_chroma[i] | 3 | u(v) |

IMAGE PROCESSING APPARATUS AND METHOD

CROSS REFERENCE TO PRIOR APPLICATION

This application is a continuation of U.S. patent application Ser. No. 13/978,492 (filed Aug. 6, 2013), which is a National Stage Patent Application of PCT International Patent Application No. PCT/JP2012/050016 (filed on Jan. 4, 2012) under 35 U.S.C. § 371, which claims priority to Japanese Patent Application No. 2011-003245 (filed on Jan. 11, 2011), which are all hereby incorporated by reference in their entirety.

TECHNICAL FIELD

The present disclosure relates to an image processing apparatus and method, and particularly relates to an image processing apparatus and method that enable enhancement of encoding efficiency while suppressing a decrease in the efficiency of encoding processing.

BACKGROUND ART

In recent years, apparatuses compliant with a compression format such as MPEG (Moving Picture Experts Group), in which image information is digitally handled and is compressed using an orthogonal transform such as the discrete cosine transform and by motion compensation by utilizing a redundancy particular to image information for the purpose of achieving highly efficient transmission and accumulation of information, have been becoming prevalent for use in both distribution of information from broadcast stations and reception of information in general households.

In particular, MPEG-2 (ISO (International Organization for Standardization)/IEC (International Electrotechnical Commission) 13818-2) is defined as a general-purpose image coding format, is a standard that covers both interlaced scanned images and progressive scanned images as well as standard-definition images and high-definition images, and is currently widely used in a broad range of applications for professional use and consumer use. With the MPEG-2 compression format, a high compression rate and a favorable image quality can be realized by, for example, allocating an amount of code (bit rate) of 4 to 8 Mbps to a standard-definition interlaced scanned image having 720×480 pixels or an amount of code (bit rate) of 18 to 22 Mbps to a high-definition interlaced scanned image having 1920×1088 pixels.

MPEG-2 is mainly used for high image quality encoding suitable for broadcasting, but is not compatible with coding formats of an amount of code (bit rate) lower than that of MPEG-1, that is, a higher compression rate. With the widespread use of mobile terminals, the need for such coding formats will increase in the future, and in response the MPEG-4 coding format has been standardized. Regarding an image coding format, MPEG-4 was designated an international standard as ISO/IEC 14496-2 in December 1998.

Furthermore, standardization of the format H.26L (ITU-T (International Telecommunication Union Telecommunication Standardization Sector) Q6/16 VCEG (Video Coding Expert Group)), which was initially for the purpose of image coding for video conferences, has been progressing in recent years. It is known that H.26L realizes higher encoding efficiency than previous coding formats, such as MPEG-2 and MPEG-4, though encoding and decoding according to H.26L involve a larger amount of computation. Also, as part of MPEG-4 activities, standardization for realizing higher encoding efficiency by introducing functions which are not supported by H.26L on the basis of H.26L is currently progressing as Joint Model of Enhanced-Compression Video Coding.

As the standardization schedule, a standard called H.264 and MPEG-4 Part 10 (Advanced Video Coding, hereinafter referred to as AVC) was designated an international standard in March 2003.

Furthermore, as an extension of the above, standardization of FRExt (Fidelity Range Extension), including encoding tools necessary for business use, such as RGB, 4:2:2, and 4:4:4, as well as 8×8 DCT (Discrete Cosine Transform) and quantization matrices defined in MPEG-2, was completed in February 2005. Accordingly, a coding format capable of favorably expressing even film noise included in movies by using AVC has been established, which is used for a wide range of applications such as Blu-Ray Discs.

However, there has recently been a growing need for encoding at a higher compression rate, for example, compression of an image having about 4000×2000 pixels, which is four times the number of pixels included in a high-definition image, or distribution of high-definition images in an environment with a limited transmission capacity, such as the Internet. Therefore, in VCEG (Video Coding Expert Group) under ITU-T, ongoing studies for enhancing encoding efficiency have been performed.

Meanwhile, for the purpose of realizing higher encoding efficiency than that of AVC, standardization of a coding format called HEVC (High Efficiency Video Coding) is currently being conducted by JCTVC (Joint Collaboration Team-Video Coding), which is a standards group of ITU-T and ISO/IEC (see, for example, NPL 1).

In the HEVC coding format, coding units (CUs) are defined as units of processing which are similar to macroblocks used in AVC. Unlike a macroblock used in AVC, the size of a CU is not fixed to 16×16 pixels, and is specified in image compression information in each sequence.

CUs are hierarchically configured from a largest coding unit (LCU) to a smallest coding unit (SCU). That is, it may be generally considered that an LCU corresponds to a macroblock used in AVC, and a CU in a layer lower than the LCU corresponds to a sub-macroblock used in AVC.

Meanwhile, there is a coding format in which an encoding mode for encoding and outputting image data and a non-encoding mode for outputting image data without encoding the image data are provided, whether the encoding mode or the non-encoding mode is to be used is selected in units of macroblocks, and the encoding mode and the non-encoding mode can be used in combination within a single picture (see, for example, PTL 1). Also in the AVC coding format, an I_PCM mode for outputting image data without encoding the image data is supported as mb_type (see, for example, PTL 2). This is used for ensuring real-time operation of arithmetic coding processing in a case where a quantization parameter is set to be a small value, such as QP=0, and in a case where the information amount of encoded data is larger than that of an input image. Also, it is possible to realize lossless coding by using I-PCM.

Also, a method for increasing internal arithmetic has been suggested (see, for example, NPL 2). Accordingly, an internal arithmetic error caused in processing such as an orthogonal transform and motion compensation can be reduced, and encoding efficiency can be enhanced.

Furthermore, a technique in which an FIR filter is provided in a motion compensation loop has been suggested (see, for example, NPL 3). In an encoding apparatus, by obtaining an FIR filter coefficient using a Wiener filter so as to minimize an error with respect to an input image, degradation in a reference image can be minimized, and encoding efficiency of image compression information to be output can be enhanced.

CITATION LIST

Patent Literature

PTL 1: Japanese Patent No. 3992303
PTL 2: Japanese Patent No. 4240283

Non Patent Literature

NPL 1: "Test Model under Consideration", JCTVC-B205, Joint Collaborative Team on Video Coding (JCT-VC) of ITU-T SG16 WP3 and ISO/IEC JTC1/SC29/WG112nd Meeting: Geneva, CH, 21-28 Jul. 2010
NPL 2: Takeshi Chujoh, Reiko Noda, "Internal bit depth increase except frame memory", VCEG-AF07, ITU—Telecommunications Standardization Sector STUDY GROUP 16 Question 6 Video Coding Experts Group (VCEG) 32nd Meeting: San Jose, USA, 20-21 Apr. 2007
NPL 3: Takeshi Chujoh, Goki Yasuda, Naofumi Wada, Takashi Watanabe, Tomoo Yamakage, "Block-based Adaptive Loop Filter", VCEG-AI18, ITU—Telecommunications Standardization Sector STUDY GROUP 16 Question 6 Video Coding Experts Group (VCEG) 35th Meeting: Berlin, Germany, 16-18 Jul. 2008

SUMMARY OF INVENTION

Technical Problem

However, in the case of a coding format in which CUs are defined as in HEVC and various processing operations are performed in units of CUs, it is considered that a macroblock used in AVC corresponds to an LCU, but if I_PCM can be set only in units of LCUs, unnecessary encoding processing increases because the unit of processing is 128×128 pixels at maximum, and the efficiency of encoding processing may decrease. For example, it may become difficult to ensure real-time operation of CABAC.

Also, the coding formats suggested in NPL 2 and NPL 3 are not included in the AVC coding format, and compatibility with the I_PCM mode is not disclosed therein.

The present disclosure has been made in view of these circumstances, and is directed to enhancing encoding efficiency while suppressing a decrease in the efficiency of encoding processing.

Solution to Problem

According to an aspect of the present disclosure, there is provided an image processing apparatus. The image processing apparatus includes an encoding mode setter that sets, in units of coding units having a hierarchical structure, whether a non-compression mode is to be selected as an encoding mode for encoding image data, the non-compression mode being an encoding mode in which the image data is output as encoded data; and an encoder that encodes the image data in units of the coding units in accordance with a mode set by the encoding mode setter.

The image processing apparatus may further include a shift processing controller that performs control, on a coding unit for which the non-compression mode has been set by the encoding mode setter, to skip shift processing in which a bit precision for encoding or decoding is increased; and a shift processor that performs the shift processing on a coding unit of the image data, the coding unit being controlled by the shift processing controller so as to undergo the shift processing.

The image processing apparatus may further include a filter processing controller that performs control, on a coding unit for which the non-compression mode has been set by the encoding mode setter, to skip filter processing in which filtering is performed on a locally decoded image; a filter coefficient calculator that calculates a filter coefficient for the filter processing by using image data corresponding to a coding unit which is controlled by the filter processing controller so as to undergo the filter processing; and a filter processor that performs the filter processing in units of blocks, which are units of the filter processing, by using the filter coefficient calculated by the filter coefficient calculator.

The filter processor may perform the filter processing on only pixels which are controlled by the filter processing controller so as to undergo the filter processing, the pixels being included in a current block which is a target to be processed.

The image processing apparatus may further include a filter identification information generator that generates filter identification information in units of the blocks, the filter identification information being identification information indicating whether the filter processing is to be performed.

The filter processor may perform adaptive loop filtering on the locally decoded image, the adaptive loop filtering being adaptive filter processing using classification processing.

In a case where an amount of code of encoded data, which is obtained by encoding the image data corresponding to a current coding unit as a target of encoding processing, is smaller than or equal to an amount of input data, which is a data amount of the image data corresponding to the current coding unit, the encoding mode setter may set an encoding mode of the current coding unit to be the non-compression mode.

The image processing apparatus may further include an input data amount calculator that calculates the amount of input data. The encoding mode setter may compare, regarding the current coding unit, the amount of input data calculated by the input data amount calculator with the amount of code.

The image processing apparatus may further include an identification information generator that generates identification information in units of the coding units, the identification information indicating whether the non-compression mode has been set by the encoding mode setter.

According to an aspect of the present disclosure, there is provided an image processing method for an image processing apparatus. The image processing method includes setting, with an encoding mode setter, in units of coding units having a hierarchical structure, whether a non-compression mode is to be selected as an encoding mode for encoding image data, the non-compression mode being an encoding mode in which the image data is output as encoded data; and encoding, with an encoder, the image data in units of the coding units in accordance with a set mode.

According to another aspect of the present disclosure, there is provided an image processing apparatus. The image processing apparatus includes an encoding mode determiner that determines, in units of coding units having a hierarchical structure, whether a non-compression mode has been selected as an encoding mode for encoding image data, the non-compression mode being an encoding mode in which the image data is output as encoded data; and a decoder that decodes the encoding result in units of the coding units in accordance with a mode determined by the encoding mode determiner.

The image processing apparatus may further include a shift processing controller that performs control, on a coding unit for which the encoding mode determiner has determined that the non-compression mode has been selected, to skip shift processing in which a bit precision for encoding or decoding is increased; and a shift processor that performs the shift processing on a coding unit of the image data, the coding unit being controlled by the shift processing controller so as to undergo the shift processing.

The image processing apparatus may further include a filter processing controller that performs control, on a coding unit for which the encoding mode determiner has determined that the non-compression mode has been selected, to skip filter processing in which filtering is performed on a locally decoded image; and a filter processor that performs the filter processing on the image data in units of blocks, which are units of the filter processing. The filter processor may perform the filter processing on only pixels which have been controlled by the filter processing controller so as to undergo the filter processing, the pixels being included in a current block which is a target to be processed.

The filter processor may perform adaptive loop filtering on the locally decoded image, the adaptive loop filtering being adaptive filter processing using classification processing.

The filter processor may perform the filter processing, in a case where filter identification information indicating whether the filter processing has been performed indicates that the filter processing has been performed on image data corresponding to the current block which is a target to be processed, only when control is performed by the filter processing controller so as to perform the filter processing on all pixels included in the current block.

The encoding mode determiner may determine whether the non-compression mode has been selected, on the basis of identification information indicating whether the non-compression mode has been selected in units of the coding units.

According to another aspect of the present disclosure, there is provided an image processing method for an image processing apparatus. The image processing method includes determining, with an encoding mode determiner, in units of coding units having a hierarchical structure, whether a non-compression mode has been selected as an encoding mode for encoding image data, the non-compression mode being an encoding mode in which the image data is output as encoded data; and decoding, with a decoder, the encoded data in units of the coding units in accordance with a determined mode.

According to an aspect of the present disclosure, whether a non-compression mode is to be selected as an encoding mode for encoding image data is set in units of coding units having a hierarchical structure, the non-compression mode being an encoding mode in which the image data is output as encoded data, and the image data is encoded in units of the coding units in accordance with a set mode.

According to another aspect of the present disclosure, whether a non-compression mode has been selected as an encoding mode for encoding image data is determined in units of coding units having a hierarchical structure, the non-compression mode being an encoding mode in which the image data is output as encoded data, and the encoded data is decoded in units of the coding units in accordance with a determined mode.

Advantageous Effects of Invention

According to the present disclosure, an image can be processed. In particular, encoding efficiency can be enhanced while suppressing a decrease in the efficiency of encoding processing.

DESCRIPTION OF EMBODIMENTS

Hereinafter, embodiments for carrying out the present technology (hereinafter referred to as embodiments) will be described. Note that the description will be given in the following order.

1. First embodiment (image encoding apparatus)
2. Second embodiment (image decoding apparatus)
3. Third embodiment (personal computer)
4. Fourth embodiment (television receiver)
5. Fifth embodiment (mobile phone)
6. Sixth embodiment (hard disk recorder)
7. Seventh embodiment (camera)

1. First Embodiment

[Image Encoding Apparatus Compatible with AVC Coding Format]

Figure 1:
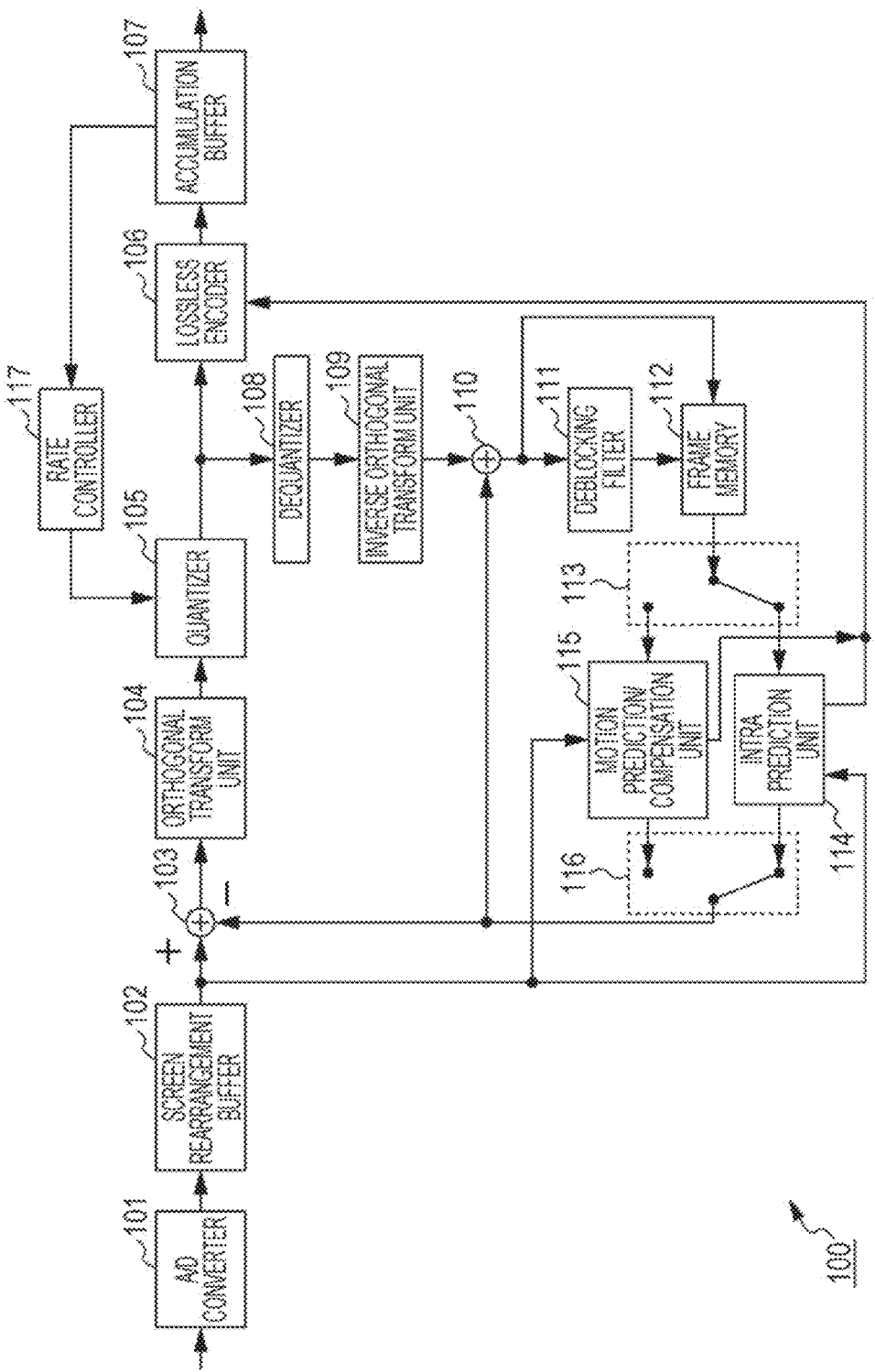
FIG. 1 is a block diagram illustrating an image encoding apparatus that outputs image compression information based on an AVC coding format.

FIG. 1 illustrates the configuration of an image encoding apparatus according to an embodiment, which encodes an image using an H.264 and MPEG (Moving Picture Experts Group) 4 Part 10 (AVC (Advanced Video Coding)) coding format.

An image encoding apparatus 100 illustrated in FIG. 1 is an apparatus that encodes an image using a coding format based on the AVC standard and outputs the encoded image. As illustrated in FIG. 1, the image encoding apparatus 100 includes an A/D converter 101, a screen rearrangement buffer 102, a computing unit 103, an orthogonal transform unit 104, a quantizer 105, a lossless encoder 106, and an accumulation buffer 107. Also, the image encoding apparatus 100 includes a dequantizer 108, an inverse orthogonal transform unit 109, a computing unit 110, a deblocking filter 111, a frame memory 112, a selector 113, an intra prediction unit 114, a motion prediction/compensation unit 115, a selector 116, and a rate controller 117.

The A/D converter 101 A/D-converts image data input thereto, and outputs the image data to the screen rearrangement buffer 102 to store the image data therein. The screen rearrangement buffer 102 rearranges, in accordance with a GOP (Group of Picture) structure, frame images stored therein which are arranged in a display order so that the frame images are rearranged in an encoding order. The screen rearrangement buffer 102 supplies the rearranged frame images to the computing unit 103. Also, the screen rearrangement buffer 102 supplies the rearranged frame images to the intra prediction unit 114 and the motion prediction/compensation unit 115.

The computing unit 103 subtracts, from an image read out from the screen rearrangement buffer 102, a prediction image supplied from the intra prediction unit 114 or the motion prediction/compensation unit 115 via the selector 116, and outputs difference information thereof to the orthogonal transform unit 104.

For example, in the case of an image on which intra coding is to be performed, the computing unit 103 subtracts a prediction image supplied from the intra prediction unit 114 from an image read out from the screen rearrangement buffer 102. Also, for example, in the case of an image on which inter coding is to be performed, the computing unit 103 subtracts a prediction image supplied from the motion prediction/compensation unit 115 from an image read out from the screen rearrangement buffer 102.

The orthogonal transform unit 104 performs an orthogonal transform, such as the discrete cosine transform or Karhunen-Loeve transform, on the difference information supplied from the computing unit 103, and supplies a transform coefficient thereof to the quantizer 105.

The quantizer 105 quantizes the transform coefficient output from the orthogonal transform unit 104. The quantizer 105 performs quantization by setting a quantization parameter on the basis of information about a target value of an amount of code supplied from the rate controller 117. The quantizer 105 supplies the quantized transform coefficient to the lossless encoder 106.

The lossless encoder 106 performs lossless coding, such as variable-length coding or arithmetic coding, on the quantized transform coefficient. Coefficient data has been quantized under control performed by the rate controller 117, and thus the amount of code thereof is equal to (or approximate to) a target value set by the rate controller 117.

The lossless encoder 106 obtains information indicating intra prediction and so forth from the intra prediction unit 114, and obtains information indicating an inter prediction mode, motion vector information, and so forth from the motion prediction/compensation unit 115. Note that information indicating intra prediction (intra-screen prediction) will also be referred to as intra prediction mode information hereinafter. Also, information indicating an information mode indicating inter prediction (inter-screen prediction) will also be referred to as inter prediction mode information.

The lossless encoder 106 encodes the quantized transform coefficient, and also causes various pieces of information, such as a filter coefficient, intra prediction mode information, inter prediction mode information, and a quantization parameter, to be part of header information of encoded data (multiplexes the various pieces of information). The lossless encoder 106 supplies encoded data which has been obtained through encoding to the accumulation buffer 107 to store the encoded data therein.

For example, in the lossless encoder 106, lossless coding processing such as variable-length coding or arithmetic coding is performed. An example of variable-length coding includes CAVLC (Context-Adaptive Variable Length Coding) defined in the H.264/AVC format. An example of arithmetic coding includes CABAC (Context-Adaptive Binary Arithmetic Coding).

The accumulation buffer 107 temporarily holds the encoded data supplied from the lossless encoder 106, and outputs the encoded data to, for example, a recording device or a transmission channel in the subsequent stage (not illustrated) at a certain timing, as an encoded image which has been encoded using the H.264/AVC format.

In addition, the transform coefficient quantized by the quantizer 105 is also supplied to the dequantizer 108. The dequantizer 108 dequantizes the quantized transform coefficient using a method corresponding to the quantization performed by the quantizer 105. The dequantizer 108 supplies the transform coefficient obtained thereby to the inverse orthogonal transform unit 109.

The inverse orthogonal transform unit 109 performs inverse orthogonal transform on the transform coefficient supplied thereto using a method corresponding to the orthogonal transform processing performed by the orthogonal transform unit 104. The output obtained through the inverse orthogonal transform (recovered difference information) is supplied to the computing unit 110.

The computing unit 110 adds a prediction image supplied from the intra prediction unit 114 or the motion prediction/compensation unit 115 via the selector 116 to the result of inverse orthogonal transform supplied from the inverse orthogonal transform unit 109, that is, recovered difference information, and obtains a locally decoded image (decoded image).

For example, in a case where the difference information corresponds to an image on which intra coding is to be performed, the computing unit 110 adds a prediction image supplied from the intra prediction unit 114 to the difference information. Also, for example, in a case where the difference information corresponds to an image on which inter coding is to be performed, the computing unit 110 adds a prediction image supplied from the motion prediction/compensation unit 115 to the difference information.

The result of addition is supplied to the deblocking filter 111 or the frame memory 112.

The deblocking filter 111 performs deblocking filter processing as appropriate, thereby removing a block distortion of a decoded image. The deblocking filter 111 supplies the result of filter processing to the frame memory 112. Note that the decoded image output from the computing unit 110 can be supplied to the frame memory 112 without via the deblocking filter 111. That is, deblocking filter processing by the deblocking filter 111 can be skipped.

The frame memory 112 stores the decoded image supplied thereto, and outputs the stored decoded image as a reference image to the intra prediction unit 114 or the motion prediction/compensation unit 115 via the selector 113 at a certain timing.

For example, in the case of an image on which intra coding is to be performed, the frame memory 112 supplies a reference image to the intra prediction unit 114 via the selector 113. Also, for example, in a case where inter coding is to be performed, the frame memory 112 supplies a reference image to the motion prediction/compensation unit 115 via the selector 113.

In a case where the reference image supplied from the frame memory 112 is an image on which intra coding is to be performed, the selector 113 supplies the reference image to the intra prediction unit 114. On the other hand, in a case where the reference image supplied from the frame memory 112 is an image on which inter coding is to be performed, the selector 113 supplies the reference image to the motion prediction/compensation unit 115.

The intra prediction unit 114 performs intra prediction (intra-screen prediction) in which a prediction image is generated using pixel values of a target picture to be processed supplied from the frame memory 112 via the selector 113. The intra prediction unit 114 performs intra prediction using a plurality of prepared modes (intra prediction modes).

In the H.264 image information coding format, an intra 4×4 prediction mode, an intra 8×8 prediction mode, and an intra 16×16 prediction mode are defined for luminance signals. Also, regarding color-difference signals, a prediction mode independent of that for luminance signals can be defined for individual macroblocks. Regarding the intra 4×4 prediction mode, one intra prediction mode is defined for each 4×4 luminance block. Regarding the intra 8×8 prediction mode, one intra prediction mode is defined for each 8×8 luminance block. Regarding the intra 16×16 prediction mode and color-difference signals, one prediction mode is defined for one macroblock.

The intra prediction unit 114 generates prediction images using all candidate intra prediction modes, evaluates the cost function values of the individual prediction images using an input image supplied the screen rearrangement buffer 102, and selects an optimal mode. After selecting an optimal intra prediction mode, the intra prediction unit 114 supplies the prediction image which has been generated using the optimal mode to the computing unit 103 and the computing unit 110 via the selector 116.

Also, as described above, the intra prediction unit 114 supplies information, such as intra prediction mode information indicating the adopted intra prediction mode, to the lossless encoder 106 as appropriate.

The motion prediction/compensation unit 115 performs motion prediction (inter prediction) on an image on which inter coding is to be performed, using an input image supplied from the screen rearrangement buffer 102 and a reference image supplied from the frame memory 112 via the selector 113, performs motion compensation processing in accordance with a detected motion vector, and generates a prediction image (inter prediction image information). The motion prediction/compensation unit 115 performs such inter prediction using a plurality of prepared modes (inter prediction modes).

The motion prediction/compensation unit 115 generates prediction images using all candidate inter prediction modes, evaluates the cost function values of the individual prediction images, and selects an optimal mode. The motion prediction/compensation unit 115 supplies the generated prediction image to the computing unit 103 and the computing unit 110 via the selector 116.

Also, the motion prediction/compensation unit 115 supplies inter prediction mode information indicating the adopted inter prediction mode and motion vector information indicating a calculated motion vector to the lossless encoder 106.

In the case of an image on which intra coding is to be performed, the selector 116 supplies the output of the intra prediction unit 114 to the computing unit 103 and the computing unit 110. In the case of an image on which inter coding is to be performed, the selector 116 supplies the output of the motion prediction/compensation unit 115 to the computing unit 103 and the computing unit 110.

The rate controller 117 controls the rate of the quantization operation performed by the quantizer 105 on the basis of the compressed images accumulated in the accumulation buffer 107 so that overflow or underflow does not occur.

[Image Decoding Apparatus Compatible with AVC Coding Format]

Figure 2:
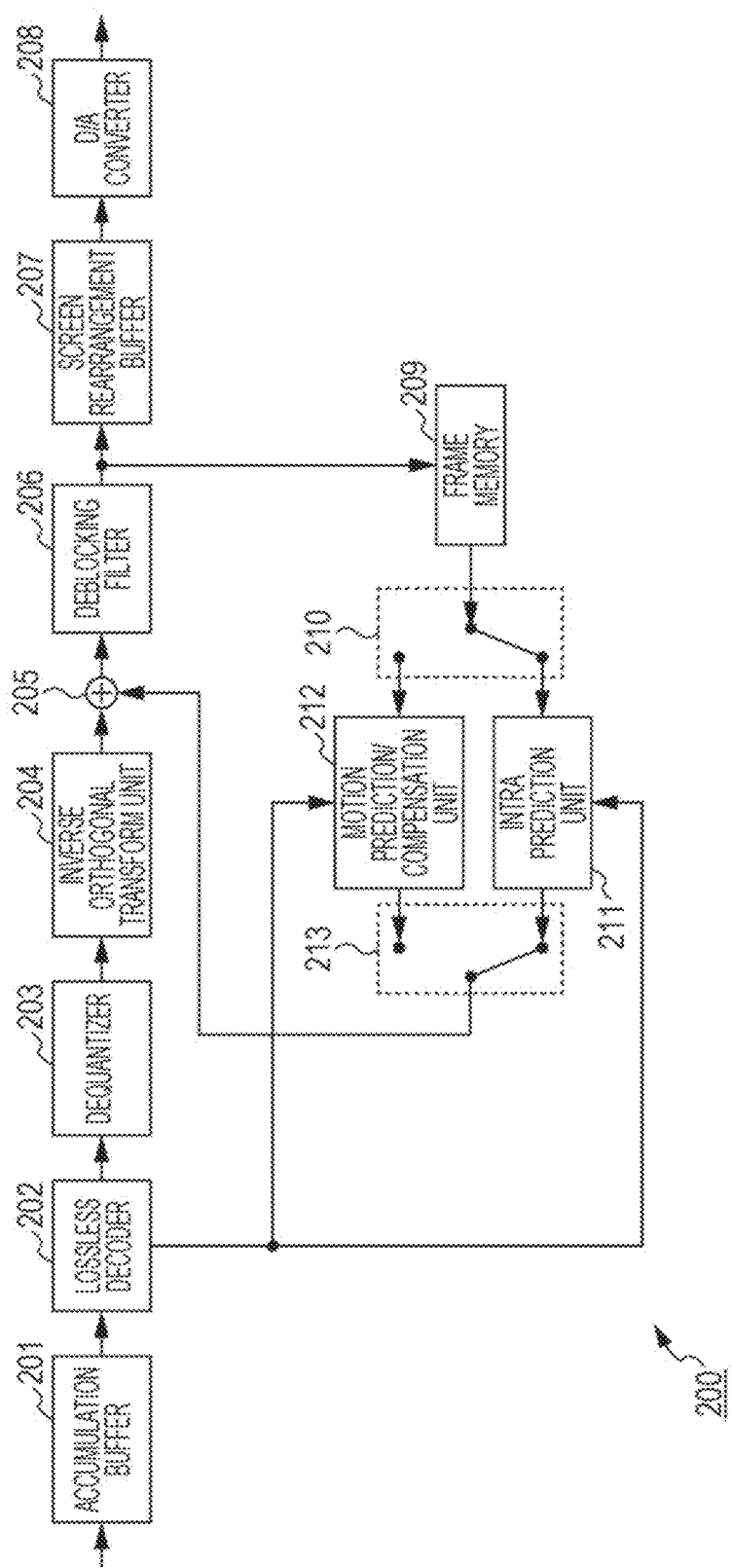
FIG. 2 is a block diagram illustrating an image decoding apparatus that receives image compression information based on the AVC coding format.

FIG. 2 is a block diagram illustrating a main example configuration of an image decoding apparatus that realizes image compression using an orthogonal transform, such as the discrete cosine transform or Karhunen-Loeve transform, and by motion compensation. The image decoding apparatus 200 illustrated in FIG. 2 is a decoding apparatus corresponding to the image encoding apparatus 100 illustrated in FIG. 1.

Encoded data which has been encoded by the image encoding apparatus 100 is supplied to the image decoding apparatus 200 corresponding to the image encoding apparatus 100 via an arbitrary path, for example, a transmission channel, a recording medium, or the like, and is decoded.

As illustrated in FIG. 2, the image decoding apparatus 200 includes an accumulation buffer 201, a lossless decoder 202, a dequantizer 203, an inverse orthogonal transform unit 204, a computing unit 205, a deblocking filter 206, a screen rearrangement buffer 207, and a D/A converter 208. Also, the image decoding apparatus 200 includes a frame memory 209, a selector 210, an intra prediction unit 211, a motion prediction/compensation unit 212, and a selector 213.

The accumulation buffer 201 accumulates encoded data transmitted thereto. The encoded data has been encoded by the image encoding apparatus 100. The lossless decoder 202 decodes encoded data read out from the accumulation buffer 201 at a certain timing, using a format corresponding to the coding format used by the lossless encoder 106 illustrated in FIG. 1.

Also, in a case where a target frame has been intra coded, intra prediction mode information is stored in the header portion of the encoded data. The lossless decoder 202 also decodes the intra prediction mode information, and supplies the information to the intra prediction unit 211. In contrast, in a case where a target frame has been inter coded, motion vector information is stored in the header portion of the encoded data. The lossless decoder 202 also decodes the motion vector information, and supplies the information to the motion prediction/compensation unit 212.

The dequantizer 203 dequantizes coefficient data (quantized coefficient) which is obtained through decoding performed by the lossless decoder 202, using a method corresponding to the quantization method used by the quantizer 105 illustrated in FIG. 1. That is, the dequantizer 203 dequantizes the quantized coefficient using a method similar to that used by the dequantizer 108 illustrated in FIG. 1.

The dequantizer 203 supplies the dequantized coefficient data, that is, an orthogonal transform coefficient, to the inverse orthogonal transform unit 204. The inverse orthogonal transform unit 204 performs inverse orthogonal transform on the orthogonal transform coefficient using a method corresponding to the orthogonal transform method used by the orthogonal transform unit 104 illustrated in FIG. 1 (a method similar to the method used by the inverse orthogonal transform unit 109 illustrated in FIG. 1), and obtains decoded residual data corresponding to residual data before orthogonal transform is performed by the image encoding apparatus 100. For example, fourth-order inverse orthogonal transform is performed.

The decoded residual data obtained through inverse orthogonal transform is supplied to the computing unit 205. Also, the computing unit 205 is supplied with a prediction image from the intra prediction unit 211 or the motion prediction/compensation unit 212 via the selector 213.

The computing unit 205 adds the decoded residual data and the prediction image, thereby obtaining decoded image data corresponding to the image data from which the prediction image has not been subtracted by the computing unit 103 of the image encoding apparatus 100. The computing unit 205 supplies the decoded image data to the deblocking filter 206.

The deblocking filter 206 removes a block distortion of the decoded image supplied thereto, and supplies the decoded image to the screen rearrangement buffer 207.

The screen rearrangement buffer 207 rearranges images. That is, the frames which have been rearranged in an encoding order by the screen rearrangement buffer 102 illustrated in FIG. 1 are rearranged in the original display order. The D/A converter 208 D/A-converts the image supplied from the screen rearrangement buffer 207, and outputs the image to a display (not illustrates) to display the image thereon.

The output of the deblocking filter 206 is also supplied to the frame memory 209.

The frame memory 209, the selector 210, the intra prediction unit 211, the motion prediction/compensation unit 212, and the selector 213 respectively correspond to the frame memory 112, the selector 113, the intra prediction unit 114, the motion prediction/compensation unit 115, and the selector 116 of the image encoding apparatus 100.

The selector 210 reads out an image on which inter processing is to be performed and a reference image from the frame memory 209, and supplies the images to the motion prediction/compensation unit 212. Also, the selector 210 reads out an image to be used for intra prediction from the frame memory 209, and supplies the image to the intra prediction unit 211.

The intra prediction unit 211 is supplied with, for example, information indicating an intra prediction mode which has been obtained by decoding header information from the lossless decoder 202 as appropriate. The intra prediction unit 211 generates a prediction image from the reference image obtained from the frame memory 209 on the basis of the information, and supplies the generated prediction image to the selector 213.

The motion prediction/compensation unit 212 obtains information which has been obtained by decoding the header information (prediction mode information, motion vector information, reference frame information, flag, various parameters, etc.) from the lossless decoder 202.

The motion prediction/compensation unit 212 generates a prediction image from the reference image obtained from the frame memory 209 on the basis of the information supplied from the lossless decoder 202, and supplies the generated prediction image to the selector 213.

The selector 213 selects the prediction image which has been generated by the motion prediction/compensation unit 212 or the intra prediction unit 211, and supplies the image to the computing unit 205.

[Macroblock Type]

Figures 3, 4:
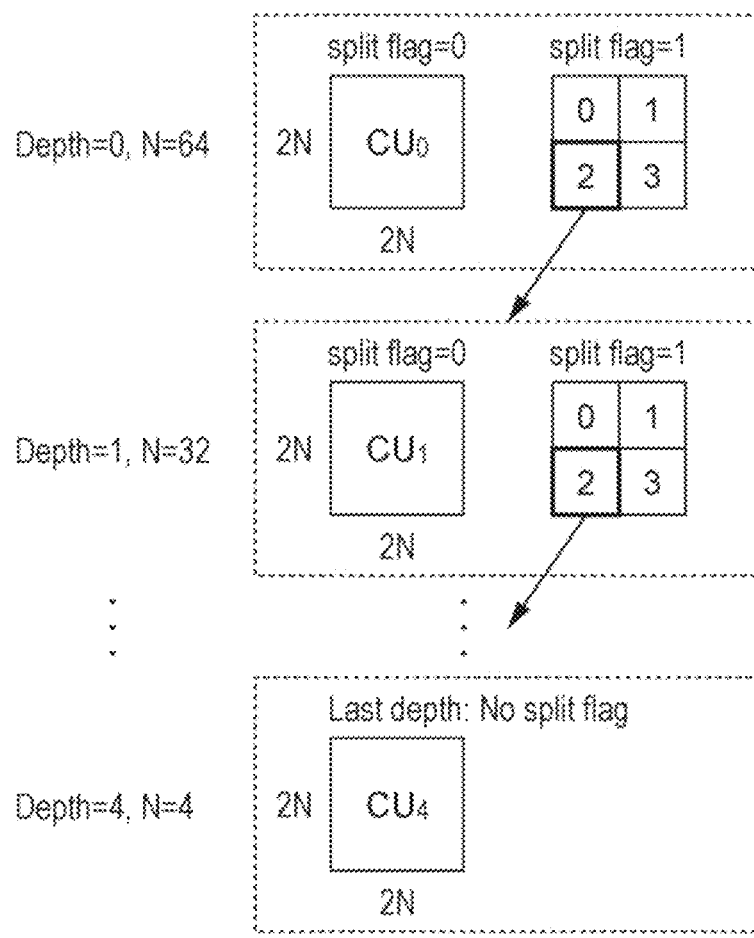
FIG. 3 is a diagram illustrating an example of the type of macroblock.
FIG. 4 is a diagram describing an example configuration of coding units.

By the way, as disclosed in PTL 1, there is a coding format in which an encoding mode for encoding and outputting image data and a non-encoding mode for outputting image data without encoding the image data are provided, whether the encoding mode or the non-encoding mode is to be used is selected in units of macroblocks, and the encoding mode and the non-encoding mode can be used in combination within a single picture. As disclosed in PTL 2, also in the AVC coding format, an I_PCM (Intra-block pulse code modulation) mode (non-compression mode) for outputting image data without encoding the image data is supported as one of the types of macroblocks (mb_type), as illustrated in FIG. 3.

This is used for ensuring real-time operation of arithmetic coding processing in a case where a quantization parameter is set to be a small value, such as QP=0, and in a case where the information amount of encoded data is larger than that of an input image. Also, lossless coding can be realized by using the I-PCM mode (non-compression mode).

[Cost Function]

Meanwhile, to achieve higher encoding efficiency in the AVC coding format, it is important to select an appropriate prediction mode.

An example of a selection method is a method which is loaded in reference software of H.264/MPEG-4 AVC called JM (Joint Model), which is released in http://iphome.hhi.de/suehring/tml/index.htm.

According to JM, the following two mode determination methods, that is, High Complexity Mode and Low Complexity Mode, can be selected. In either of them, cost function values regarding individual prediction modes are calculated, and a prediction mode with the smallest cost function value is selected as an optimal mode for a target block or macroblock.

The cost function regarding the High Complexity Mode is expressed by the following equation (1).

$$\text{Cost}(\text{Mode} \in \Omega) = D + \lambda * R \quad (1)$$

Here, Ω represents a universal set of candidate modes for encoding a target block or macroblock, and D represents the differential energy between a decoded image and an input image in a case where encoding is performed using the prediction mode. λ represents a Lagrange undetermined multiplier which is given as a function of a quantization parameter. R represents a total amount of code including an orthogonal transform coefficient in a case where encoding is performed using the mode.

That is, to perform encoding using the High Complexity Mode, it is necessary to once perform preliminary encoding processing using all the candidate modes in order to calculate the parameters D and R, which involves a larger amount of computation.

The cost function in the Low Complexity Mode is expressed by the following equation (2).

$$\text{Cost}(\text{Mode} \in \Omega) = D + QP2\text{Quant}(QP) * \text{HeaderBit} \quad (2)$$

Here, D represents the differential energy between a prediction image and an input image, unlike in the High Complexity Mode. QP2Quant(QP) is given as a function of a quantization parameter QP, and HeaderBit represents an amount of code regarding information belonging to the Header, such as a motion vector and mode, not including an orthogonal transform coefficient.

That is, in the Low Complexity Mode, it is necessary to perform prediction processing regarding individual candidate modes, but a decoded image is not necessary, and thus it is not necessary to perform encoding processing. Thus, the Low Complexity Mode can be realized with an amount of computation smaller than that of the High Complexity Mode.

[Coding Unit]

Next, description will be given of coding units, which are defined in the HEVC coding format described in NPL 1.

Coding units (CUs) are also called coding tree blocks (CTBs), are partial regions of an image of each picture which play a role similar to macroblocks in AVC, and are coding units having a hierarchical structure. The size of a macroblock is fixed to 16×16 pixels, whereas the size of a CU is not fixed and is specified in image compression information in each sequence.

In particular, a CU having the largest size is called an LCU (Largest Coding Unit), and a CU having the smallest size is called an SCU (Smallest Coding Unit). For example, the sizes of these regions are specified in a sequence parameter set (SPS) included in image compression information. The individual regions are square shaped, and the sizes thereof are limited to sizes expressed by a power of 2.

FIG. 4 illustrates an example of coding units defined in HEVC. In the example illustrated in FIG. 4, the size of LCU is 128, and the maximum layer depth is 5. When the value of split_flag is "1", the CU having a size of 2N×2N is split into CUs each having a size of N×N in the immediately lower layer.

Furthermore, a CU is split into prediction units (PUs), each being a region serving as a unit of processing for intra or inter prediction (partial region of an image of each picture), or is split into transform units (TUs), each being a region serving as a unit of processing for orthogonal transform (partial region of an image of each picture). At present, in HEVC, 16×16 and 32×32 orthogonal transform can be used in addition to 4×4 and 8×8 orthogonal transform.

[IBDI]

Figure 5:
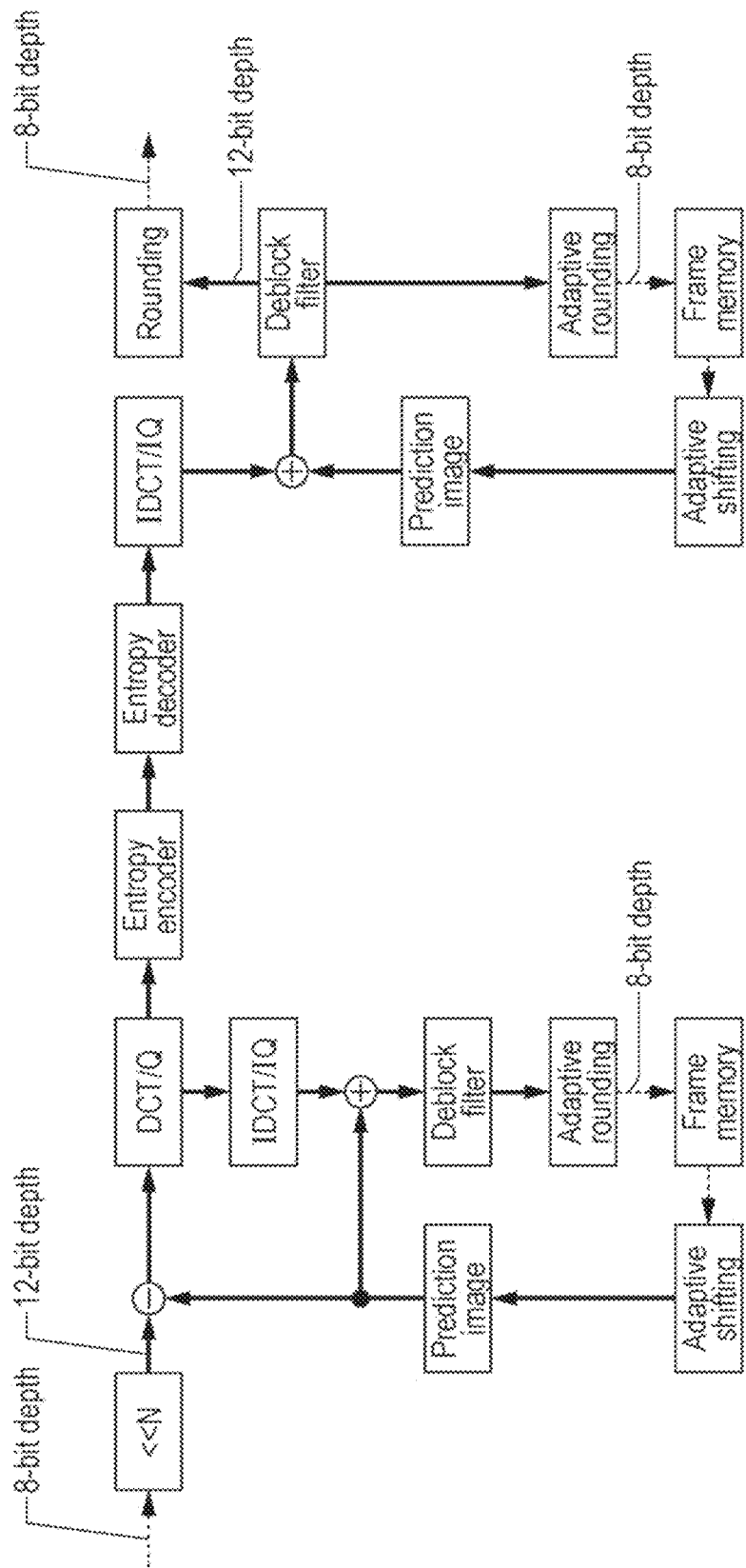
FIG. 5 is a diagram describing a method for increasing an amount of bits in internal arithmetic.
Figure 6:
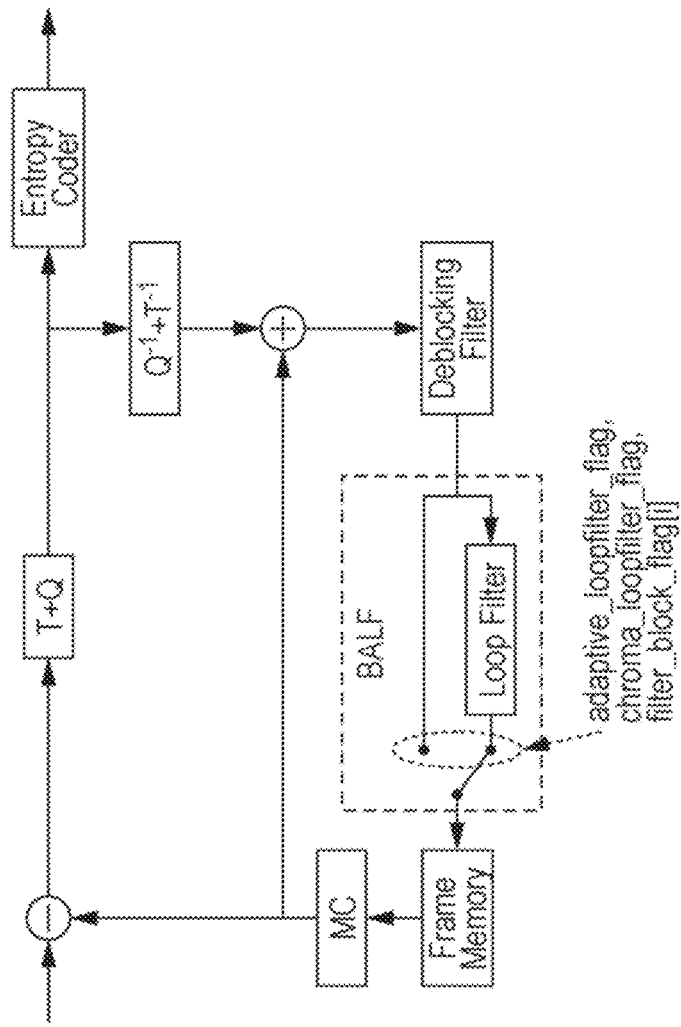
FIG. 6 is a diagram describing an adaptive loop filter.

Meanwhile, NPL 2 suggests a method for increasing internal arithmetic (IBDI (Internal bit depth increase except frame memory)) illustrated in FIG. 5. In this method, as illustrated in FIG. 5, the bit depth of data is increased, for example, from 8 bits to 12 bits, in quantization processing, lossless coding processing, dequantization processing, filter processing, prediction processing, lossless decoding processing, and so forth performed by an encoding apparatus and a decoding apparatus. Accordingly, an internal arithmetic error in processing such as orthogonal transform or motion compensation can be decreased, and encoding efficiency can be enhanced.

[BALF]

Meanwhile, NPL 3 suggests a method in which an FIR filter is provided in a motion compensation loop and loop filter processing using the filter (BALF (Block-based Adaptive Loop Filter)) is adaptively performed, as illustrated in FIG. 5. In an encoding apparatus, the FIR filter coefficient is obtained using a Wiener filter so as to minimize an error with respect to an input image, and thereby degradation in a reference image can be minimized, and encoding efficiency of image compression information to be output can be enhanced.

[Efficiency of Encoding Processing]

Meanwhile, in the case of a coding format in which CUs are defined and various processing operations are performed in units of CUs, as in HEVC, it can be considered that a macroblock in AVC corresponds to an LCU. However, since CUs have a hierarchical structure as illustrated in FIG. 4, the size of the LCU in the top layer is generally set to be larger than a macroblock in AVC, for example, 128×128 pixels.

Therefore, in such a coding format, as in the case of AVC, if the I_PCM mode is set in units of LCUs, the unit of processing becomes larger than that in AVC, for example, 128×128 pixels.

The mode of intra prediction or inter prediction is determined by calculating and comparing cost function values, as described above. That is, prediction and encoding are performed using all the modes, individual cost function values are calculated, an optimal mode is selected, and encoded data is generated using the optimal mode.

However, when the I_PCM mode is adopted, the encoded data generated using the optimal mode is discarded, and an input image (non-encoded data) is adopted as an encoding result. Thus, when the I_PCM mode is selected, all the processing operations for generating the encoded data of the optimal mode are not necessary. That is, if the unit of selection control of the I_PCM mode becomes large, unnecessary processing operations further increase. That is, as described above, if it is selected for each LCU whether or not the I_PCM mode is to be adopted, the efficiency of encoding processing may further decrease. Thus, for example, it may become difficult to ensure real-time operation of CABAC.

Also, the above-described technologies such as IBDI and BALF are not included in the AVC coding format. In a case where the I_PCM mode is adopted, it is unknown how to control these processing operations.

Accordingly, the present embodiment enables more detailed control of selection of the I_PCM mode (non-compression mode), and also enables enhancement of encoding efficiency while suppressing a decrease in the efficiency of encoding processing. Also, the present embodiment enables appropriate control of execution of IBDI and BALF according to selection of the I_PCM mode, and also enables further suppression of a decrease in the efficiency of encoding processing.

[Image Encoding Apparatus]

Figure 7:
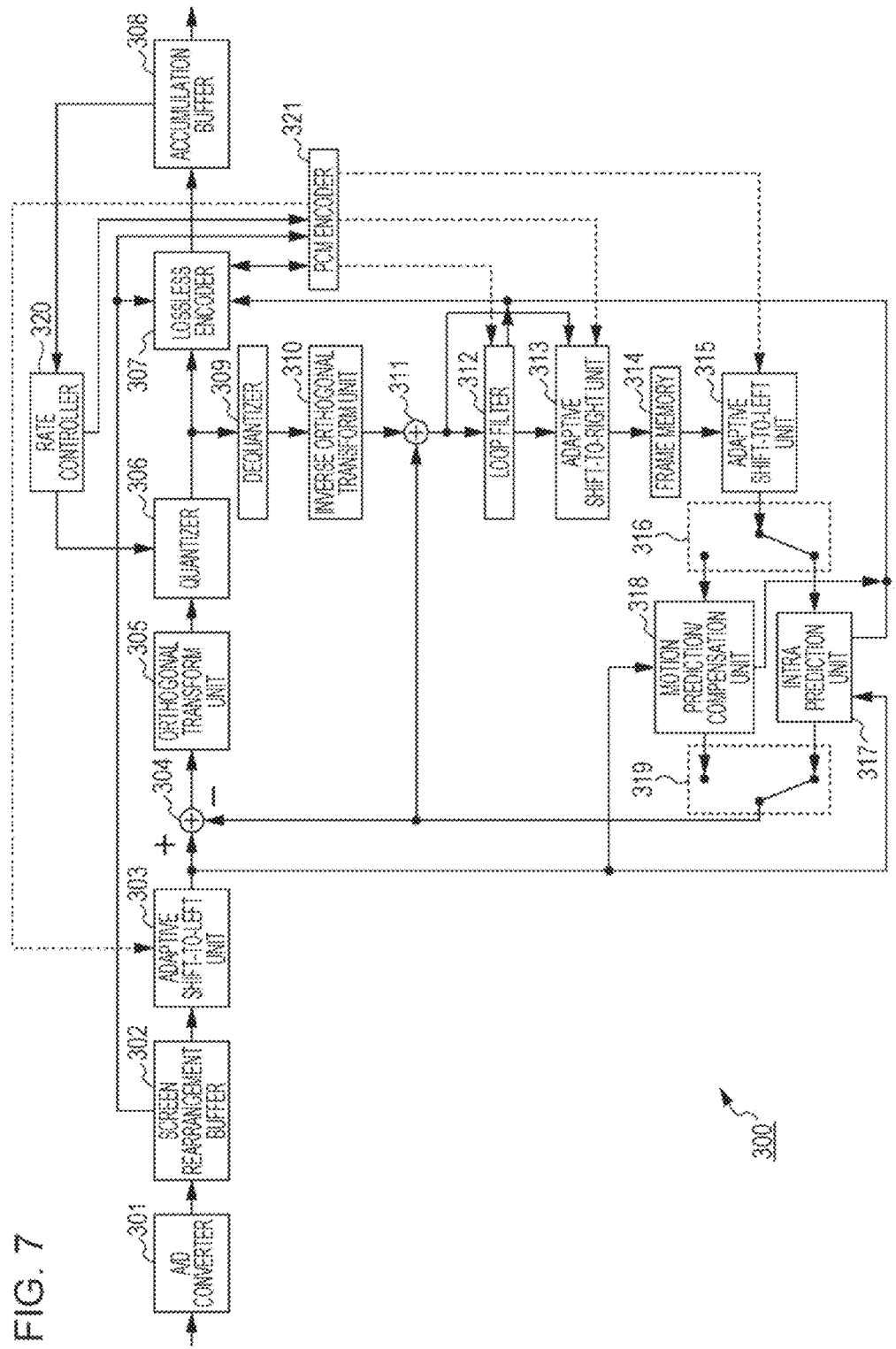
FIG. 7 is a block diagram illustrating a main example configuration of an image encoding apparatus.

FIG. 7 is a block diagram illustrating a main example configuration of an image encoding apparatus.

The image encoding apparatus 300 illustrated in FIG. 7 is basically similar to the image encoding apparatus 100 illustrated in FIG. 1, and encodes image data. As illustrated in FIG. 7, the image encoding apparatus 300 includes an A/D converter 301, a screen rearrangement buffer 302, an adaptive shift-to-left unit 303, a computing unit 304, an orthogonal transform unit 305, a quantizer 306, a lossless encoder 307, and an accumulation buffer 308. Also, the image encoding apparatus 300 includes a dequantizer 309, an inverse orthogonal transform unit 310, a computing unit 311, a loop filter 312, an adaptive shift-to-right unit 313, a frame memory 314, an adaptive shift-to-left unit 315, a selector 316, an intra prediction unit 317, a motion prediction/compensation unit 318, a selector 319, and a rate controller 320.

The image encoding apparatus 300 further includes a PCM encoder 321.

The A/D converter 301 A/D-converts image data input thereto, as in the case of the A/D converter 101. The A/D converter 301 supplies the converted image data (digital data) to the screen rearrangement buffer 302 to store the image data therein. The screen rearrangement buffer 302 rearranges, in accordance with a GOP (Group of Picture) structure, frame images stored therein which are arranged in a display order so that the frame images are rearranged in an encoding order, as in the case of the screen rearrangement buffer 102. The screen rearrangement buffer 302 supplies the rearranged frame images to the adaptive shift-to-left unit 303.

In addition, the screen rearrangement buffer 302 supplies the rearranged frame images also to the lossless encoder 307 and the PCM encoder 321.

The adaptive shift-to-left unit 303 is controlled by the PCM encoder 321, shifts image data which has been read out from the screen rearrangement buffer 302 in the left direction, and increases the bit depth thereof by a certain number of bits (for example, 4 bits). For example, the adaptive shift-to-left unit 303 increases the bit depth of the image data which has been read out from the screen rearrangement buffer 302 from 8 bits to 12 bits. As a result of increasing the bit depth in this way, the accuracy of internal arithmetic in each of processing operations, such as orthogonal transform processing, quantization processing, lossless coding processing, prediction processing, and so forth can be increased, and errors can be suppressed.

Note that the amount of shift to the left (the amount of bits) is not specified, and may be fixed or variable. Also, the shift-to-left processing may be skipped in accordance with control performed by the PCM encoder 321.

The adaptive shift-to-left unit 303 supplies the image data on which shift-to-left processing has been performed to the computing unit 304 (in a case where the processing is skipped, the image data output from the screen rearrangement buffer 302 is supplied to the computing unit 304). In addition, the adaptive shift-to-left unit 303 also supplies the image data to the intra prediction unit 317 and the motion prediction/compensation unit 318.

The computing unit 304 subtracts, from the image supplied from the adaptive shift-to-left unit 303, a prediction image supplied from the intra prediction unit 317 or the motion prediction/compensation unit 318 via the selector 319, as in the case of the computing unit 103. The computing unit 304 outputs difference information thereof to the orthogonal transform unit 305.

For example, in the case of an image on which intra coding is to be performed, the computing unit 304 subtracts a prediction image supplied from the intra prediction unit 317 from the image supplied from the adaptive shift-to-left unit 303. Also, for example, in the case of an image on which inter coding is to be performed, the computing unit 304 subtracts a prediction image supplied from the motion prediction/compensation unit 318 from the image supplied from the adaptive shift-to-left unit 303.

The orthogonal transform unit 305 performs an orthogonal transform, such as the discrete cosine transform or Karhunen-Loeve transform, on the difference information supplied from the computing unit 304, as in the case of the orthogonal transform unit 104. The method for the orthogonal transform is not specified. The orthogonal transform unit 305 supplies a transform coefficient thereof to the quantizer 306.

The quantizer 306 quantizes the transform coefficient supplied from the orthogonal transform unit 305, as in the case of the quantizer 105. The quantizer 306 performs quantization by setting a quantization parameter on the basis of information about a target value of an amount of code supplied from the rate controller 320. The method for the quantization is not specified. The quantizer 306 supplies the quantized transform coefficient to the lossless encoder 307.

The lossless encoder 307 performs lossless coding, such as variable-length coding or arithmetic coding, on the transform coefficient quantized by the quantizer 306, as in the case of the lossless encoder 106. Coefficient data has been quantized under control performed by the rate controller 320, and thus the amount of code thereof is equal to (or approximate to) a target value set by the rate controller 320.

Note that, in a case where the I_PCM mode is selected by the PCM encoder 321, the lossless encoder 307 regards an input image (non-encoded data) supplied from the screen rearrangement buffer 302 as an encoding result (that is, encoding is actually skipped).

Also, the lossless encoder 307 obtains information indicating the mode of intra prediction and so forth from the intra prediction unit 317, and obtains information indicating the mode of inter prediction, motion vector information, and so forth from the motion prediction/compensation unit 318. Furthermore, the lossless encoder 307 obtains the filter coefficient used by the loop filter 312.

The lossless encoder 307 encodes the various pieces of information, such as a filter coefficient, information indicating the mode of intra prediction mode or inter prediction, and a quantization parameter, as in the case of the lossless encoder 106, and causes the various pieces of information to be part of header information of encoded data (multiplexes the various pieces of information). The lossless encoder 307 supplies encoded data which has been obtained through encoding (including non-encoded data in the case of the I_PCM mode) to the accumulation buffer 308 to store the encoded data therein.

For example, in the lossless encoder 307, as in the case of the lossless encoder 106, lossless coding processing such as variable-length coding or arithmetic coding is performed. An example of variable-length coding includes CAVLC (Context-Adaptive Variable Length Coding) defined in the H.264/AVC format. An example of arithmetic coding includes CABAC (Context-Adaptive Binary Arithmetic Coding). Of course, the lossless encoder 307 may perform encoding using a method other than these methods.

The accumulation buffer 308 temporarily holds the encoded data supplied from the lossless encoder 307 (including non-encoded data in the case of the I_PCM mode), as in the case of the accumulation buffer 107. The accumulation buffer 308 outputs the encoded data held therein to, for example, a recording device (recording medium) or a transmission channel in the subsequent stage (not illustrated) at a certain timing.

In addition, the transform coefficient quantized by the quantizer 306 is also supplied to the dequantizer 309. The dequantizer 309 dequantizes the quantized transform coefficient using a method corresponding to the quantization performed by the quantizer 306, as in the case of the dequantizer 108. The method for the dequantization is not limited as long as the method corresponds to the quantization processing performed by the quantizer 306. The dequantizer 309 supplies the transform coefficient obtained thereby to the inverse orthogonal transform unit 310.

The inverse orthogonal transform unit 310 performs inverse orthogonal transform on the transform coefficient supplied from the dequantizer 309 using a method corresponding to the orthogonal transform processing performed by the orthogonal transform unit 305, as in the case of the inverse orthogonal transform unit 109. The method for the inverse orthogonal transform is not limited as long as the method corresponds to the orthogonal transform processing performed by the orthogonal transform unit 305. The output obtained through the inverse orthogonal transform (recovered difference information) is supplied to the computing unit 311.

The computing unit 311 adds a prediction image supplied from the intra prediction unit 317 or the motion prediction/compensation unit 318 via the selector 319 to the result of inverse orthogonal transform supplied from the inverse orthogonal transform unit 310, that is, recovered difference information, and obtains a locally decoded image (decoded image), as in the case of the computing unit 110.

For example, in a case where the difference information corresponds to an image on which intra coding is to be performed, the computing unit 311 adds a prediction image supplied from the intra prediction unit 317 to the difference information. Also, for example, in a case where the difference information corresponds to an image on which inter coding is to be performed, the computing unit 311 adds a prediction image supplied from the motion prediction/compensation unit 318 to the difference information.

The result of addition (decoded image) is supplied to the loop filter 312 or the adaptive shift-to-right unit 313.

The loop filter 312 includes a deblocking filter, an adaptive loop filter, or the like, and performs filter processing on the decoded image supplied from the computing unit 311 as appropriate. For example, the loop filter 312 performs deblocking filter processing which is similar to that performed by the deblocking filter 111 on the decoded image, thereby removing a block distortion of the decoded image. Also, for example, the loop filter 312 is controlled by the PCM encoder 321, and performs loop filter processing on the result of the deblocking filter processing (the decoded image from which a block distortion has been removed) by using a Wiener filter, thereby improving the image quality. Note that the adaptive loop filter processing may be skipped in accordance with control performed by the PCM encoder 321.

Alternatively, the loop filter 312 may perform arbitrary filter processing on the decoded image. Also, the loop filter 312 may supply a filter coefficient used for filter processing to the lossless encoder 307 as necessary, so that the filter coefficient is encoded.

The loop filter 312 supplies the result of filter processing (the decoded image on which filter processing has been performed) to the adaptive shift-to-right unit 313. Note that, as described above, the decoded image output from the computing unit 311 may be supplied to the adaptive shift-to-right unit 313 without via the loop filter 312. That is, filter processing by the loop filter 312 may be skipped.

The adaptive shift-to-right unit 313 is controlled by the PCM encoder 321, shifts the image data supplied from the computing unit 311 or the loop filter 312 in the right direction, and decreases the bit depth thereof by a certain number of bits (for example, 4 bits). That is, the adaptive shift-to-right unit 313 shifts, to the right, the image data by the number of bits by which the image data has been shifted to the left by the adaptive shift-to-left unit 303, so as to change the bit depth of the image data to the state before the image data is shifted to the left (the state at the time when the image data is read out from the screen rearrangement buffer 302).

For example, the adaptive shift-to-right unit 313 decreases the bit depth of the image data supplied from the computing unit 311 or the loop filter 312 from 12 bits to 8 bits. As a result of decreasing the bit depth in this way, the data amount of image data stored in the frame memory can be decreased.

Note that the amount of shift to the right (the amount of bits) is not specified as long as the amount matches the amount of shift to the left in the adaptive shift-to-left unit 303. That is, the amount may be fixed or variable. Also, the shift-to-right processing may be skipped in accordance with control performed by the PCM encoder 321.

The adaptive shift-to-right unit 313 supplies the image data on which shift-to-right processing has been performed to the frame memory 314 (in a case where the processing is skipped, the image data output from the computing unit 311 or the loop filter 312 is supplied to the frame memory 314).

The frame memory 314 stores the decoded image supplied thereto, as in the case of the frame memory 112, and outputs the stored decoded image to the adaptive shift-to-left unit 315 as a reference image at a certain timing.

The adaptive shift-to-left unit 315 is a processing unit similar to the adaptive shift-to-left unit 303, is controlled by the PCM encoder 321, appropriately shifts the image data (reference image) read out from the frame memory 314 in the left direction, and increases the bit depth thereof by a certain number of bits (for example, 4 bits).

For example, in a case where the mode is not the I_PCM mode, the data of an input image is shifted to the left by the adaptive shift-to-left unit 303. Thus, the adaptive shift-to-left unit 315 shifts the data of a reference image read out from the frame memory 314 to the left in accordance with control performed by the PCM encoder 321, and increases the bit depth by the number of bits that is the same as in the case of the adaptive shift-to-left unit 303 (for example, changes the bit depth from 8 bits to 12 bits).

Then, the adaptive shift-to-left unit 315 supplies the image data on which shift-to-left processing has been performed to the selector 316. As a result of increasing the bit depth in this way, the bit depth of the reference image can be made the same as the bit depth of the input image, and the reference image can be added to the input image. Also, the accuracy of internal arithmetic such as prediction processing can be increased, and errors can be suppressed.

In contrast, for example, in the case of the I_PCM mode, the data of an input image is not shifted to the left by the adaptive shift-to-left unit 303. Thus, the adaptive shift-to-left unit 315 supplies the reference image read out from the frame memory 314 to the selector 316 without increasing the bit depth, in accordance with control performed by the PCM encoder 321.

In the case of intra prediction, the selector 316 supplies the reference image supplied from the adaptive shift-to-left unit 315 to the intra prediction unit 317, as in the case of the selector 113. Also, in the case of inter prediction, the selector 316 supplies the reference image supplied from the adaptive shift-to-left unit 315 to the motion prediction/compensation unit 318, as in the case of the selector 113.

The intra prediction unit 317 performs intra prediction (intra-screen prediction) in which a prediction image is generated using the reference image supplied from the adaptive shift-to-left unit 315 via the selector 316. The intra prediction unit 317 performs intra prediction using a plurality of prepared modes (intra prediction modes). The intra prediction unit 317 is also capable of performing intra prediction using an arbitrary mode other than the modes defined in the AVC coding format.

The intra prediction unit 317 generates prediction images using all candidate intra prediction modes, evaluates the cost function values of the individual prediction images using an input image supplied the adaptive shift-to-left unit 303, and selects an optimal mode. After selecting an optimal intra prediction mode, the intra prediction unit 317 supplies the prediction image which has been generated using the optimal mode to the computing unit 304 and the computing unit 311 via the selector 319.

Also, as described above, the intra prediction unit 317 supplies information, such as intra prediction mode information indicating the adopted intra prediction mode, to the lossless encoder 307 as appropriate, so that the information is encoded.

The motion prediction/compensation unit 318 performs motion prediction (inter prediction) on an image on which inter coding is to be performed, using an input image supplied from the adaptive shift-to-left unit 303 and a reference image supplied from the adaptive shift-to-left unit 315 via the selector 316, performs motion compensation processing in accordance with a detected motion vector, and generates a prediction image (inter prediction image information). The motion prediction/compensation unit 318 performs such inter prediction using a plurality of prepared modes (inter prediction modes). The motion prediction/compensation unit 318 is also capable of performing inter prediction using an arbitrary mode other than the modes defined in the AVC coding format.

The motion prediction/compensation unit 318 generates prediction images using all candidate inter prediction modes, evaluates the cost function values of the individual prediction images, and selects an optimal mode. After selecting the optimal inter prediction mode, the motion prediction/compensation unit 318 supplies the prediction image generated using the optimal mode to the computing unit 304 and the computing unit 311 via the selector 319.

Also, the motion prediction/compensation unit 318 supplies inter prediction mode information indicating the adopted inter prediction mode and motion vector information indicating a calculated motion vector to the lossless encoder 307, so that the information is encoded.

In the case of an image on which intra coding is to be performed, the selector 319 supplies the output of the intra prediction unit 317 to the computing unit 304 and the computing unit 311, as in the case of the selector 116. In the case of an image on which inter coding is to be performed, the selector 319 supplies the output of the motion prediction/compensation unit 318 to the computing unit 304 and the computing unit 311.

The rate controller 320 controls the rate of the quantization operation performed by the quantizer 306 on the basis of the amount of code of the encoded data accumulated in the accumulation buffer 308 so that overflow or underflow does not occur.

Also, the rate controller 320 supplies the amount of code (the amount of generated code) of the encoded data accumulated in the accumulation buffer 308 to the PCM encoder 321.

The PCM encoder 321 compares the amount of code supplied from the rate controller 320 with the data amount of the input image supplied from the screen rearrangement buffer 302, and selects whether or not the I_PCM mode is to be adopted. At this time, the PCM encoder 321 performs selection in units of CUs, which are smaller than LCUs. That is, the PCM encoder 321 controls whether or not the I_PCM mode is to be adopted in more detail.

In accordance with the result of selection, the PCM encoder 321 controls the operations of the lossless encoder 307, the adaptive shift-to-left unit 303, the adaptive shift-to-right unit 313, the adaptive shift-to-left unit 315, and the loop filter 312.

[Lossless Encoder, PCM Encoder, and Loop Filter]

Figure 8:
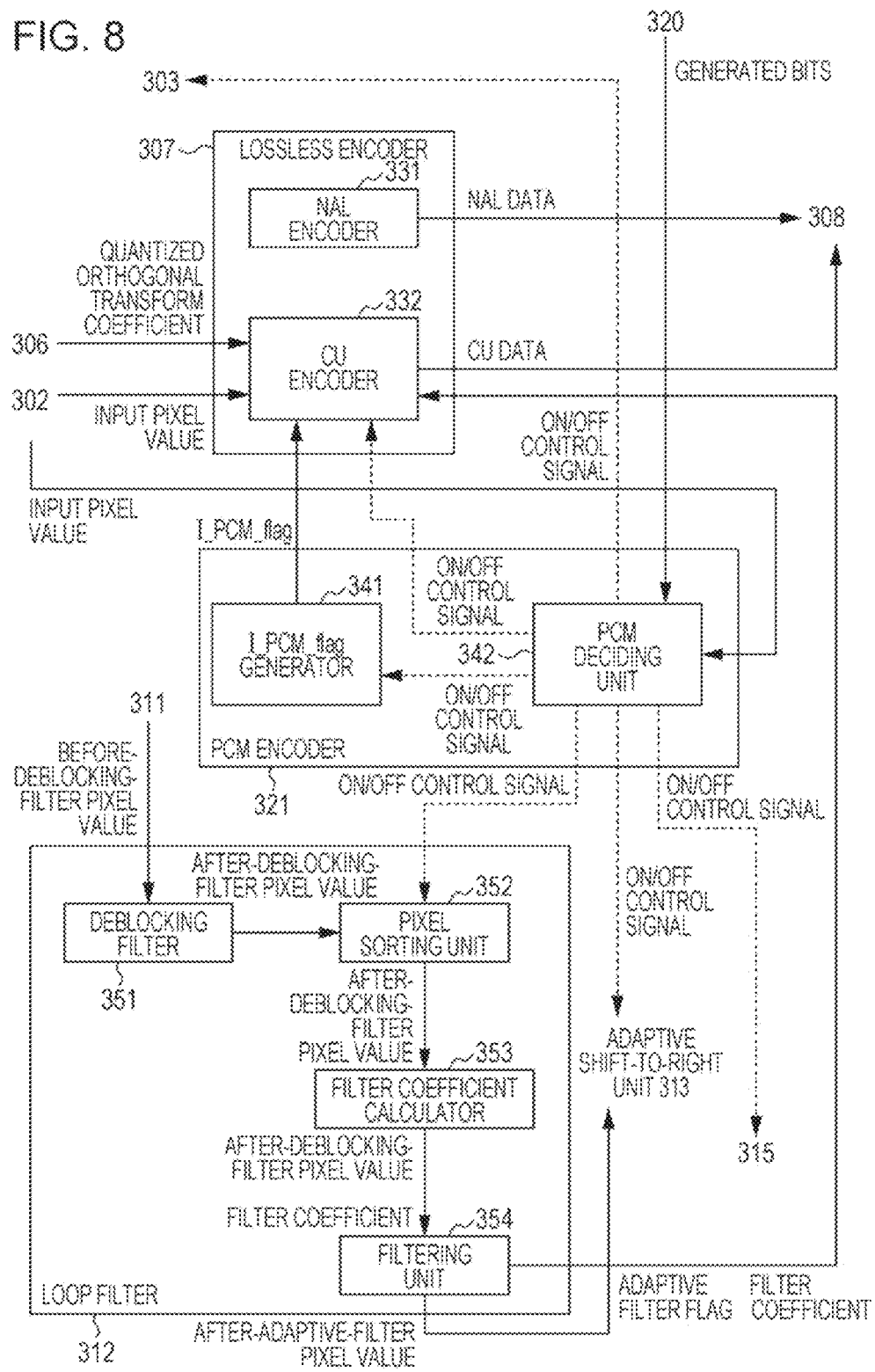
FIG. 8 is a block diagram illustrating a main example configuration of the lossless encoder, loop filter, and PCM encoder in FIG. 7.

FIG. 8 is a block diagram illustrating a main example configuration of the lossless encoder 307, the PCM encoder 321, and the loop filter 312 illustrated in FIG. 7.

As illustrated in FIG. 8, the lossless encoder 307 includes a NAL (Network Abstraction Layer) encoder 331 and a CU encoder 332.

The NAL encoder 331 encodes a NAL, for example, an SPS (Sequence Parameter Set), a PPS (Picture Parameter Set), or the like, on the basis of a user instruction, specifications, or the like input via a user interface (not illustrated). The NAL encoder 331 supplies the encoded NAL (NAL data) to the accumulation buffer 308, so that the NAL data is added to CU data, which is an encoded VCL (Video Coding Layer) supplied from the CU encoder 332 to the accumulation buffer 308.

The CU encoder 332 is controlled by the PCM encoder 321 (on the basis of an On/Off control signal supplied from the PCM encoder 321) and encodes a VCL. For example, in a case where the I_PCM mode is not selected by the PCM encoder 321 (in a case where a control signal representing On is supplied from the PCM encoder 321), the CU encoder 332 encodes quantized orthogonal transform coefficients of individual CUs. The CU encoder 332 supplies the pieces of encoded data (CU data) of the individual CUs to the accumulation buffer 308.

Also, for example, in a case where the I_PCM mode is selected by the PCM encoder 321 (in a case where a control signal representing "Off" is supplied from the PCM encoder 321), the CU encoder 332 supplies input pixel values which are supplied from the screen rearrangement buffer 302 to the accumulation buffer 308, as an encoding result (CU data).

In addition, the CU encoder 332 also encodes a flag (I_PCM_flag) which indicates whether or not the mode of encoding is the I_PCM mode and which is supplied from the PCM encoder 321, and supplies the encoded flag as CU data to the accumulation buffer 308. Furthermore, the CU encoder 332 encodes information about filter processing, such as an adaptive filter flag and a filter coefficient, supplied from the loop filter 312, and supplies the encoded information as CU data to the accumulation buffer 308.

The method for encoding used by the CU encoder 332 is not specified (for example, CABAC, CAVLC, or the like). The NAL data and CU data supplied to the accumulation buffer 308 are combined together and accumulated therein.

Note that the PCM encoder 321 actually controls whether or not the I_PCM mode is to be selected, by using the amount of code of encoded data which is generated by encoding, with the CU encoder 332, a quantized orthogonal transform coefficient.

Thus, for example, in a case where the I_PCM mode is not selected, the encoded data which has been supplied to the accumulation buffer 308 is adopted as an encoding result of the quantized orthogonal transform coefficient of the target CU. Thus, it is only necessary for the CU encoder 332 to encode additional information, such as an I_PCM_flag.

In contrast, for example, in a case where the I_PCM mode is selected, the CU encoder 332 supplies the input pixel values of the target CU which are supplied from the screen rearrangement buffer 302 to the accumulation buffer 308, as an encoding result (CU data). Thus, in this case, the encoded data of the target CU which has been supplied (encoded data generated by encoding the quantized orthogonal transform coefficient) is discarded. That is, all the processing operations regarding generation of the encoded data are redundant.

As illustrated in FIG. 8, the PCM encoder 321 includes an I_PCM_flag generator 341 and a PCM deciding unit 342.

The I_PCM_flag generator 341 generates an I_PCM_flag in accordance with a decision made by the PCM deciding unit 342, and decides the value thereof. The I_PCM_flag generator 341 supplies the generated I_PCM_flag to the CU encoder 332 of the lossless encoder 307. For example, in a case where the PCM deciding unit 342 selects the I_PCM mode, the I_PCM_flag generator 341 sets the value of the I_PCM_flag to be a value indicating that the I_PCM mode is selected (for example, "1"), and supplies the I_PCM_flag to the CU encoder 332. Also, for example, for example, in a case where the PCM deciding unit 342 does not select the I_PCM mode, the I_PCM_flag generator 341 sets the value of the I_PCM_flag to be a value indicating that the I_PCM mode is not selected (for example, "0"), and supplies the I_PCM_flag to the CU encoder 332.

The PCM deciding unit 342 decides whether or not the mode of encoding is to be the I_PCM mode. The PCM deciding unit 342 obtains the amount of data of the input pixel values supplied from the screen rearrangement buffer 302, compares the amount of data with the amount of generated code supplied from the rate controller 320, and decides whether or not the I_PCM mode is to be selected on the basis of the comparison result. The PCM deciding unit 342 supplies an On/Off control signal representing the selection result to the CU encoder 332 and the I_PCM_flag generator 341, thereby controlling an operation in accordance with the selection result.

For example, in a case where the amount of data of the input pixel values is larger than the amount of generated code, the PCM deciding unit 342 does not select the I_PCM mode. In this case, the PCM deciding unit 342 supplies a control signal representing On to the CU encoder 332, and causes the CU encoder 332 to encode the quantized orthogonal transform coefficient. Also, the PCM deciding unit 342 supplies a control signal representing On to the I_PCM_flag generator 341, and causes the I_PCM_flag generator 341 to generate an I_PCM_flag having a value indicating that the I_PCM mode is not selected (for example, "0").

In contrast, for example, in a case where the amount of data of the input pixel values is smaller than or equal to the amount of generated code, the PCM deciding unit 342 selects the I_PCM mode. In this case, the PCM deciding unit 342 supplies a control signal representing "Off" to the CU encoder 332, and causes the CU encoder 332 to output the input pixel values as an encoding result (CU data). Also, the PCM deciding unit 342 supplies a control signal representing "Off" to the I_PCM_flag generator 341, and causes the I_PCM_flag generator 341 to generate an I_PCM_flag having a value indicating that the I_PCM mode is selected (for example "1").

The PCM deciding unit 342 is capable of deciding whether or not the I_PCM mode is to be selected, in units of CUs of all the sizes (in an arbitrary layer) which are set in a sequence parameter set, as well as LCUs. Accordingly, for example, processing of suppressing the generation of many bits with a low QP by using the I_PCM mode can be executed in units of smaller CUs. Thus, the amount of code (including the data amount of non-encoded data in the I_PCM mode) can be controlled in more detail, and redundant processing which occurs in the I_PCM mode can be reduced.

Also, the PCM deciding unit 342 supplies an On/Off control signal representing a selection result to the adaptive shift-to-left unit 303, the adaptive shift-to-right unit 313, and the adaptive shift-to-left unit 315, thereby controlling IBDI in accordance with the selection result. That is, in a case where the mode of a target CU is the I_PCM mode, the PCM deciding unit 342 performs control so that processing of increasing and decreasing the bit precision is not performed by an adaptive shift device.

For example, in a case where the I_PCM mode is not selected, the PCM deciding unit 342 supplies a control signal representing On to the adaptive shift-to-left unit 303, the adaptive shift-to-right unit 313, and the adaptive shift-to-left unit 315, and causes shift-to-left processing and shift-to-right processing to be performed, so that the bit precision in internal processing is increased.

In contrast, for example, in a case where the I_PCM mode is selected, the PCM deciding unit 342 supplies a control signal representing "Off" to the adaptive shift-to-left unit 303, the adaptive shift-to-right unit 313, and the adaptive shift-to-left unit 315, and causes shift-to-left processing and shift-to-right processing to be skipped, so that the bit precision in internal processing is not increased.

In the I_PCM mode, input image pixel values are transmitted to image compression information, and thus no arithmetic errors occur. Increasing the bit arithmetic precision therefor is redundant processing. The PCM deciding unit 342 is capable of eliminating such redundant processing by performing processing in the above-described manner.

Furthermore, the PCM deciding unit 342 supplies the On/Off control signal representing the selection result to the loop filter 312, thereby controlling adaptive loop filter processing (BALF) in accordance with the selection result. That is, in a case where the mode of a target CU is the I_PCM mode, the PCM deciding unit 342 performs control so that adaptive loop filter processing is not performed by the loop filter 312.

For example, in a case where the I_PCM mode is not selected, the PCM deciding unit 342 supplies a control signal representing On to the loop filter 312, so that adaptive loop filter processing is performed. In contrast, for example, in a case where the I_PCM mode is selected, the PCM deciding unit 342 supplies a control signal representing "Off" to the loop filter 312, so that adaptive loop filter processing is skipped.

In the I_PCM mode, input image pixel values are transmitted to image compression information, and thus degradation does not occur. Performing adaptive loop filter processing thereon is redundant. The PCM deciding unit 342 is capable of eliminating such redundant processing by performing processing in the above-described manner.

As illustrated in FIG. 8, the loop filter 312 includes a deblocking filter 351, a pixel sorting unit 352, a filter coefficient calculator 353, and a filtering unit 354.

As in the case of the deblocking filter 111, the deblocking filter 351 performs deblocking filter processing on a decoded image (before-deblocking-filter pixel values) supplied from the computing unit 311, thereby removing a block distortion.

Even if a target CU to be processed is processed using the I_PCM mode, it is not always that the CU adjacent to the target CU has been processed using the I_PCM mode. Thus, even if the target CU is processed using the I_PCM mode, a block distortion may occur. Thus, deblocking filter processing is performed regardless of whether or not the mode of the target CU is the I_PCM mode.

The deblocking filter 351 supplies the result of filter processing (after-deblocking-filter pixel values) to the pixel sorting unit 352.

The pixel sorting unit 352 sorts individual results of filter processing (after-deblocking-filter pixel values) as pixel values on which adaptive loop filter processing is to be performed or as pixel values on which adaptive loop filter processing is not be to performed, in accordance with the values of On/Off control signals supplied from the PCM deciding unit 342.

For example, in a case where a control signal representing On is supplied from the PCM deciding unit 342, the pixel sorting unit 352 sorts the after-deblocking-filter pixel values of the corresponding CU as pixel values on which adaptive loop filter processing is to be performed. In contrast, for example, in a case where a control signal representing "Off" is supplied from the PCM deciding unit 342, the pixel sorting unit 352 sorts the after-deblocking-filter pixel values of the corresponding CU as pixel values on which adaptive loop filter processing is not to be performed.

The pixel sorting unit 352 supplies the sorted pixel values of individual pixels (after-deblocking-filter pixel values) to the filter coefficient calculator 353.

The filter coefficient calculator 353 calculates, using a Wiener filter, a filter coefficient (FIR filter coefficient) of an adaptive loop filter for the pixel values on which adaptive loop filter processing is to be performed among the after-deblocking-filter pixel values supplied thereto, so as to minimize the error with respect to an input image. That is, the filter coefficient calculator 353 calculates a filter coefficient by excluding pixels which are to be processed using the I_PCM mode.

The filter coefficient calculator 353 supplies the after-deblocking-filter pixel values and the calculated filter coefficient to the filtering unit 354.

The filtering unit 354 performs, using the filter coefficient supplied thereto, adaptive loop filter processing on the pixel values which have been sorted as pixel values on which adaptive loop filter processing is to be performed. The filtering unit 354 supplies the pixel values on which filter processing has been performed and the pixel values which have been sorted as pixel values on which adaptive loop filter processing is not to be performed, which are after-adaptive-filter pixel values, to the adaptive shift-to-right unit 313.

Also, the filtering unit 354 generates an adaptive filter flag (on/off_flag), which is filter identification information indicating whether or not filter processing has been performed, for each of certain blocks which are set independently of CUs. The method for setting the value of the adaptive filter flag is not specified.

For example, in a case where adaptive loop filter processing has been performed on some or all of the pixels in a target block to be processed (current block), the adaptive filter flag may be set to have a value indicating that filter processing has been performed (for example, "1"). Also, for example, in a case where adaptive loop filter processing has not been performed on all the pixels in the block, the adaptive filter flag may be set to have a value indicating that filter processing has not been performed (for example, "0"). The value of the adaptive filter flag may be set on the basis of another standard.

The filtering unit 354 supplies the generated adaptive filter flag to the CU encoder 332 of the lossless encoder 307, so that the adaptive filter flag is encoded and is provided to the decoding side. Note that, in a case where the value of the adaptive filter flag is a value indicating that filter processing has not been performed (for example, "0"), providing the adaptive filter flag to the decoding side may be skipped (the adaptive filter flag is not provided to the decoding side).

For example, in a case where the value of the adaptive filter flag is a value indicating that filter processing has not been performed (for example, "0") and where the coding format used by the lossless encoder 307 (CU encoder 332) is VLC, the filtering unit 354 skips supply of the adaptive filter flag (does not provide the adaptive filter flag to the decoding side). Also, for example, in a case where the value of the adaptive filter flag is a value indicating that filter processing has not been performed (for example, "0") and where the coding format used by the lossless encoder 307 (CU encoder 332) is CABAC, the filtering unit 354 supplies the adaptive filter flag to the CU encoder 332 of the lossless encoder 307 (provides the adaptive filter flag to the decoding side).

This is because, in the case of VLC, if the amount of input information is small, it is possible to realize higher encoding efficiency, but in the case of CABAC, if the same information is continuously input, the probability at the time of performing arithmetic coding is biased, and higher encoding efficiency can be realized.

Furthermore, the filtering unit 354 supplies the filter coefficient used for the adaptive loop filter processing to the CU encoder 332 of the lossless encoder 307, so that the filter coefficient is encoded and provided to the decoding side.

[PCM Deciding Unit]

Figure 9:
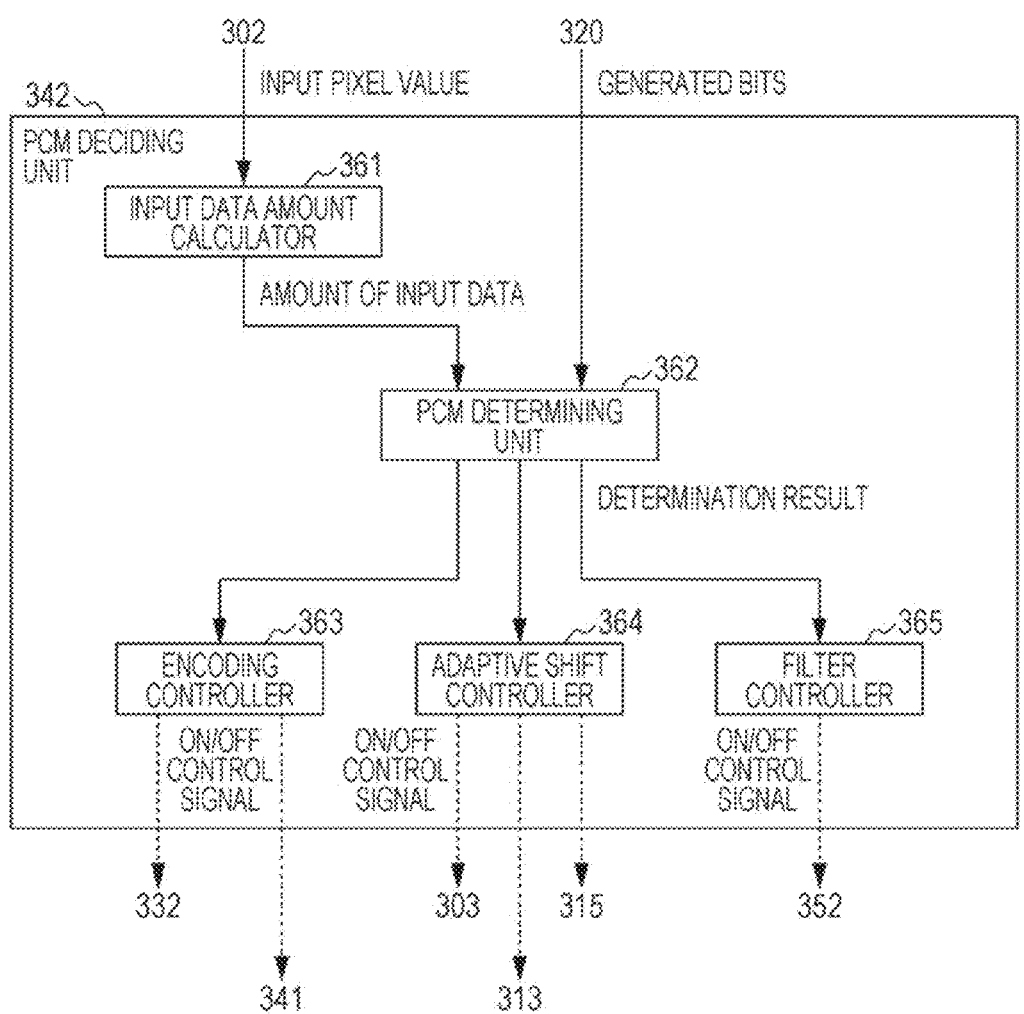
FIG. 9 is a block diagram illustrating a main example configuration of the PCM deciding unit in FIG. 8.

FIG. 9 is a block diagram illustrating a main example configuration of the PCM deciding unit 342 illustrated in FIG. 8.

As illustrated in FIG. 9, the PCM deciding unit 342 includes an input data amount calculator 361, a PCM determining unit 362, an encoding controller 363, an adaptive shift controller 364, and a filter controller 365.

The input data amount calculator 361 calculates, for a target CU, the amount of input data which is the amount of data of input pixel values supplied from the screen rearrangement buffer 302, and supplies the calculated amount of input data to the PCM determining unit 362.

The PCM determining unit 362 obtains the amount of generated code (generated bits) supplied from the rate controller 320, compares the amount of generated code with the amount of input data supplied from the input data amount calculator 361, and determines whether or not the I_PCM mode is to be selected for the CU on the basis of the comparison result. That is, the PCM determining unit 362 determines, for each CU in an arbitrary layer, whether or not the I_PCM mode is to be selected. The PCM determining unit 362 supplies the determination result to the encoding controller 363, the adaptive shift controller 364, and the filter controller 365.

On the basis of the determination result supplied from the PCM determining unit 362 (identification information indicating whether or not the I_PCM mode is selected), the encoding controller 363 supplies an On/Off control signal to the CU encoder 332 and the I_PCM_flag generator 341.

Thus, the encoding controller 363 is capable of controlling the mode of encoding in units of CUs in an arbitrary layer. Accordingly, the encoding controller 363 is capable of controlling the amount of code (including the data amount of non-encoded data in the I_PCM mode) in more detail, and is also capable of reducing redundant processing when the I_PCM mode is selected.

On the basis of the determination result supplied from the PCM determining unit 362 (information indicating whether or not the I_PCM mode is selected), the adaptive shift controller 364 supplies an On/Off control signal to the adaptive shift-to-left unit 303, the adaptive shift-to-right unit 313, and the adaptive shift-to-left unit 315.

Thus, the adaptive shift controller 364 is capable of performing control so that the bit depth is not increased in internal arithmetic when the I_PCM mode is selected. Accordingly, the adaptive shift controller 364 is capable of reducing redundant processing.

On the basis of the determination result supplied from the PCM determining unit 362 (information indicating whether or not the I_PCM mode is selected), the filter controller 365 supplies an On/Off control signal to the pixel sorting unit 352.

Thus, the filter controller 365 is capable of performing control so that adaptive loop filter processing is not performed when the I_PCM mode is selected. Accordingly, the filter controller 365 is capable of reducing redundant processing.

As described above, the image encoding apparatus 300 is capable of reducing redundant processing and suppressing a decrease in the efficiency of encoding processing. Also, the image encoding apparatus 300 is capable of selecting the I_PCM mode (non-compression mode) in more detail (in units of smaller data units), and enhancing encoding efficiency. Therefore, the image encoding apparatus 300 is capable of enhancing encoding efficiency while suppressing a decrease in the efficiency of encoding processing.

[Flow of Encoding Processing]

Next, description will be given of the flow of individual processing operations performed by the above-described image encoding apparatus 300. First, an example of the flow of encoding processing will be described with reference to the flowchart in FIG. 10.

In step S301, the A/D converter 301 A/D-converts an input image. In step S302, the screen rearrangement buffer 302 stores the A/D-converted image therein and rearranges pictures from a display order to an encoding order.

In step S303, the adaptive shift-to-left unit 303 adaptively performs shift to the left on the input image on the basis of control performed by the PCM encoder 321. In step S304, the adaptive shift-to-left unit 315 adaptively performs shift to the left on a reference image.

In step S305, the intra prediction unit 317 performs intra prediction processing in the intra prediction mode by using the reference image which is shifted to the left in step S304. In step S306, the motion prediction/compensation unit 318 performs inter motion prediction processing, in which motion prediction or motion compensation is preformed in the inter prediction mode, by using the reference image which is shifted to the left in step S304.

Note that, actually, the processing of shifting the bit depth of the reference image to the left may be performed when the reference image is read out from the frame memory 314 in intra prediction processing or inter motion prediction processing.

In step S307, the selector 319 determines an optimal mode on the basis of the individual cost functions which have been output from the intra prediction unit 317 and the motion prediction/compensation unit 318. That is, the selector 319 selects any one of a prediction image generated by the intra prediction unit 317 and a prediction image generated by the motion prediction/compensation unit 318.

Also, selection information indicating which of the prediction images has been selected is supplied to, among the intra prediction unit 317 and the motion prediction/compensation unit 318, the one corresponding to the selected prediction image. In a case where the prediction image of the optimal intra prediction mode is selected, the intra prediction unit 317 supplies intra prediction mode information indicating the optimal intra prediction mode and so forth to the lossless encoder 307. In a case where the prediction image of the optimal inter prediction mode is selected, the motion prediction/compensation unit 318 outputs information indicating the optimal inter prediction mode, and if necessary, information based on the optimal inter prediction mode, to the lossless encoder 307. Examples of the information based on the optimal inter prediction mode include motion vector information, flag information, and reference frame information.

In step S308, the computing unit 304 computes the difference between the image in which the bit depth has been shifted to the left through the processing in step S303 and the prediction image selected through the processing in step S307. The prediction image is supplied to the computing unit 304 via the selector 319 from the motion prediction/compensation unit 318 in a case where inter prediction is to be performed, and from the intra prediction unit 317 in a case where intra prediction is to be performed.

The amount of difference data is smaller than that of the original image data. Thus, the amount of data can be reduced compared to a case where an image itself is encoded.

In step S309, the orthogonal transform unit 305 performs an orthogonal transform on the difference information generated through the processing in step S308. Specifically, an orthogonal transform such as the discrete cosine transform or Karhunen-Loeve transform is performed, and a transform coefficient is output.

In step S310, the quantizer 306 quantizes the orthogonal transform coefficient obtained through the processing in step S309.

In step S311, the lossless encoder 307 encodes the transform coefficient quantized through the processing in step S310. That is, lossless coding such as variable-length coding or arithmetic coding is performed on the difference image.

The lossless encoder 307 encodes a quantization parameter calculated in step S310 and adds the quantization parameter to encoded data. Also, the lossless encoder 307 encodes information about the mode of the prediction image selected through the processing in step S307, and adds the information to the encoded data which is obtained by encoding the difference image. That is, the lossless encoder 307 also encodes the optimal intra prediction mode information supplied from the intra prediction unit 317 or information based on the optimal inter prediction mode supplied from the motion prediction/compensation unit 318, and adds the information to the encoded data.

Furthermore, the lossless encoder 307 encodes the filter coefficient and flag information obtained from the loop filter 312 and adds them to the encoded data. Furthermore, the lossless encoder 307 encodes NAL data.

In step S312, the accumulation buffer 308 accumulates the encoded data output from the lossless encoder 307. The encoded data accumulated in the accumulation buffer 308 is read out as appropriate, and is transmitted to the decoding side via a transmission channel or a recording medium.

In step S313, the rate controller 320 calculates the amount of code (the amount of generated code) of the encoded data accumulated in the accumulation buffer 308 through the processing in step S312, and controls the rate of the quantization operation performed by the quantizer 306 on the basis of the amount of code so that overflow or underflow does not occur. Also, the rate controller 320 supplies the amount of generated code to the PCM encoder 321.

In step S314, the PCM encoder 321 performs PCM encoding control processing by using the amount of generated code calculated in step S313. In step S315, the lossless encoder 307 performs PCM encoding processing in accordance with control performed by the PCM encoder 321.

In step S316, the dequantizer 309 to the frame memory 314 perform reference image generation processing in which the difference information quantized through the processing in step S310 is locally decoded to generate a reference image.

After the processing in step S316 ends, the encoding processing ends. The encoding processing is repeatedly performed on, for example, individual CUs.

[PCM Encoding Control Processing]

Next, an example of the flow of the PCM encoding control processing which is performed in step S314 in FIG. 10 will be described with reference to the flowchart in FIG. 11.

After the PCM encoding control processing starts, in step S331, the PCM determining unit 362 of the PCM deciding unit 342 obtains, from the rate controller 320, the amount of generated code of the encoded data of the quantized orthogonal transform coefficient of the target CU.

In step S332, the input data amount calculator 361 calculates the amount of input data of the input pixel values of the target CU.

In step S333, the PCM determining unit 362 compares the amount of code obtained in step S331 with the amount of input data calculated in step S332, and determines whether or not encoding is to be performed using the I_PCM mode.

In step S334, the I_PCM_flag generator 341 generates an I_PCM_flag on the basis of an On/Off control signal which represents the determination result generated in step S333 and which is supplied from the encoding controller 363.

In step S335, the encoding controller 363 supplies an On/Off control signal representing the determination result generated in step S333 to the CU encoder 332, thereby controlling encoding of CU data.

In step S336, the adaptive shift controller 364 supplies an On/Off control signal representing the determination result generated in step S333 to the adaptive shift-to-left unit 303, the adaptive shift-to-right unit 313, and the adaptive shift-to-left unit 315, thereby controlling adaptive shift processing.

In step S337, the encoding controller 363 supplies an On/Off control signal representing the determination result generated in step S333 to the pixel sorting unit 352 of the loop filter 312, thereby controlling adaptive loop filter processing.

Figure 10:
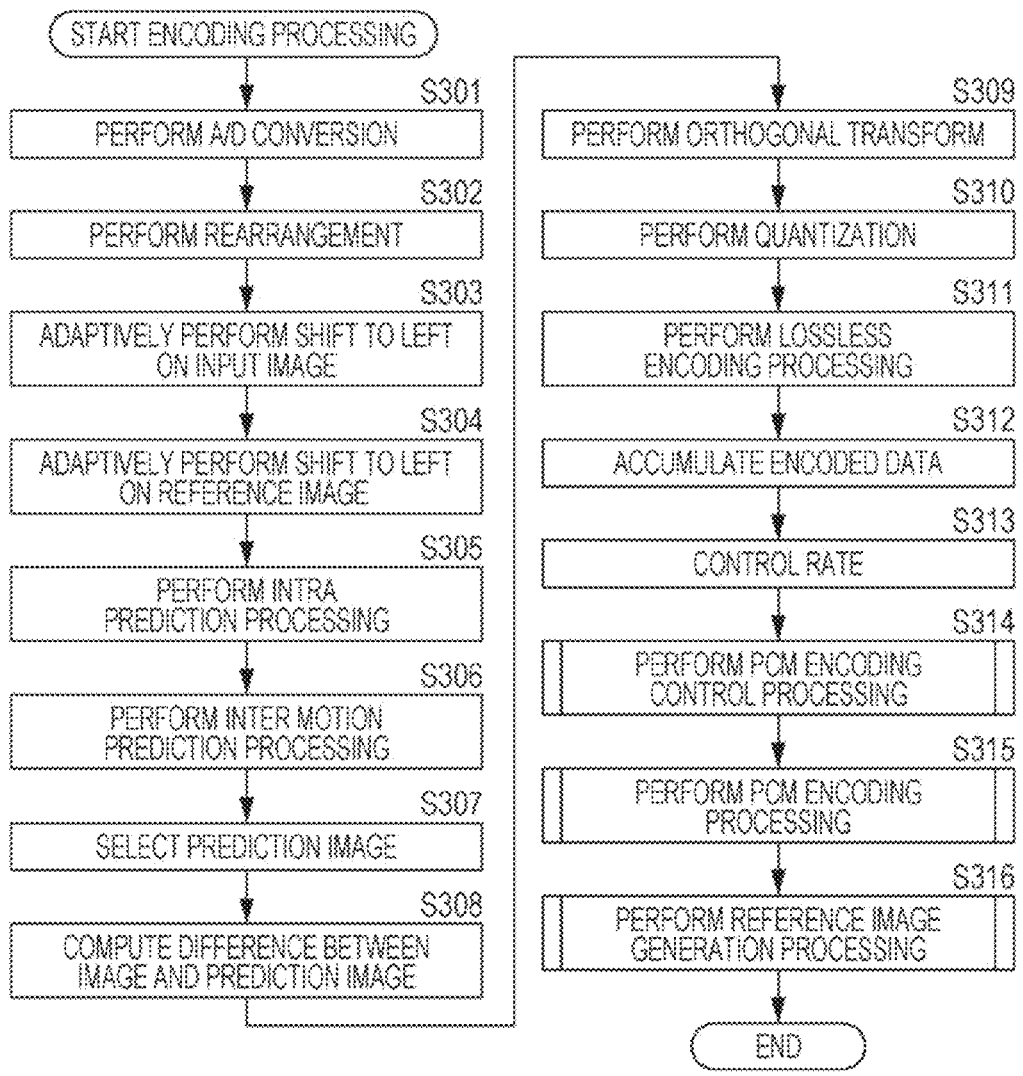
FIG. 10 is a flowchart describing an example of the flow of encoding processing.
Figure 11:
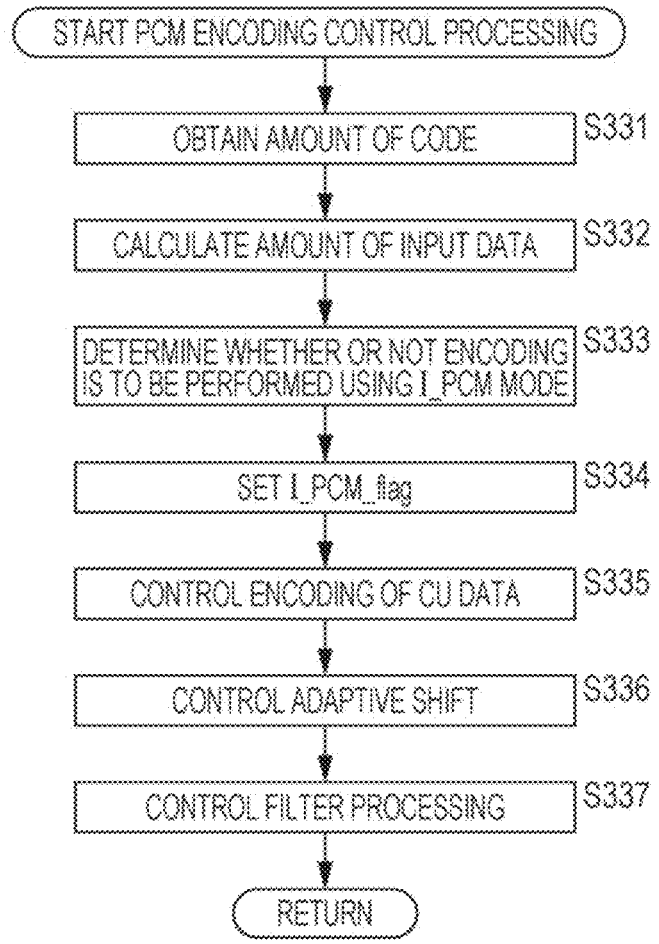
FIG. 11 is a flowchart describing an example of the flow of PCM encoding control processing.

After the processing in step S337 ends, the PCM deciding unit 342 ends the PCM encoding control processing, the processing returns to step S314 in FIG. 10, and the processing is performed from step S315.

[Flow of PCM Encoding Processing]

Figure 12:
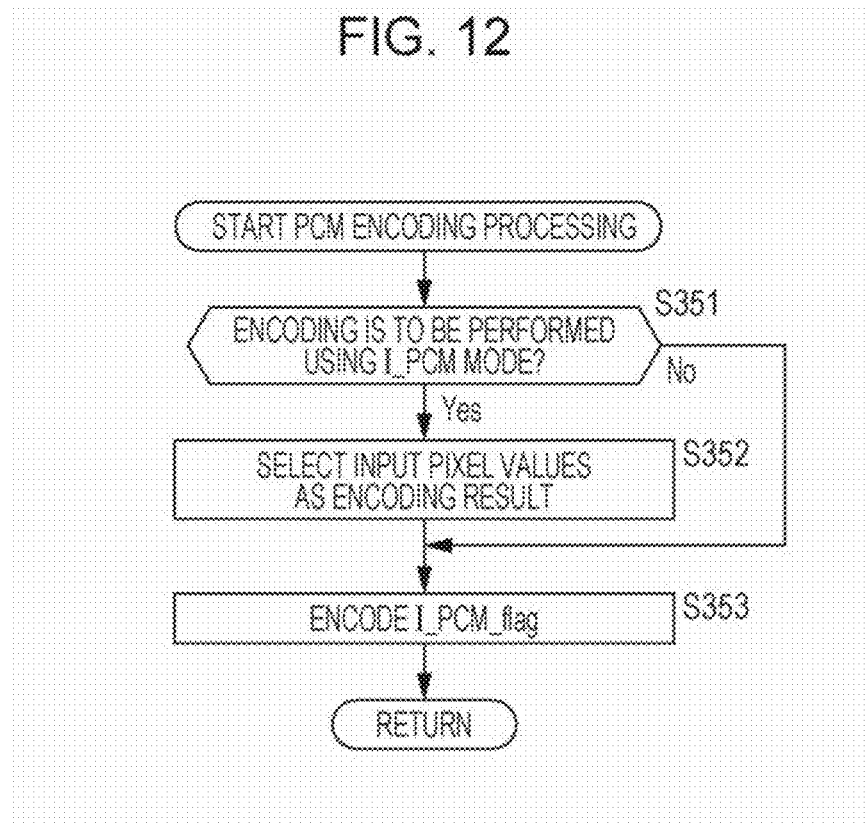
FIG. 12 is a flowchart describing an example of the flow of PCM encoding processing.

Next, an example of the flow of the PCM encoding processing which is performed in step S315 in FIG. 10 will be described with reference to the flowchart in FIG. 12.

After the PCM encoding processing starts, in step S351, the CU encoder 332 determines whether or not encoding is to be performed using the I_PCM mode. In a case where control is performed in the above-described PCM encoding control processing so that encoding is to be performed using the I_PCM mode, the CU encoder 332 causes the processing to proceed to step S352. In step S352, the CU encoder 332 selects the input pixel values of the target CU as an encoding result. The CU encoder 332 causes the CU data of the target CU in the accumulation buffer 308 to be discarded, and causes the input pixel values to be accumulated in the accumulation buffer 308.

After step S352 ends, the CU encoder 332 causes the processing to proceed to step S353. On the other hand, if it is determined in step S351 that encoding is not to be performed using the I_PCM mode, the CU encoder 332 causes the processing to proceed to step S353.

In step S353, the CU encoder 332 encodes the I_PCM_flag which has been generated in the above-described PCM encoding control processing, and accumulates the I_PCM_flag in the accumulation buffer 308.

After step S353 ends, the CU encoder 332 ends the PCM encoding processing, the processing returns to step S315 in FIG. 10, and the processing is performed from step S316.

[Flow of Reference Image Generation Processing]

Next, an example of the flow of the reference image generation processing which is performed in step S316 in FIG. 10 will be described with reference to the flowchart in FIG. 13.

After the reference image generation processing starts, the adaptive shift-to-left unit 315 determines in step S371 whether or not the I_PCM mode is selected on the basis of control performed by the adaptive shift controller 364. If the I_PCM mode is selected, the bit depth is not increased in internal arithmetic, and thus processing is performed again starting from prediction processing. That is, if it is determined that the I_PCM mode is selected, the adaptive shift-to-left unit 315 causes the processing to proceed to step S372 without performing shift-to-left processing on a reference image.

In step S372, the intra prediction unit 317 performs intra prediction processing using a reference image in which the bit depth is not shifted to the left. In step S373, the motion prediction/compensation unit 318 performs inter motion prediction processing using the reference image in which the bit depth is not shifted to the left.

In step S374, the selector 319 decides an optimal mode on the basis of the individual cost function values output from the intra prediction unit 317 and the motion prediction/compensation unit 318. That is, the selector 319 selects any one of a prediction image generated by the intra prediction unit 317 and a prediction image generated by the motion prediction/compensation unit 318.

Also, selection information indicating which of the prediction images has been selected is supplied to, among the intra prediction unit 317 and the motion prediction/compensation unit 318, the one corresponding to the selected prediction image. In a case where the prediction image of the optimal intra prediction mode is selected, the intra prediction unit 317 supplies intra prediction mode information indicating the optimal intra prediction mode and so forth to the lossless encoder 307. In a case where the prediction image of the optimal inter prediction mode is selected, the motion prediction/compensation unit 318 supplies information indicating the optimal inter prediction mode, and if necessary, information based on the optimal inter prediction mode, to the lossless encoder 307. Examples of the information based on the optimal inter prediction mode include motion vector information, flag information, and reference frame information.

In a case where the I_PCM mode is selected, the bit depth in internal arithmetic is not increased. That is, shift-to-left processing performed on the reference image by the adaptive shift-to-left unit 303 is skipped. In step S375, the computing unit 304 computes the difference between the input image in which the bit depth is not shifted to the left and the prediction image selected through the processing in step S374. The prediction image is supplied to the computing unit 304 via the selector 319 from the motion prediction/compensation unit 318 in a case where inter prediction is performed and from the intra prediction unit 317 in a case where intra prediction is performed.

In step S376, the orthogonal transform unit 305 performs an orthogonal transform on the difference information generated through the processing in step S375. Specifically, an orthogonal transform such as the discrete cosine transform or Karhunen-Loeve transform is performed, and a transform coefficient is output. In step S377, the quantizer 306 quantizes the orthogonal transform coefficient obtained through the processing in step S376.

After the orthogonal transform coefficient has been quantized, the quantizer 306 causes the processing to proceed to step S378, where a reference image is generated using the orthogonal transform coefficient (data on which shift-to-left processing has not been performed) quantized in step S377.

In contrast, if it is determined in step S371 that the I_PCM mode is not selected, the adaptive shift-to-left unit 315 skips the processing operations in step S372 to step S377, and causes the processing to proceed to step S378. That is, in a case where the I_PCM mode is not selected, a reference image is generated using the orthogonal transform coefficient (data on which shift-to-left processing has been performed) quantized in step S310 in FIG. 10.

In step S378, the dequantizer 309 dequantizes the quantized orthogonal transform coefficient (also referred to as quantized coefficient) in accordance with the characteristic corresponding to the characteristic of the quantizer 306. In step S379, the inverse orthogonal transform unit 310 performs inverse orthogonal transform on the orthogonal transform coefficient obtained through the processing in step S378, in accordance with the characteristic corresponding to the characteristic of the orthogonal transform unit 305.

In step S380, the computing unit 311 adds the prediction image to the locally decoded difference information, thereby generating a locally decoded image (an image corresponding to the input to the computing unit 304). For example, in a case where the I_PCM mode is selected, the computing unit 311 adds a prediction image on which shift-to-left processing has not been performed to difference information on which shift-to-left processing has not been performed, so as to generate a decoded image on which shift-to-left processing has not been performed. Also, for example, in a case where the I_PCM mode is not selected, the computing unit 311 adds a prediction image on which shift-to-left processing has been performed to difference information on which shift-to-left processing has been performed, so as to generate a decoded image on which shift-to-left processing has been performed.

In step S381, the loop filter 312 performs loop filter processing on the locally decoded image obtained through the processing in step S380 on the basis of control performed by the filter controller 365, and performs loop filter processing including deblocking filter processing, adaptive loop filter processing, and so forth as appropriate.

In step S382, the adaptive-shift-to-right unit 313 determines whether or not the I_PCM mode is selected, on the basis of control performed by the adaptive shift controller 364. If it is determined that the I_PCM mode is not selected, the adaptive shift-to-right unit 313 causes the processing to proceed to step S383.

In a case where the I_PCM mode is not selected, the decoded image has undergone an increase in the bit depth in internal arithmetic. Thus, in step S383, the adaptive shift-to-right unit 313 adaptively performs shift to right on the bit depth of the result of filter processing (decoded image) obtained through the loop filter processing in step S381. After the processing in step S383 ends, the adaptive shift-to-right unit 313 causes the processing to proceed to step S384.

If it is determined in step S382 that the I_PCM mode is selected, the adaptive shift-to-right unit 313 causes the processing to proceed to step S384 without performing shift-to-right processing.

In step S384, the frame memory 314 stores the decoded image. After the processing in step S384 ends, the frame memory 314 ends the reference image generation processing, the processing returns to step S316 in FIG. 10, and the encoding processing ends.

[Flow of Loop Filter Processing]

Next, an example of the flow of the loop filter processing which is performed in step S381 in FIG. 13 will be described with reference to the flowchart in FIG. 14.

After the loop filter processing starts, in step S401, the deblocking filter 351 of the loop filter 312 performs deblocking filter processing on the decoded image (before-deblocking-filter pixel values) supplied from the computing unit 311.

In step S402, the pixel sorting unit 352 sorts the individual pixels of the decoded image on the basis of whether or not the mode is the I_PCM mode, under control performed by the filter controller 365 of the PCM deciding unit 342.

In step S403, the filter coefficient calculator 353 calculates a filter coefficient for the pixels which have been sorted to undergo filter processing (target pixels to be processed). In step S404, the filtering unit 354 performs adaptive filter processing on the target pixels to be processed, using the filter coefficient calculated in step S403.

In step S405, the filtering unit 354 sets an adaptive filter flag for the target block to be processed, and supplies the adaptive filter flag and the filter coefficient to the CU encoder 332, so that the adaptive filter flag and the filter coefficient are encoded.

Figure 13:
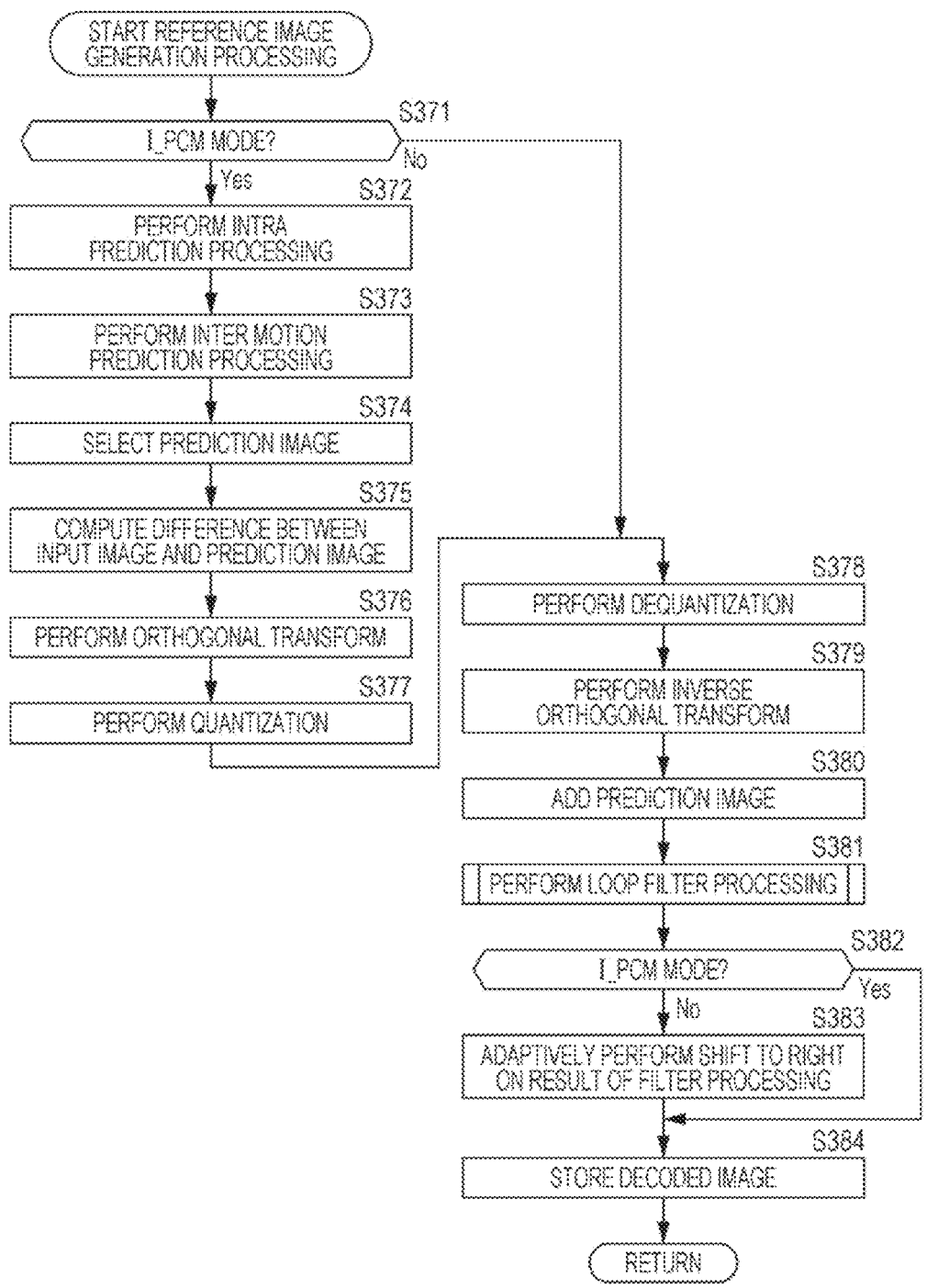
FIG. 13 is a flowchart describing an example of the flow of reference image generation processing.
Figure 14:
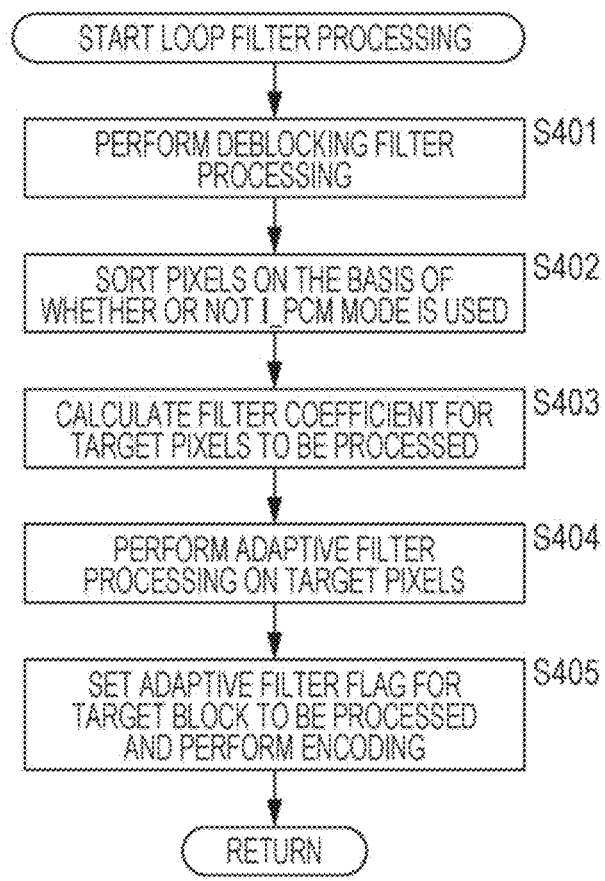
FIG. 14 is a flowchart describing an example of the flow of loop filter processing.

After the processing in step S405 ends, the loop filter 312 ends the loop filter processing, the processing returns to step S381 in FIG. 13, and the processing is performed from step S382.

By performing the individual processing operations in the above-described manner, the image encoding apparatus 300 is capable of enhancing encoding efficiency while suppressing a decease in the efficiency of encoding processing.

2. Second Embodiment

[Image Decoding Apparatus]

Figure 15:
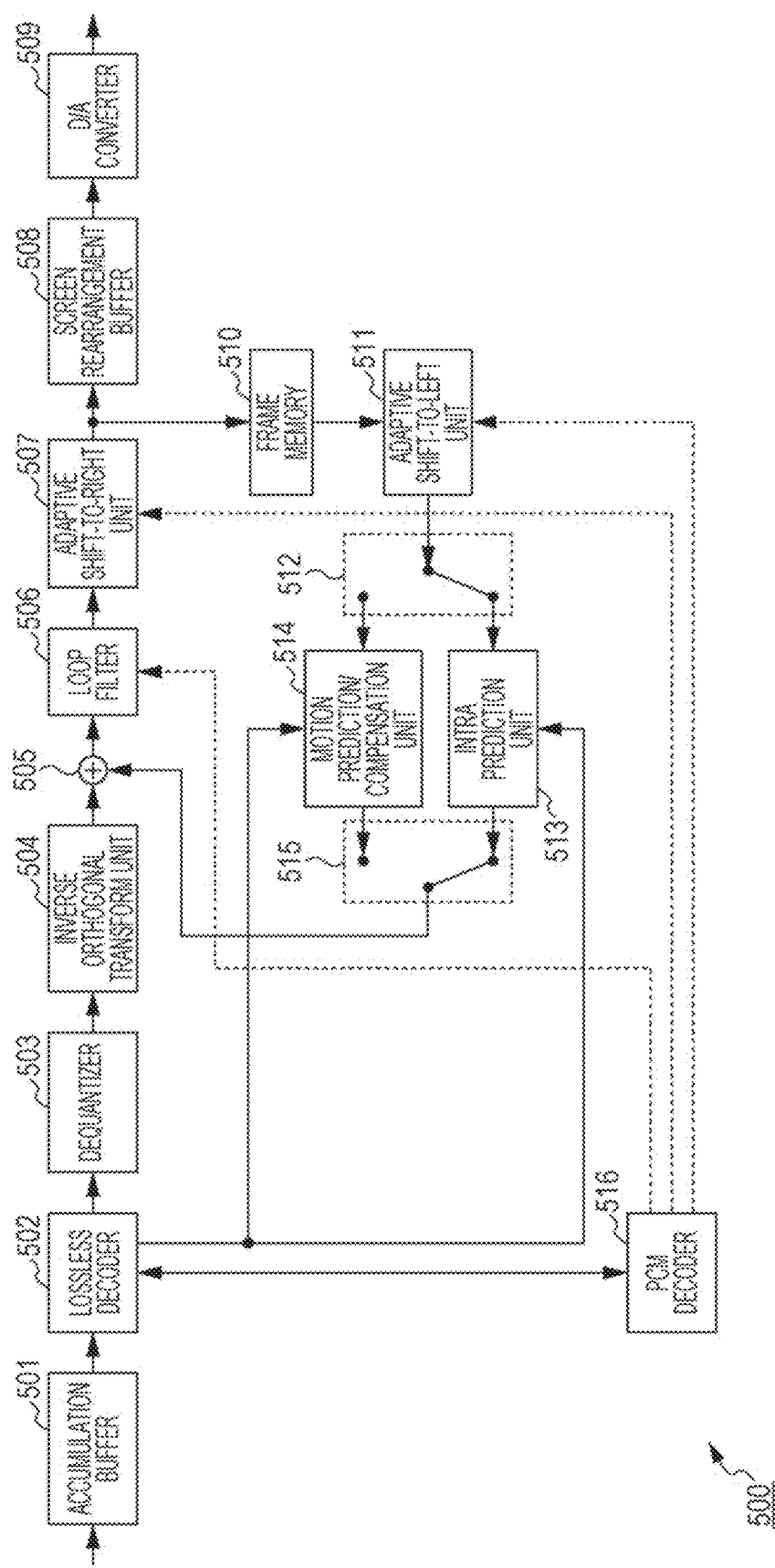
FIG. 15 is a block diagram illustrating a main example configuration of an image decoding apparatus.

FIG. 15 is a block diagram illustrating a main example configuration of an image decoding apparatus. The image decoding apparatus 500 illustrated in FIG. 15 is an apparatus which is basically similar to the image decoding apparatus 200 illustrated in FIG. 2, and decodes encoded data which is generated by encoding image data.

The image decoding apparatus 500 illustrated in FIG. 15 is a decoding apparatus corresponding to the image encoding apparatus 300 illustrated in FIG. 7. Encoded data which has been encoded by the image encoding apparatus 300 is supplied to the image decoding apparatus 500 via an arbitrary path, for example, a transmission channel, a recording medium, or the like, and is decoded.

As illustrated in FIG. 15, the image decoding apparatus 500 includes an accumulation buffer 501, a lossless decoder 502, a dequantizer 503, an inverse orthogonal transform unit 504, a computing unit 505, a loop filter 506, an adaptive shift-to-right unit 507, a screen rearrangement buffer 508, and a D/A converter 509. Also, the image decoding apparatus 500 includes a frame memory 510, an adaptive shift-to-left unit 511, a selector 512, an intra prediction unit 513, a motion prediction/compensation unit 514, and a selector 515.

The image decoding apparatus 500 further includes a PCM decoder 516.

The accumulation buffer 501 accumulates encoded data transmitted thereto, as in the case of the accumulation buffer 201. The encoded data has been encoded by the image encoding apparatus 300.

The lossless decoder 502 reads out encoded data from the accumulation buffer 501 at a certain timing, and decodes the encoded data using a format corresponding to the coding format used by the lossless encoder 307 illustrated in FIG. 15. At this time, the lossless decoder 502 supplies the I_PCM_flag included in the encoded data to the PCM decoder 516, and causes the PCM decoder 516 to determine whether or not the mode is the I_PCM mode (non-compression mode).

In a case where the mode is the I_PCM mode, the CU data obtained from the accumulation buffer 501 is non-encoded data. Thus, the lossless decoder 502 supplies the CU data to the dequantizer 503 in accordance with control performed by the PCM decoder 516.

In a case where the mode is not the I_PCM mode, the CU data obtained from the accumulation buffer 501 is encoded data. Thus, the lossless decoder 502 decodes the CU data in accordance with control performed by the PCM decoder 516, and supplies a decoding result to the dequantizer 503.

Note that, for example, in a case where the target CU has been intra-coded, intra prediction mode information is stored in the header portion of the encoded data. The lossless decoder 502 also decodes the intra prediction mode information, and supplies the information to the intra prediction unit 513. On the other hand, in a case where the target CU has been inter-coded, motion vector information and inter prediction mode information are stored in the header portion of the encoded data. The lossless decoder 502 also decodes the motion vector information and the inter prediction mode information, and supplies the information to the motion prediction/compensation unit 514.

In a case where the mode is not the I_PCM mode, the dequantizer 503 dequantizes the coefficient data (quantized coefficient) supplied from the lossless decoder 502 using a method corresponding to the quantization method used by the quantizer 306 illustrated in FIG. 7, as in the case of the dequantizer 203. That is, the dequantizer 503 dequantizes the quantized coefficient using a method similar to that used by the dequantizer 309 illustrated in FIG. 7. The dequantizer 503 supplies the dequantized coefficient data, that is, the orthogonal transform coefficient, to the inverse orthogonal transform unit 504.

Also, in a case where the mode is the I_PCM mode, the dequantizer 503 supplies the CU data supplied from the lossless decoder 502 (image data which is not encoded) to the inverse orthogonal transform unit 504.

In a case where the mode is not the I_PCM mode, the inverse orthogonal transform unit 504 performs inverse orthogonal transform on the orthogonal transform coefficient using a method corresponding to the orthogonal transform method used by the orthogonal transform unit 305 illustrated in FIG. 7 (a method similar to that used by the inverse orthogonal transform unit 310 illustrated in FIG. 7), as in the case of the inverse orthogonal transform unit 204. With the inverse orthogonal transform processing, the inverse orthogonal transform unit 504 obtains decoded residual data corresponding to the residual data before orthogonal transform is performed in the image encoding apparatus 300. For example, fourth-order inverse orthogonal transform is performed. The inverse orthogonal transform unit 504 supplies the decoded residual data obtained through inverse orthogonal transform to the computing unit 505.

Also, in a case where the mode is the I_PCM mode, the inverse orthogonal transform unit 504 supplies the CU data supplied from the dequantizer 503 (image data which is not encoded) to the computing unit 505.

Also, a prediction image is supplied to the computing unit 505 from the intra prediction unit 513 or the motion prediction/compensation unit 514 via the selector 515.

In a case where the mode is not the I_PCM mode, the computing unit 505 adds the decoded residual data and the prediction image, and thereby obtains decoded image data corresponding to the image data before the prediction image is subtracted by the computing unit 304 of the image encoding apparatus 300, as in the case of the computing unit 205. The computing unit 505 supplies the decoded image data to the loop filter 506.

In a case where the mode is the I_PCM mode, the computing unit 505 supplies the CU data supplied from the inverse orthogonal transform unit 504 (image data which is not encoded) to the loop filter 506. In this case, the CU data is not residual information, and thus addition to the prediction image is not necessary.

The loop filter 506 performs loop filter processing including deblocking filter processing, adaptive loop filter processing, or the like, on the decoded image supplied from the computing unit 505 as appropriate, under control performed by the PCM decoder 516.

More specifically, the loop filter 506 performs deblocking filter processing similar to that performed by the deblocking filter 206 on the decoded image, thereby removing a block distortion of the decoded image. Also, the loop filter 506 performs loop filter processing using a Wiener filter on the result of the deblocking filter processing (decoded image from which a block distortion has been removed) in accordance with control performed by the PCM decoder 516, thereby improving image quality.

Alternatively, the lop filter 506 may perform arbitrary filter processing on the decoded image. Alternatively, the loop filter 506 may perform filter processing by using the filter coefficient supplied from the image encoding apparatus 300 illustrated in FIG. 7.

The loop filter 506 supplies the result of filter processing (the decoded image on which filter processing has been performed) to the adaptive shift-to-right unit 507.

The adaptive shift-to-right unit 507 is a processing unit similar to the adaptive shift-to-right unit 313 (FIG. 7), and is controlled by the PCM decoder 516. In a case where the mode is not the I_PCM mode, the adaptive shift-to-right unit 507 shifts the decoded image data supplied from the loop filter 506 in the right direction, so as to reduce the bit depth by a certain number of bits (for example, 4 bits), for example, the bit depth is decreased from 12 bits to 8 bits. That is, the adaptive shift-to-right unit 507 shifts the decoded image data to the right by the number of bits by which the image data has been shifted to the left in the image encoding apparatus 300, so as to change the bit depth of the image data to the state where shift to the left has not been performed (the state at the time when the image data is read out from the screen rearrangement buffer 302 (FIG. 7)).

The adaptive shift-to-right unit 507 supplies the image data on which shift-to-right processing has been performed to the screen rearrangement buffer 508 and the frame memory 510.

Note that the amount of shift to the right (the amount of bits) is not specified as long as the amount is the same as the amount of shift to the left in the image encoding apparatus 300 (adaptive shift-to-left unit 303). That is, the amount may be fixed or variable. For example, the amount of shift may be predetermined (shared in advance between the image encoding apparatus 300 and the image decoding apparatus 500), or the image decoding apparatus 500 may be allowed to calculate the amount of shift in the image encoding apparatus 300, or information indicating the amount of shift may be provided from the image encoding apparatus 300.

Alternatively, the shift-to-right processing may be skipped in accordance with control performed by the PCM decoder 516. For example, in the case of the I_PCM mode, image data does not undergo shift-to-left processing in the image encoding apparatus 300. Therefore, in this case, the adaptive shift-to-right unit 507 is controlled by the PCM decoder 516, and supplies the decoded image data supplied from the loop filter 506 to the screen rearrangement buffer 508 and the frame memory 510 without shifting the decoded image data in the right direction.

The screen rearrangement buffer 508 rearranges images, as in the case of the screen rearrangement buffer 207. That is, the frames which have been rearranged in an encoding order by the screen rearrangement buffer 302 illustrated in FIG. 7 are rearranged in the original display order. The screen rearrangement buffer 508 supplies the decoded image data of individual frames to the D/A converter 509 in the original display order.

The D/A converter 509 D/A-converts the frame images supplied from the screen rearrangement buffer 508, and outputs the frame images to a display (not illustrated) so that the frame images are displayed, as in the case of the D/A convertor 208.

The frame memory 510 stores the decoded image supplied from the adaptive shift-to-right unit 507, and supplies the stored decoded image as a reference image to the adaptive shift-to-left unit 511 at a certain timing.

The adaptive shift-to-left unit 511 is a processing unit similar to the adaptive shift-to-left unit 315, is controlled by the PCM decoder 516, shifts the image data (reference image) read out from the frame memory 510 in the left direction as appropriate, and increases the bit depth thereof by a certain number of bits (for example, 4 bits).

For example, in a case where the mode is not the I_PCM mode, the decoded image data supplied from the inverse orthogonal transform unit 504 to the computing unit 505 is image data which has been shifted to the left in the image encoding apparatus 300 (for example, the bit depth is 12 bits). Thus, the adaptive shift-to-left unit 511 increases the bit depth of the reference image which has been read out from the frame memory 510 by a certain number of bits (for example, increases the bit depth from 8 bits to 12 bits) in accordance with control performed by the PCM decoder 516.

Then, the adaptive shift-to-left unit 511 supplies the image data on which shift-to-left processing has been performed to the selector 512. As a result of increasing the bit depth in this way, the bit depth of the reference image can be made the same as the bit depth of the decoded image, so that the reference image can be added to the decoded image. Also, the accuracy of internal arithmetic such as prediction processing can be increased, and errors can be suppressed.

On the other hand, for example, in a case where the mode is the I_PCM mode, the decoded image data supplied from the inverse orthogonal transform unit 504 to the computing unit 505 is image data on which shift-to-left processing has not been performed in the image encoding apparatus 300 (for example, the bit depth is 8 bits). Thus, the adaptive shift-to-left unit 511 supplies the reference image read out from the frame memory 510 to the selector 512 without increasing the bit depth in accordance with control performed by the PCM decoder 156.

In the case of intra prediction, the selector 512 supplies the reference image supplied from the adaptive shift-to-left unit 511 to the intra prediction unit 513. On the other hand, in the case of inter prediction, the selector 512 supplies the reference image supplied from the adaptive shift-to-left unit 511 to the motion prediction/compensation unit 514.

The intra prediction unit 513 is supplied with information indicating the intra prediction mode, which has been obtained by decoding header information, and so forth from the lossless decoder 502 as appropriate. The intra prediction unit 513 performs intra prediction using the reference image obtained from the frame memory 510 using the intra prediction mode used by the intra prediction unit 317, and generates a prediction image. That is, the intra prediction unit 513 is also capable of performing intra prediction using an arbitrary mode other than the modes defined in the AVC coding format, like the intra prediction unit 317.

The intra prediction unit 513 supplies the generated prediction image to the selector 515.

The motion prediction/compensation unit 514 is supplied with information obtained by decoding header information (prediction mode information, motion vector information, reference frame information, flag, various parameters, etc.) from the lossless decoder 502.

The motion prediction/compensation unit 514 performs inter prediction using the reference image obtained from the frame memory 510 using the inter prediction mode used by the motion prediction/compensation unit 318, thereby generating a prediction image. That is, the motion prediction/compensation unit 514 is also capable of performing intra prediction using an arbitrary mode other than the modes defined in the AVC coding format, like the motion prediction/compensation unit 318.

The motion prediction/compensation unit 514 supplies the generated prediction image to the selector 515.

The selector 515 selects the prediction image generated by the motion prediction/compensation unit 514 or the intra prediction unit 513, and supplies the prediction image to the computing unit 505, as in the case of the selector 213.

The PCM decoder 516 controls the lossless decoder 502, the loop filter 506, the adaptive shift-to-right unit 507, and the adaptive shift-to-left unit 511 on the basis of the I_PCM_flag supplied from the lossless decoder 502.

[Lossless Decoder, PCM Decoder, and Loop Filter]

Figure 16:
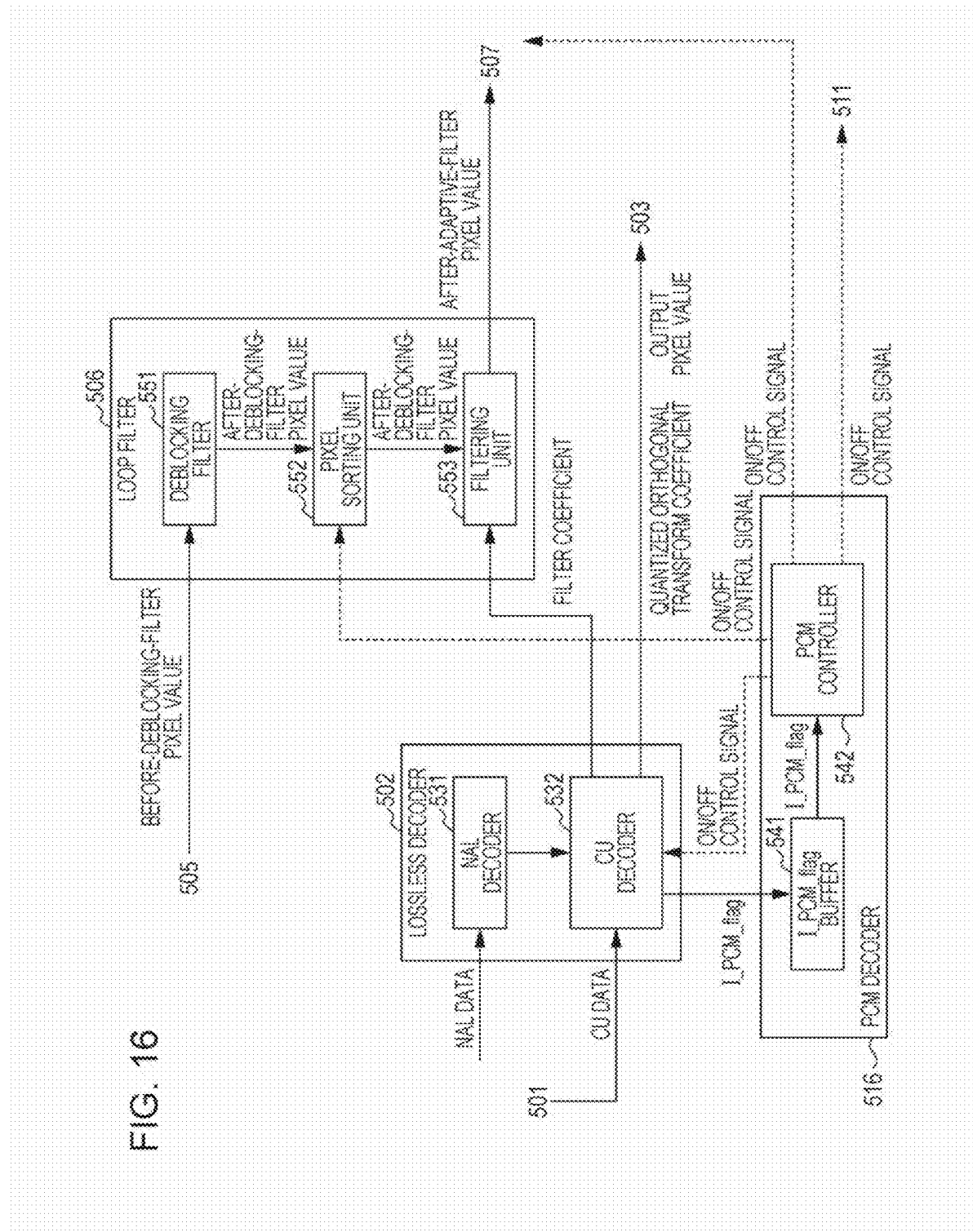
FIG. 16 is a block diagram illustrating a main example configuration of the lossless decoder, loop filter, and PCM decoder in FIG. 15.

FIG. 16 is a block diagram illustrating a main example configuration of the lossless decoder 502, the PCM decoder 516, and the loop filter 506 illustrated in FIG. 15.

As illustrated in FIG. 16, the lossless decoder 502 includes a NAL decoder 531 and a CU decoder 532. The NAL decoder 531 decodes encoded NAL data supplied from the accumulation buffer 501, and supplies the decoded NAL data to the CU decoder 532.

The CU decoder 532 decodes encoded CU data which is supplied from the accumulation buffer 501, on the basis of the NAL data supplied from the NAL decoder 531.

Also, upon obtaining an I_PCM_flag by decoding the CU data, the CU decoder 532 supplies the I_PCM_flag to the PCM decoder 516. The CU decoder 532 decodes the encoded CU data in accordance with control performed by the PCM decoder 156 based on the I_PCM_flag (on the basis of an On/Off control signal supplied from the PCM encoder 321).

For example, in a case where the I_PCM_flag has a value indicating that the mode is not the I_PCM mode, and where a control signal representing "On" is obtained from the PCM decoder 516, the CU decoder 532 decodes the encoded CU data supplied from the accumulation buffer 501 on the basis of the NAL data supplied from the NAL decoder 531, and supplies a quantized orthogonal transform coefficient to the dequantizer 503.

On the other hand, in a case where the I_PCM_flag has a value indicating that the mode is the I_PCM mode, and where a control signal representing "Off" is obtained from the PCM decoder 516, the CU decoder 532 supplies the CU data supplied from the accumulation buffer 501 (image data which is not encoded) to the dequantizer 503.

Note that the CU decoder 532 supplies information obtained by decoding the CU data, such as a filter coefficient and an adaptive filter flag, to the loop filter 506.

As illustrated in FIG. 8, the PCM decoder 516 includes an I_PCM_flag buffer 541 and a PCM controller 542.

The I_PCM_flag buffer 541 stores the I_PCM_flag supplied from the CU decoder 532 of the lossless decoder 502, and supplies the I_PCM_flag to the PCM controller 542 at a certain timing.

The PCM controller 542 determines whether or not the I_PCM mode was selected at the time of encoding in the image encoding apparatus 300, on the basis of the value of the I_PCM_flag obtained from the I_PCM_flag buffer 541. On the basis of the determination result, the PCM controller 542 supplies an On/Off control signal to the CU decoder 532, and controls the operation thereof.

For example, in a case where it is determined that the I_PCM mode was not selected, the PCM controller 542 supplies a control signal representing On to the CU decoder 532, causes the CU decoder 532 to decode the encoded CU data, and causes the CU decoder 532 to supply a quantized orthogonal transform coefficient obtained through the decoding to the dequantizer 503.

On the other hand, for example, in a case where it is determined that the I_PCM mode was selected, the PCM controller 542 supplies a control signal representing "Off" to the CU decoder 532, and causes the CU decoder 532 to supply CU data, which is non-encoded data, to the dequantizer 503 as output pixel values.

With the above-described control, the CU decoder 532 is capable of appropriately decoding encoded data supplied from the image encoding apparatus 300. That is, the CU decoder 532 is capable of decoding encoded data more appropriately even if whether or not the mode is the I_PCM mode is controlled in units of CUs, which are smaller than LCUs.

Also, the PCM controller 542 supplies an On/Off control signal to the adaptive shift-to-right unit 507 and the adaptive shift-to-left unit 511 on the basis of the determination result about the I_PCM mode, and controls the operation thereof.

For example, in a case where it is determined that the I_PCM mode was not selected, the PCM controller 542 supplies a control signal representing On to the adaptive shift-to-right unit 507 and the adaptive shift-to-left unit 511, and causes shift-to-left processing and shift-to-right processing to be performed, so that the bit precision in internal processing is increased.

On the other hand, in a case where it is determined that the I_PCM mode was selected, the PCM controller 542 supplies a control signal representing "Off" to the adaptive shift-to-right unit 507 and the adaptive shift-to-left unit 511, and causes shift-to-left processing and shift-to-right processing to be skipped, so that the bit precision in internal processing is not increased.

With the above-described control, the PCM controller 542 is capable of appropriately eliminating redundant processing even if whether or not the mode is the I_PCM mode is controlled in units of CUs, which are smaller than LCUs.

Furthermore, the PCM controller 542 supplies an On/Off control signal to the loop filter 506 on the basis of the determination result about the I_PCM mode, and controls the operation thereof. For example, in a case where it is determined that the I_PCM mode was not selected, the PCM controller 542 supplies a control signal representing On to the loop filter 506. On the other hand, for example, in a case where it is determined that the I_PCM mode was selected, the PCM controller 542 supplies a control signal representing "Off" to the loop filter 506.

With the above-described control, the PCM controller 542 is capable of eliminating redundant processing more appropriately even if whether or not the mode is the I_PCM mode is controlled in units of CUs, which are smaller than LCUs.

As illustrated in FIG. 8, the loop filter 506 includes a deblocking filter 551, a pixel sorting unit 552, and a filtering unit 553.

The deblocking filter 551 performs deblocking filter processing on the decoded image supplied from the computing unit 505 (before-deblocking-filter pixel values), thereby removing a block distortion, as in the case of the deblocking filter 206.

As in the case of the image encoding apparatus 300, deblocking filter processing is performed regardless of whether or not the mode for the target CU is the I_PCM mode. The deblocking filter 551 supplies the result of filter processing (after-deblocking-filter pixel values) to the pixel sorting unit 552.

In accordance with the value of the On/Off control signal supplied from the PCM controller 542, the pixel sorting unit 552 sorts individual results of filter processing (after-deblocking-filter pixel values) as pixel values on which adaptive loop filter processing is to be performed and pixel values on which adaptive loop filter processing is not to be performed.

For example, in a case where a control signal representing On is supplied from the PCM controller 542, the pixel sorting unit 552 sorts the after-deblocking-filter pixel values of the CU as pixel values on which adaptive loop filter processing is to be performed. In contrast, for example, in a case where a control signal representing "Off" is supplied from the PCM controller 542, the pixel sorting unit 552 sorts the after-deblocking-filter pixel values of the CU as pixel values on which adaptive loop filter processing is not to be performed.

The pixel sorting unit 552 supplies the sorted pixel values of individual pixels (after-deblocking-filter pixel values) to the filtering unit 553.

The filtering unit 553 performs adaptive loop filter processing on the pixel values which have been sorted as pixel values on which adaptive loop filter processing is to be performed, on the basis of the adaptive loop filter flag supplied from the CU decoder 532.

Adaptive loop filter processing is performed in units of certain blocks which are set independently of CUs. In a case where the value of the adaptive loop filter flag of the target block is a value indicating that filter processing has not been performed on the encoding side (for example, "0"), the filtering unit 553 skips adaptive loop filter processing for the target block, and supplies the after-deblocking-filter pixel values supplied thereto to the adaptive shift-to-right unit 507 as after-adaptive-filter pixel values.

By the way, the method for setting an adaptive loop filter flag depends on the specification and so forth of the image encoding apparatus 300. Thus, depending on the method for setting an adaptive loop filter flag by the image encoding apparatus 300, even if the value of the adaptive loop filter flag of the target block is a value indicating that filter processing has been performed on the encoding side (for example, "1"), there is a possibility that a pixel of the I_PCM mode is included in the target block.

Thus, in a case where there is a pixel value which has been sorted as a pixel value on which adaptive loop filter processing is not to be performed in the target block, the filtering unit 553 skips adaptive loop filter processing for the target block even if the value of the adaptive loop filter flag of the target block is a value indicating that filter processing has been performed on the encoding side (for example, "1"), and supplies the after-deblocking-filter pixel values supplied thereto to the adaptive shift-to-right unit 507 as after-adaptive-filter pixel values.

That is, the filtering unit 553 performs adaptive loop filter processing on the target block only in a case where the value of the adaptive loop filter flag of the target block is a value indicating that filter processing has been performed on the encoding side (for example, "1") and where all the pixels in the target block have been sorted as pixels on which adaptive loop filter processing is to be performed.

Note that, in the case of performing adaptive loop filter processing, the filtering unit 553 performs adaptive loop filter processing using the filter coefficient supplied from the CU decoder 32 (the filter coefficient used in the adaptive loop filter processing on the encoding side).

The filtering unit 553 supplies the pixel values on which adaptive loop filter processing has been performed to the adaptive shift-to-right unit 507 as after-adaptive-filter pixel values.

With the above-described control, the PCM controller 542 is capable of appropriately eliminating redundant processing even if whether or not the mode is the I_PCM mode (non-compression mode) is controlled in units of CUs, which are smaller than LCUs.

As described above, with the processing operations performed by the individual processing units, the image decoding apparatus 500 is capable of realizing enhanced encoding efficiency while suppressing a decrease in the efficiency of encoding processing.

[Flow of Decoding Processing]

Next, the flow of individual processing operations performed by the above-described image decoding apparatus 500 will be described. First, an example of the flow of decoding processing will be described with reference to the flowcharts in FIG. 17 and FIG. 18.

After decoding processing starts, in step S501, the accumulation buffer 501 accumulates an image (encoded data) transmitted thereto. In step S502, the CU decoder 532 obtains an adaptive filter flag from the encoded data accumulated in step S501. In step S503, the CU decoder 532 obtains an I_PCM_flag from the encoded data accumulated in step S501. The I_PCM_flag buffer 541 stores the I_PCM_flag.

In step S504, the PCM controller 542 determines whether or not the encoding mode of the encoded data (CU data) accumulated in step S501 is the I_PCM mode (that is, non-encoded data), on the basis of the value of the I_PCM_flag stored in the I_PCM_flag buffer 541.

If it is determined that the encoding mode is not the I_PCM mode, the PCM controller 542 causes the processing to proceed to step S505. In step S505, the lossless decoder 502 performs lossless decoding processing, decodes the encoded data (CU data) accumulated in step S501, and obtains a quantized orthogonal transform coefficient, filter coefficient, and so forth.

In step S506, the dequantizer 503 dequantizes the quantized orthogonal transform coefficient, which is obtained through the processing in step S505. In step S507, the inverse orthogonal transform unit 504 performs inverse orthogonal transform on the orthogonal transform coefficient which is dequantized through the processing in step S506, and generates decoded image data.

In step S508, the adaptive shift-to-left unit 511 obtains the reference image corresponding to the target CU from the frame memory 510, and performs shift-to-left processing on the reference image in accordance with control performed by the PCM decoder 516.

In step S509, the intra prediction unit 513 or the motion prediction/compensation unit 514 performs prediction processing using the reference image on which shift-to-left processing is performed in step S508, thereby generating a prediction image.

In step S510, the computing unit 505 adds the prediction image generated by the intra prediction unit 513 or the motion prediction/compensation unit 514 in step S509, to the difference information obtained through the processing in step S507.

In step S511, the loop filter 506 performs loop filter processing on the addition result obtained in step S510.

In step S512, the adaptive shift-to-right unit 507 performs shift-to-right processing on the result of loop filter processing obtained in step S511, in accordance with control performed by the PCM decoder 516.

In step S513, the frame memory 510 stores the decoded image data as a reference image.

In step S514, the screen rearrangement buffer 508 rearranges the frames of the decoded image data. That is, the frames of the decoded image data which have been rearranged in an encoding order by the screen rearrangement buffer 302 (FIG. 7) of the image encoding apparatus 300 are rearranged in the original display order.

In step S515, the D/A converter 509 D/A-converts the decoded image data in which the frames are rearranged in step S514. The decoded image data is output to a display (not illustrated) and the image thereof is displayed.

Figure 18:
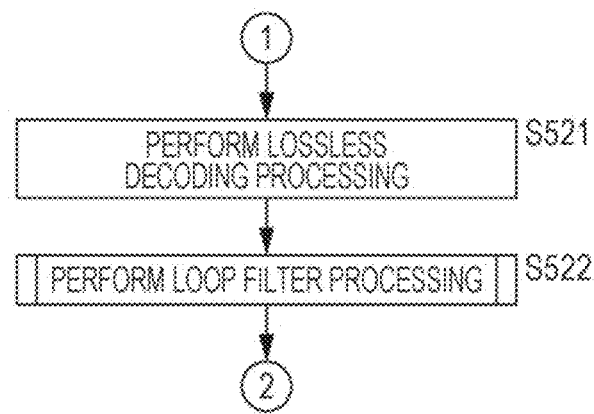
FIG. 18 is a flowchart continued from FIG. 17, describing the example of the flow of decoding processing.

Also, if it is determined in step S504 that the encoding mode is the I_PCM mode, the PCM controller 542 causes the processing to proceed to step S521 in FIG. 18. In step S521, the lossless decoder 502 performs lossless decoding processing, and regards the encoded data (non-compressed data) accumulated in step S501 as an encoding result (output pixel values).

In step S522, the loop filter 506 performs loop filter processing on the output pixel values obtained in step S521. After the processing in step S522 ends, the loop filter 506 returns the processing to step S513 in FIG. 17, so that the subsequent step is performed.

[Flow of Loop Filter Processing]

Next, an example of the flow of the loop filter processing which is performed in step S511 in FIG. 17 and step S522 in FIG. 18 will be described with reference to the flowchart in FIG. 19.

After the loop filter processing starts, in step S541, the deblocking filter 551 performs deblocking filter processing on the before-deblocking-filter pixel values which are obtained in step S510 or step S521.

In step S542, the filtering unit 553 obtains a filter coefficient. In step S543, the pixel sorting unit 552 determines whether or not adaptive loop filtering is to be performed, on the basis of the value of the adaptive loop filter flag. In a case where it is determined that adaptive loop filter processing is to be performed, the pixel sorting unit 552 causes the processing to proceed to step S544.

In step S544, the pixel sorting unit 552 sorts the after-deblocking-filter pixel values in accordance with whether or not the mode is the I_PCM mode, in accordance with control performed by the PCM controller 542.

In step S545, the filtering unit 545 performs adaptive loop filter processing on the after-deblocking-filter pixel values which have been sorted to undergo adaptive loop filter processing, by using the filter coefficient obtained in step S542. After the processing in step S545 ends, the filtering unit 545 ends the loop filter processing, the processing returns to step S511 in FIG. 17 or step S522 in FIG. 18, and the processing proceeds to step S512 in FIG. 17 or step S513 in FIG. 17.

Figure 17:
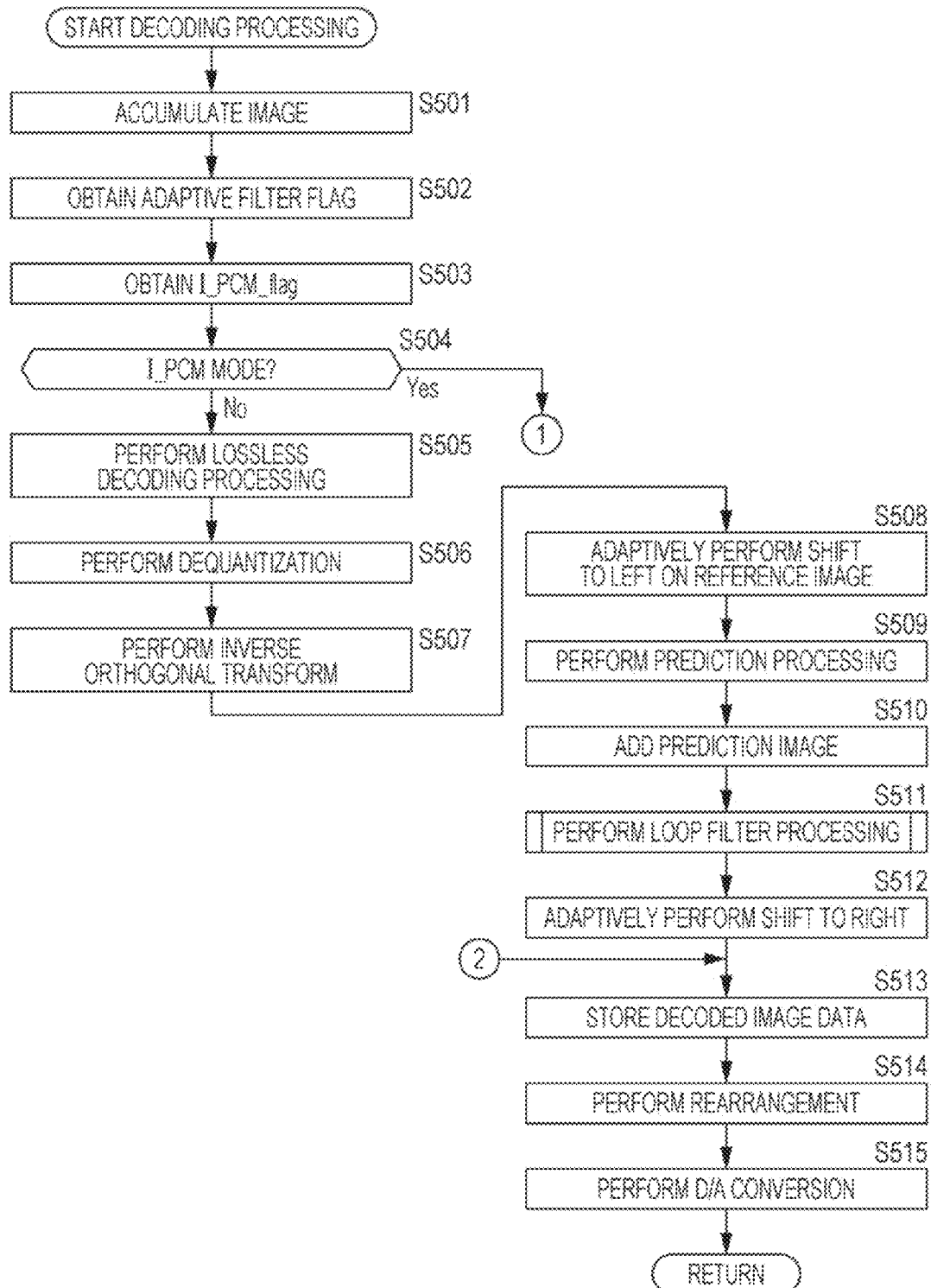
FIG. 17 is a flowchart describing an example of the flow of decoding processing.
Figure 19:
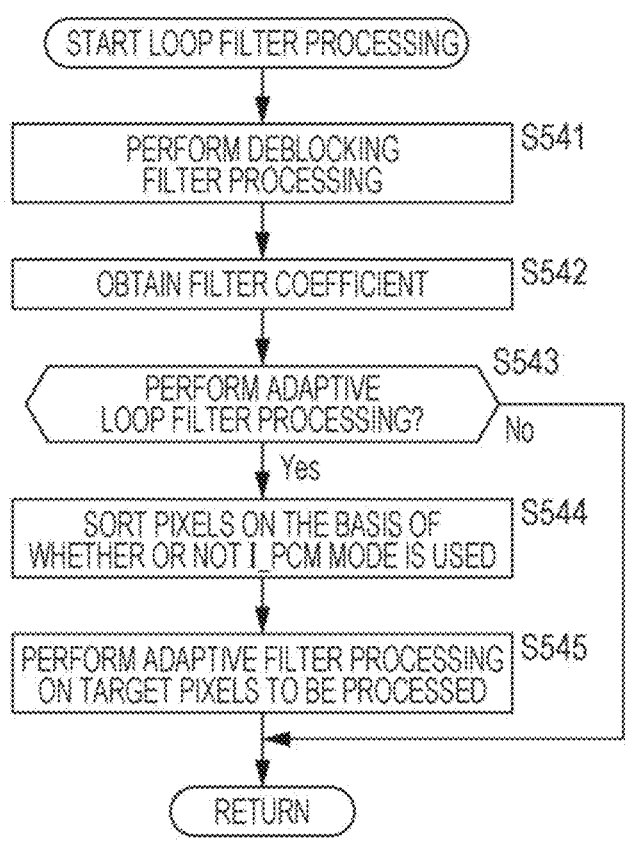
FIG. 19 is a flowchart describing an example of the flow of loop filter processing.

If it is determined in step S543 in FIG. 19 that adaptive loop filter processing is not to be performed, the pixel sorting unit 552 ends the loop filter processing, the processing returns to step S511 in FIG. 17 or step S522 in FIG. 18, and the processing proceeds to step S512 in FIG. 17 or step S513 in FIG. 17.

As a result of performing the individual processing operations in the above-described manner, the image decoding apparatus 500 is capable of realizing enhanced encoding efficiency while suppressing a decrease in the efficiency of encoding processing.

[Position of I_PCM Information]

Figure 20:
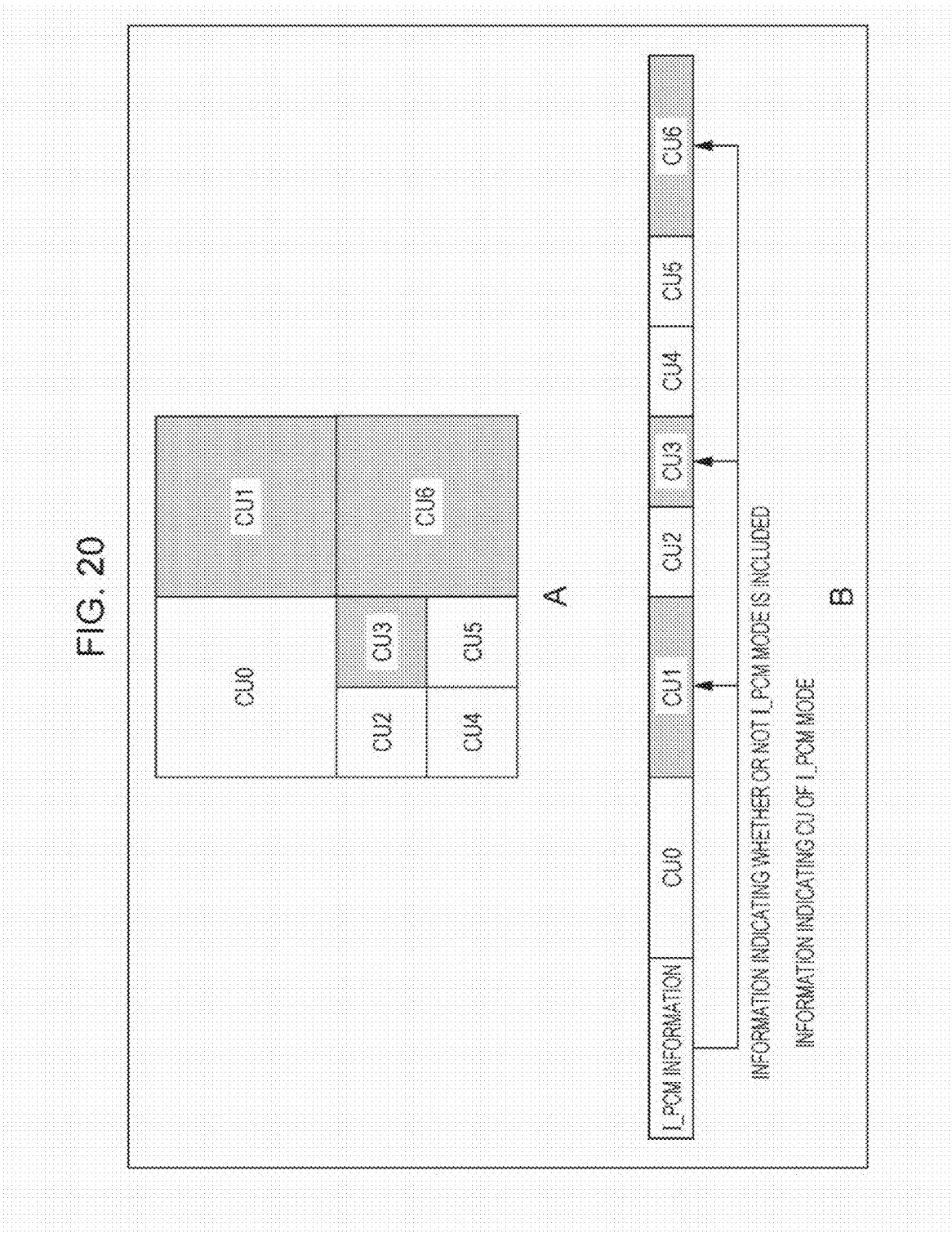
FIG. 20 is a diagram describing an example of I_PCM information.

As described above, selection control of the I_PCM mode can be performed in units of CUs, so that encoding using the I_PCM mode can be performed on only some of CUs in an LCU, as illustrated in part A of FIG. 20, for example. Part A of FIG. 20 illustrates the structure of CUs in one LCU. The LCU illustrated in part A of FIG. 20 is constituted by seven CUs, that is, CU0 to CU6. The individual numerals indicate the processing order in the LCU. In the example illustrated in part A of FIG. 20, the shaded CUs (CU1, CU3, and CU6) are to be encoded using the I_PCM mode.

In this case, as illustrated in part B of FIG. 20, I_PCM information, which is information regarding I_PCM inside the LCU, may be added at the top of the data of LCU in a code stream.

The I_PCM information includes, for example, flag information indicating whether or not the LCU includes a CU which is to be encoded using the I_PCM mode. In the case of the example illustrated in FIG. 20, CU1, CU3, and CU6 are CUs to be encoded using the I_PCM mode, and thus the flag information is set to be a value indicating that the LCU includes a CU which is to be encoded using the I_PCM mode (for example, "1").

In this way, the image encoding apparatus 300 adds information about I_PCM inside the LCU at the top of the LCU, and thereby the image decoding apparatus 500 is capable of easily determining whether or not the LCU includes a CU which is to be encoded using the I_PCM mode, before decoding the LCU.

Also, the I_PCM information includes, for example, information indicating a CU which is to be encoded using the I_PCM mode included in the LCU. In the case of the example illustrated in FIG. 20, CU1, CU3, and CU6 are CUs which are to be encoded using the I_PCM mode, and thus the I_PCM information includes information indicating these CUs (CU1, CU3, and CU6).

In this way, the image encoding apparatus 300 adds information about I_PCM inside the LCU at the top of the LCU, and thereby the image decoding apparatus 500 is capable of easily determining which CU in the LCU has been encoded using the I_PCM mode (non-compression mode), before decoding the LCU.

Note that, in the description given above, pieces of information other than image data, such as an I_PCM_flag, an adaptive filter flag, a filter coefficient, and I_PCM information, are provided from the image encoding apparatus 300 to the image decoding apparatus 500 as necessary, but these pieces of information may be added at an arbitrary position of encoded data. For example, the pieces of information may be added at the top of a CU or LCU, or may be added to a slice header, or may be stored in a sequence parameter set (SPS), a picture parameter set (PPS), or the like. Alternatively, for example, the pieces of information may be stored in a parameter set (for example, a header of a sequence or picture) of an SEI (Supplemental Enhancement Information) or the like.

Furthermore, the pieces of information may be transmitted to the decoding side separately from encoded data. In that case, it is necessary to clarify (allow the decoding side to determine) the correspondence between the pieces of information and encoded data, but the method therefor is not specified. For example, table information indicating the correspondence may be separately created, or link information indicating the other side may be embedded in the data of each side.

Alternatively, the pieces of information may be shared in advance by the image encoding apparatus 300 and the image decoding apparatus 500. In that case, transmission of the pieces of information may be omitted.

3. Third Embodiment

[Personal Computer]

The above-described series of processing operations may be executed by hardware or may be executed by software. In this case, for example, the hardware or software may be constituted as the personal computer illustrated in FIG. 21.

Figure 21:
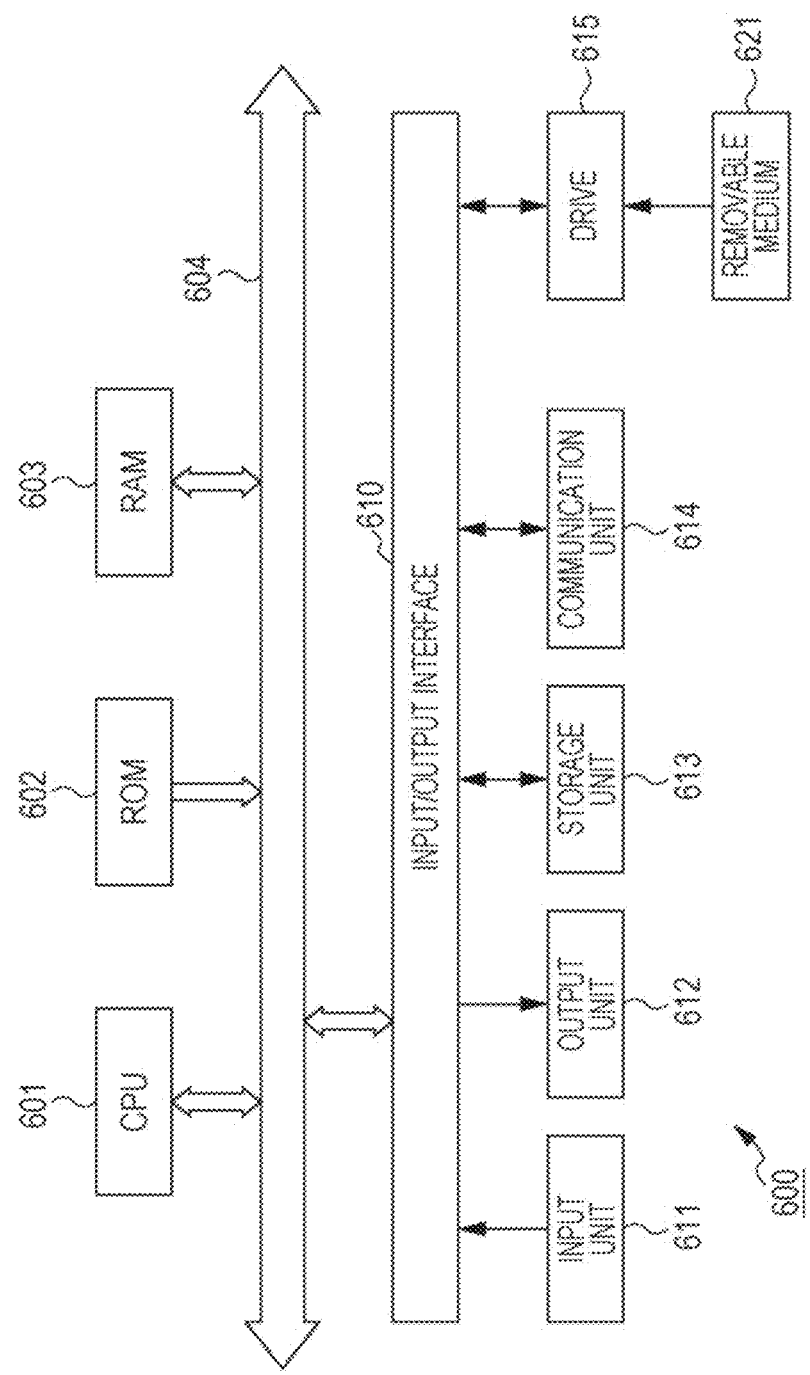
FIG. 21 is a block diagram illustrating a main example configuration of a personal computer.

In FIG. 21, a CPU (Central Processing Unit) 601 of a personal computer 600 executes various processing operations in accordance with a program stored in a ROM (Read Only Memory) 602 or a program loaded from a storage unit 613 to a RAM (Random Access Memory) 603. Also, data which is necessary for the CPU 601 to execute various processing operations is stored in the RAM 603 as appropriate.

The CPU 601, the ROM 602, and the RAM 603 are connected to one another via a bus 604. Also, an input/output interface 610 is connected to the bus 604.

An input unit 611 including a keyboard, a mouse, or the like; an output unit 612 including a display such as a CRT (Cathode Ray Tube) or an LCD (Liquid Crystal Display), and a speaker or the like; the storage unit 613 including a hard disk or the like; and a communication unit 614 including a modem or the like are connected to the input/output interface 610. The communication unit 614 performs communication processing via a network, including the Internet.

Also, a drive 615 is connected to the input/output interface 610 as necessary, a removable medium 621 such as a magnetic disk, an optical disc, a magneto-optical disc, or a semiconductor memory is loaded thereto as appropriate, and a computer program read out therefrom is installed in the storage unit 613 as necessary.

In the case of causing software to execute the above-described series of processing operations, a program constituting the software is installed via a network or a recording medium.

The recording medium is constituted by, for example, as illustrated in FIG. 21, the removable medium 621 which is provided separately from the main body of the apparatus to distribute a program to a user, which contains the program recorded thereon, and which is constituted by a magnetic disk (including a flexible disk), an optical disc (including a CD-ROM (Compact Disc-Read Only Memory) and a DVD (Digital Versatile Disc)), a magneto-optical disc (including an MD (Mini Disc)), or a semiconductor memory. Alternatively, the recording medium is constituted by the ROM 602 containing the program recorded thereon or a hard disk included in the storage unit 613, which is provided to a user in the state of being incorporated in the main body of the apparatus in advance.

The program executed by the computer may be a program in which processing operations are performed in time series in accordance with the order described in this description, or may be a program in which processing operations are performed in parallel or at necessary timings, for example, when the processing operations are called.

Also, in this description, the steps describing a program recorded on a recording medium may be processing operations which are performed in time series in accordance with the described order, or may be processing operations which are executed in parallel or individually.

Also, in this description, a "system" is an entire apparatus constituted by a plurality of devices.

Also, the configuration described above as a single device (or processing unit) may be divided into a plurality of devices (or processing units). In contrast, the configuration described above as a plurality of devices (or processing units) may be combined into a single device (or processing unit). Also, a configuration other than that described above may of course be added to the configuration of the individual devices (or processing units). Furthermore, as long as the configuration and operation of the entire system are substantially the same, part of the configuration of a certain device (or processing unit) may be included in the configuration of another device (or another processing unit). That is, the embodiments of the present technology are not limited to the above-described embodiments, and various modifications can be made without deviating from the gist of the present technology.

For example, each of the lossless encoder 307, the loop filter 312, and the PCM encoder 321 illustrated in FIG. 8 may be configured as an independent device. Also, each of the NAL encoder 331, the CU encoder 332, the I_PCM_flag generator 341, the PCM deciding unit 342, the deblocking filter 351, the pixel sorting unit 352, the filter coefficient calculator 353, and the filtering unit 354 illustrated in FIG. 8 may be configured as an independent device.

Furthermore, each of the input data amount calculator 361, the PCM determining unit 362, the encoding controller 363, the adaptive shift controller 364, and the filter controller illustrated in FIG. 9 may be configured as an independent device.

Alternatively, these processing units may be arbitrarily combined together to constitute an independent device. Of course, these processing units may be combined with an arbitrary processing unit illustrated in FIG. 7 to FIG. 9, or may be combined with a processing unit which is not illustrated.

This is the same in the image decoding apparatus 500. For example, each of the lossless decoder 502, the loop filter 506, and the PCM decoder 516 illustrated in FIG. 15 may be configured as an independent device. Also, each of the NAL decoder 531, the CU decoder 532, the I_PCM_flag buffer 541, the PCM controller 542, the deblocking filter 551, the pixel sorting unit 552, and the filtering unit 553 illustrated in FIG. 16 may be configured as an independent device.

Furthermore, these processing units may be arbitrarily combined together to constitute an independent device. Of course, these processing units may be combined with an arbitrary processing unit illustrated in FIG. 15 and FIG. 16, or may be combined with a processing unit which is not illustrated.

Also, for example, the above-described image encoding apparatus and image decoding apparatus can be applied to an arbitrary electronic apparatus. Hereinafter, examples thereof will be described.

4. Fourth Embodiment

[Television Receiver]

Figure 22:
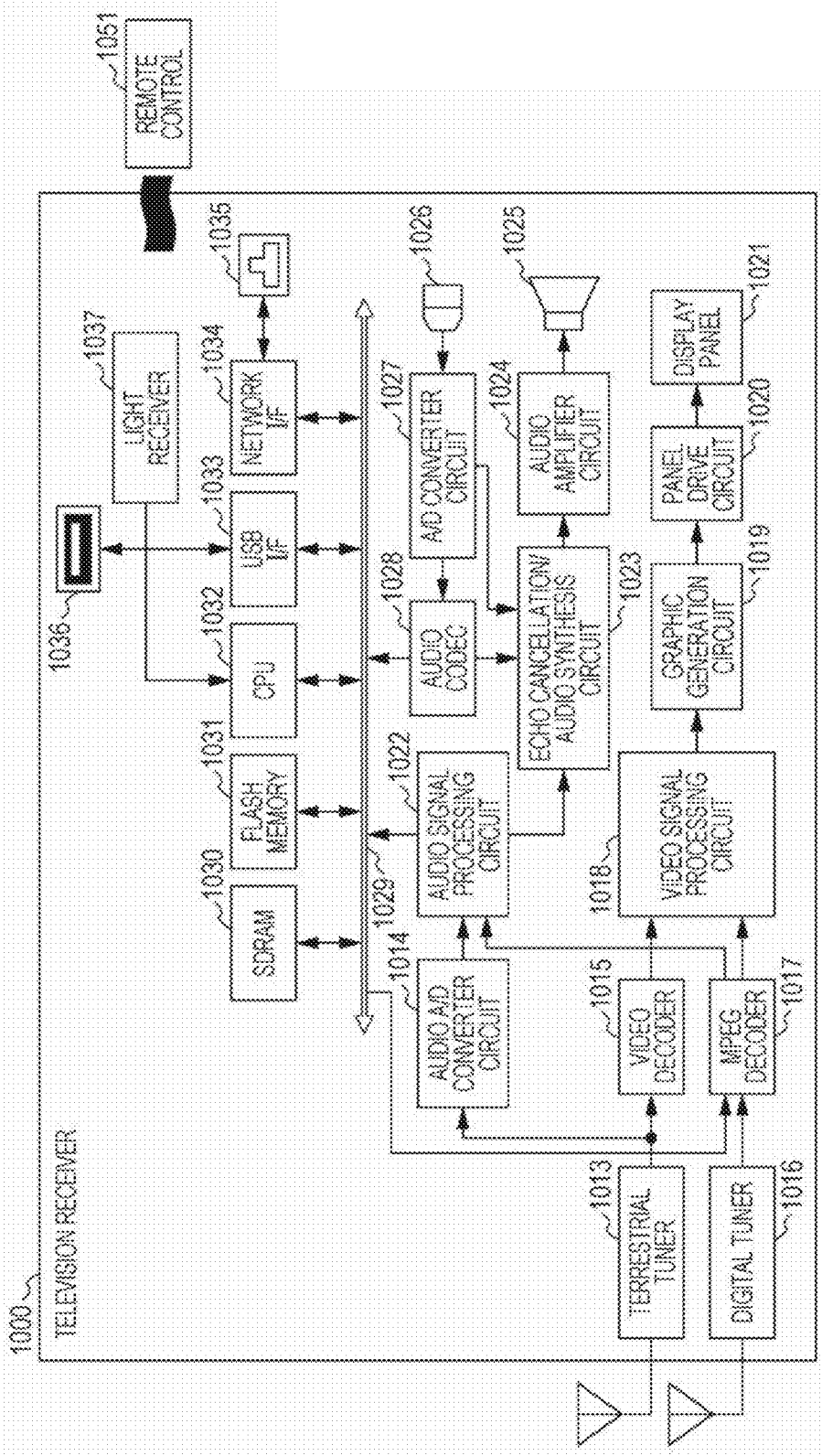
FIG. 22 is a block diagram illustrating a main example configuration of a television receiver.

FIG. 22 is a block diagram illustrating a main example configuration of a television receiver that includes the image decoding apparatus 500.

The television receiver 1000 illustrated in FIG. 22 includes a terrestrial tuner 1013, a video decoder 1015, a video signal processing circuit 1018, a graphic generation circuit 1019, a panel drive circuit 1020, and a display panel 1021.

The terrestrial tuner 1013 receives a broadcast wave signal of terrestrial analog broadcasting via an antenna, decodes the signal, obtains a video signal, and supplies the video signal to be video decoder 1015. The video decoder 1015 performs decoding processing on the video signal supplied from the terrestrial tuner 1013, and supplies a digital component signal obtained thereby to the video signal processing circuit 1018.

The video signal processing circuit 1018 performs certain processing, such as noise reduction, on the video data supplied from the video decoder 1015, and supplies the obtained video data to the graphic generation circuit 1019.

The graphic generation circuit 1019 generates, for example, video data of a program which is to be displayed on the display panel 1021, or generates image data by performing processing based on an application supplied via a network, and supplies the generated video data or image data to the panel drive circuit 1020. Also, the graphic generation circuit 1019 performs, as appropriate, processing of generating video data (graphic) for displaying a screen which is used by a user to select an item or the like, and supplying video data which is obtained by superposing the generated video data on video data of a program to the panel drive circuit 1020.

The panel drive circuit 1020 drives the display panel 1021 on the basis of the data supplied from the graphic generation circuit 1019, and causes the display panel 1021 to display video of a program or the above-described various screens.

The display panel 1021 is constituted by an LCD (Liquid Crystal Display) or the like, and displays video of a program and so forth in accordance with control performed by the panel drive circuit 1020.

Also, the television receiver 1000 includes an audio A/D (Analog/Digital) converter circuit 1014, an audio signal processing circuit 1022, an echo cancellation/audio synthesis circuit 1023, an audio amplifier circuit 1024, and a speaker 1025.

The terrestrial tuner 1013 demodulates a received broadcast wave signal, and thereby obtains an audio signal as well as a video signal. The terrestrial tuner 1013 supplies the obtained audio signal to the audio A/D converter circuit 1014.

The audio A/D converter circuit 1014 performs A/D conversion processing on the audio signal supplied from the terrestrial tuner 1013, and supplies a digital audio signal obtained thereby to the audio signal processing circuit 1022.

The audio signal processing circuit 1022 performs certain processing, such as noise reduction, on the audio data supplied from the audio A/D converter circuit 1014, and supplies audio data obtained thereby to the echo cancellation/audio synthesis circuit 1023.

The echo cancellation/audio synthesis circuit 1023 supplies the audio data supplied from the audio signal processing circuit 1022 to the audio amplifier circuit 1024.

The audio amplifier circuit 1024 performs D/A conversion processing and amplification processing on the audio data supplied from the echo cancellation/audio synthesis circuit 1023, adjusts the audio data so as to have a certain volume, and causes audio to be output from the speaker 1025.

Furthermore, the television receiver 1000 includes a digital tuner 1016 and an MPEG decoder 1017.

The digital tuner 1016 receives a broadcast wave signal of digital broadcasting (terrestrial digital broadcasting, BS (Broadcasting Satellite)/CS (Communications Satellite) digital broadcasting) via an antenna, demodulates the signal, obtains an MPEG-TS (Moving Picture Experts Group-Transport Stream), and supplies it to the MPEG decoder 1017.

The MPEG decoder 1017 descrambles the MPEG-TS supplied from the digital tuner 1016, and extracts a stream including the data of a program as a target to be reproduced (target to be viewed and listened to). The MPEG decoder 1017 decodes the audio packets constituting the extracted stream and supplies the audio data obtained thereby to the audio signal processing circuit 1022, and also decodes the video packets constituting the stream and supplies video data obtained thereby to the video signal processing circuit 1018. Also, the MPEG decoder 1017 supplies EPG (Electronic Program Guide) data extracted from the MPEG-TS to a CPU 1032 via a path which is not illustrated.

The television receiver 1000 includes the above-described image decoding apparatus 500 serving as the MPEG decoder 1017 that decodes video packets in this way. Note that the MPEG-TS transmitted from a broadcast station or the like has been encoded by the image encoding apparatus 300.

As in the case of the image decoding apparatus 500, the MPEG decoder 1017 appropriately decodes encoded data for which the selection of the I_PCM mode is controlled in units of CUs, which are smaller than LCUs. Thus, the MPEG decoder 1017 is capable of realizing a decrease in redundant processing for encoding and a decrease in redundant information included in the encoded data. Accordingly, the MPEG decoder 1017 is capable of realizing enhanced encoding efficiency while suppressing a decrease in the efficiency of encoding processing.

As in the case of the video data supplied from the video decoder 1015, the video data supplied from the MPEG decoder 1017 undergoes certain processing in the video signal processing circuit 1018, video data or the like generated in the graphic generation circuit 1019 is superposed thereon as appropriate, the video data is supplied to the display panel 1021 via the panel drive circuit 1020, and the image thereof is displayed.

As in the case of the audio data supplied from the audio A/D converter circuit 1014, the audio data supplied from the MPEG decoder 1017 undergoes certain processing in the audio signal processing circuit 1022, is supplied to the audio amplifier circuit 1024 via the echo cancellation/audio synthesis circuit 1023, and undergoes D/A conversion processing and amplification processing. As a result, audio adjusted to have a certain volume is output from the speaker 1025.

Also, the television receiver 1000 includes a microphone 1026 and an A/D converter circuit 1027.

The A/D converter circuit 1027 receives a signal of user's voice captured by the microphone 1026 that is provided in the television receiver 1000 for voice conversation, performs A/D conversion processing on the received audio signal, and supplies obtained digital audio data to the echo cancellation/audio synthesis circuit 1023.

In a case where audio data of a user (user A) of the television receiver 1000 is supplied from the A/D converter circuit 1027, the echo cancellation/audio synthesis circuit 1023 performs echo cancellation on the audio data of the user A, and causes audio data which is obtained through synthesis with other audio data to be output from the speaker 1025 via the audio amplifier circuit 1024.

Furthermore, the television receiver 1000 includes an audio codec 1028, an internal bus 1029, an SDRAM (Synchronous Dynamic Random Access Memory) 1030, a flash memory 1031, the CPU 1032, a USB (Universal Serial Bus) I/F 1033, and a network I/F 1034.

The A/D converter circuit 1027 receives a signal of user's voice captured by the microphone 1026 that is provided in the television receiver 1000 for voice conversation, performs A/D conversion processing on the received audio signal, and supplies obtained digital audio data to the audio codec 1028.

The audio codec 1028 converts the audio data supplied from the A/D converter circuit 1027 into data of a certain format for transmitting it via a network, and supplies the audio data to the network I/F 1034 via the internal bus 1029.

The network I/F 1034 is connected to a network via a cable attached to a network terminal 1035. The network I/F 1034 transmits audio data supplied from the audio codec 1028 to another apparatus connected to the network, for example. Also, the network I/F 1034 receives, via the network terminal 1035, audio data transmitted from another apparatus connected via the network, for example, and supplies the audio data to the audio codec 1028 via the internal bus 1029.

The audio codec 1028 converts the audio data supplied from the network I/F 1034 into data of a certain format, and supplies the data to the echo cancellation/audio synthesis circuit 1023.

The echo cancellation/audio synthesis circuit 1023 performs echo cancellation on the audio data supplied from the audio codec 1028, and causes audio data obtained through synthesis with other audio data to be output from the speaker 1025 via the audio amplifier circuit 1024.

The SDRAM 1030 stores various pieces of data necessary for the CPU 1032 to perform processing.

The flash memory 1031 stores a program executed by the CPU 1032. The program stored in the flash memory 1031 is read out by the CPU 1032 at a certain timing, for example, at the start-up of the television receiver 1000. The flash memory 1031 also stores EPG data obtained via digital broadcasting and data obtained from a certain server via a network.

For example, the flash memory 1031 stores an MPEG-TS including content data obtained from a certain server via a network under control performed by the CPU 1032. The flash memory 1031 supplies the MPEG-TS to the MPEG decoder 1017 via the internal bus 1029, for example, under control performed by the CPU 1032.

The MPEG decoder 1017 processes the MPEG-TS, as in the case of the MPEG-TS supplied from the digital tuner 1016. In this way, the television receiver 1000 is capable of receiving content data of video, audio, or the like via a network, decoding the data using the MPEG decoder 1017, and causing the video to be displayed or the audio to be output.

Also, the television receiver 1000 includes a light receiver 1037 that receives an infrared signal transmitted from a remote control 1051.

The light receiver 1037 receives an infrared ray from the remote control 1051, and outputs a control code representing the detail of a user operation obtained through demodulation to the CPU 1032.

The CPU 1032 executes a program stored in the flash memory 1031, and controls the entire operation of the television receiver 1000 in accordance with a control code or the like supplied from the light receiver 1037. The CPU 1032 is connected to the individual units of the television receiver 1000 via paths which are not illustrated.

The USB I/F 1033 transmits data to/receives data from an external apparatus of the television receiver 1000, the apparatus being connected via a USB cable attached to a USB terminal 1036. The network I/F 1034 connects to a network via a cable attached to the network terminal 1035, and transmits/receives data other than audio data to/from various apparatuses connected to the network.

The television receiver 1000 includes the image decoding apparatus 500 serving as the MPEG decoder 1017, thereby being capable of realizing enhancement of encoding efficiency of content data while suppressing a decrease in the efficiency of encoding processing at the time of generating the content data, which is obtained via a broadcast wave signal received via an antenna or a network.

5. Fifth Embodiment

[Mobile Phone]

Figure 23:
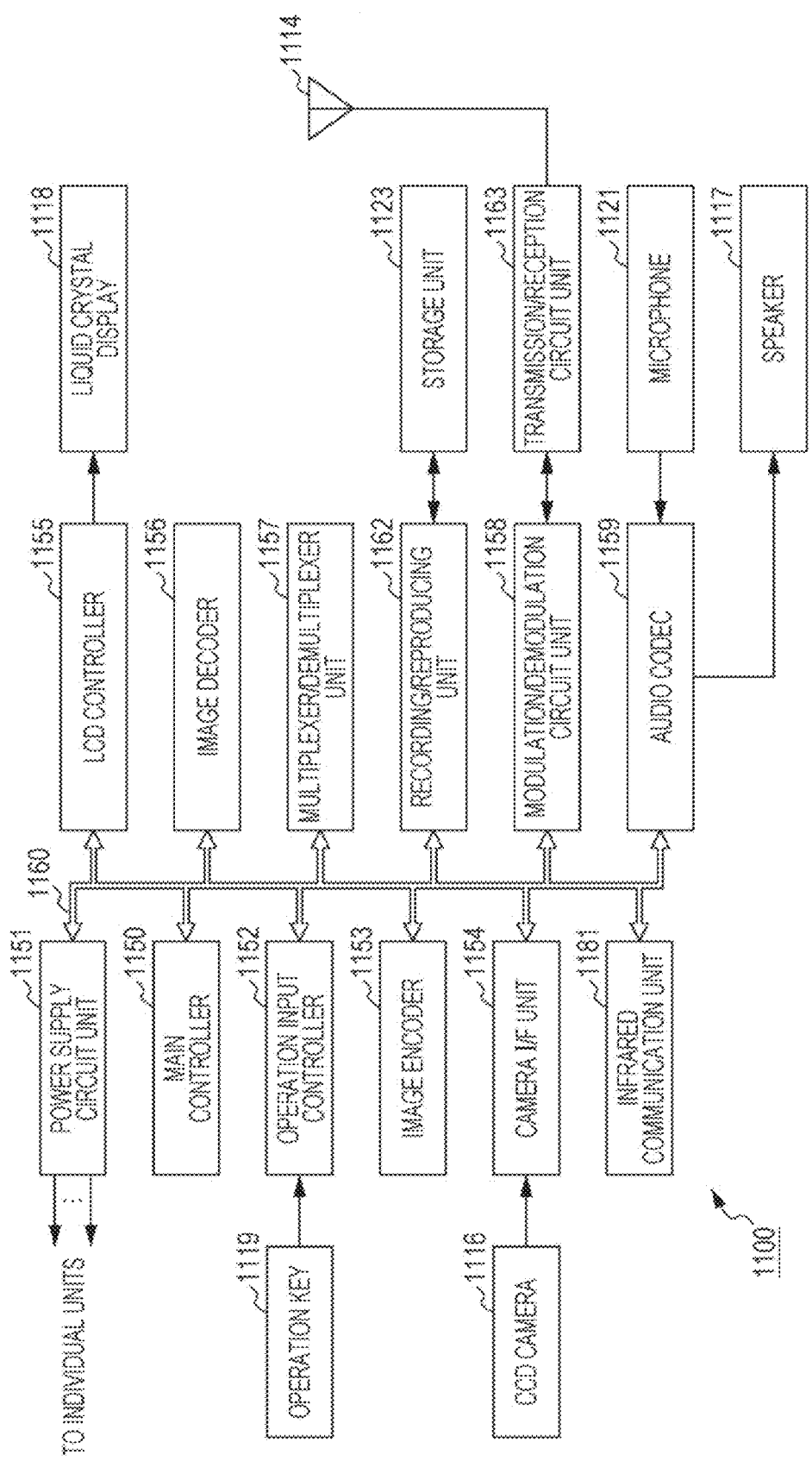
FIG. 23 is a block diagram illustrating a main example configuration of a mobile phone.

FIG. 23 is a block diagram illustrating a main example configuration of a mobile phone that includes the image encoding apparatus 300 and the image decoding apparatus 500.

The mobile phone 1100 illustrated in FIG. 23 includes a main controller 1150 configured to collectively control individual units, a power supply circuit unit 1151, an operation input controller 1152, an image encoder 1153, a camera I/F unit 1154, an LCD controller 1155, an image decoder 1156, a multiplexer/demultiplexer unit 1157, a recording/reproducing unit 1162, a modulation/demodulation circuit unit 1158, and an audio codec 1159. These are connected to one another via a bus 1160.

Also, the mobile phone 1100 includes an operation key 1119, a CCD (Charge Coupled Devices) camera 1116, a liquid crystal display 1118, a storage unit 1123, a transmission/reception circuit unit 1163, an antenna 1114, a microphone 1121, and a speaker 1117.

When a call ends or a power key is turned on through a user operation, the power supply circuit unit 1151 supplies power from a battery pack to the individual units, thereby bringing the mobile phone 1100 into an operable state.

The mobile phone 1100 performs various operations, such as transmission/reception of an audio signal, transmission/reception of an electronic mail or image data, image capturing, or data recording, in various modes, such as an audio call mode or a data communication mode, on the basis of control performed by the main controller 1150, which includes a CPU, a ROM, a RAM, and so forth.

For example, in the audio call mode, the mobile phone 1100 converts an audio signal collected by the microphone 1121 into digital audio data using the audio codec 1159, performs spectrum spread processing thereon using the modulation/demodulation circuit unit 1158, and performs digital-to-analog conversion processing and frequency conversion processing using the transmission/reception circuit unit 1163. The mobile phone 1100 transmits a signal to be transmitted obtained though the conversion processing to a base station (not illustrated) via the antenna 1114. The signal to be transmitted (audio signal) transmitted to the base station is supplied to a mobile phone of the other end of a call via a public telephone line network.

Also, for example, in the audio call mode, the mobile phone 1100 amplifies a reception signal received by the antenna 1114 using the transmission/reception circuit unit 1163, further performs frequency conversion processing and analog-to-digital conversion processing, performs spectrum inverse spread processing using the modulation/demodulation circuit unit 1158, and converts the signal into an analog audio signal using the audio codec 1159. The mobile phone 1100 outputs the analog audio signal obtained through the conversion from the speaker 1117.

Furthermore, for example, in the case of transmitting an electronic mail in the data communication mode, the mobile phone 1100 accepts, in the operation input controller 1152, the text data of the electronic mail input through an operation of the operation key 1119. The mobile phone 1100 processes the text data using the main controller 1150, and causes the text data to be displayed as an image on the liquid crystal display 1118 via the LCD controller 1155.

Also, the mobile phone 1100 generates, in the main controller 1150, electronic mail data on the basis of the text data or a user instruction accepted by the operation input controller 1152. The mobile phone 1100 performs spectrum spread processing on the electronic mail data using the modulation/demodulation circuit unit 1158, and performs digital-to-analog conversion processing and frequency conversion processing using the transmission/reception circuit unit 1163. The mobile phone 1100 transmits a signal to be transmitted obtained through the conversion processing to a base station (not illustrated) via the antenna 1114. The signal to be transmitted (electronic mail) transmitted to the base station is supplied to a certain destination via a network and a mail server or the like.

Also, for example, in the case of receiving an electronic mail in the data communication mode, the mobile phone 1100 receives a signal transmitted from the base station via the antenna 1114 using the transmission/reception circuit unit 1163, amplifies the signal, and further performs frequency conversion processing and analog-to-digital conversion processing. The mobile phone 1100 performs spectrum inverse spread processing on the received signal using the modulation/demodulation circuit unit 1158 to restore original electronic mail data. The mobile phone 1100 displays the restored electronic mail data on the liquid crystal display 1118 via the LCD controller 1155.

Additionally, the mobile phone 1100 is also capable of causing the received electronic mail data to be recorded (stored) in the storage unit 1123 via the recording/reproducing unit 1162.

The storage unit 1123 is an arbitrary rewritable storage medium. The storage unit 1123 may be, for example, a semiconductor memory, such as a RAM or a built-in flash memory, a hard disk, or a removable medium, such as a magnetic disk, a magneto-optical disc, an optical disc, a USB memory, or a memory card. Of course, other types of media may be used.

Furthermore, for example, in the case of transmitting image data in the data communication mode, the mobile phone 1100 generates image data through image capturing using the CCD camera 1116. The CCD camera 1116 includes optical devices, such as a lens and a diaphragm, and a CCD serving as a photoelectric conversion element, captures an image of a subject, converts the intensity of received light into an electric signal, and generates image data of the image of the subject. The CCD camera 1116 encodes the image data using the image encoder 1153 via the camera I/F unit 1154, thereby converting the image data into encoded image data.

The mobile phone 1100 includes the above-described image encoding apparatus 300 serving as the image encoder 1153 that performs the above-described processing. As in the case of the image encoding apparatus 300, the image encoder 1153 controls the selection of the I_PCM mode in units of CUs, which are smaller than LCUs. That is, the image encoder 1153 is capable of further reducing redundant processing for encoding, and is also capable of further reducing redundant information included in encoded data. Accordingly, the image encoder 1153 is capable of enhancing encoding efficiency while suppressing a decrease in the efficiency of encoding processing.

In addition, at the same time, the mobile phone 1100 performs, in the audio codec 1159, analog-to-digital conversion on audio collected by the microphone 1121 during image capturing by the CCD camera 1116, and also encodes it.

The mobile phone 1100 multiplexes, in the multiplexer/demultiplexer unit 1157, the encoded image data supplied from the image encoder 1153 and the digital audio data supplied from the audio codec 1159 using a certain method. The mobile phone 1100 performs spectrum spread processing on the multiplexed data obtained as a result using the modulation/demodulation circuit unit 1158, and performs digital-to-analog conversion processing and frequency conversion processing using the transmission/reception circuit unit 1163. The mobile phone 1100 transmits a signal to be transmitted obtained through the conversion processing to a base station (not illustrated) via the antenna 1114. The signal to be transmitted (image data) which has been transmitted to the base station is supplied to the other end of communication via a network or the like.

Note that, in the case of not transmitting image data, the mobile phone 1100 is capable of causing the image data generated by the CCD camera 1116 to be displayed on the liquid crystal display 1118 via the LCD controller 1155, not via the image encoder 1153.

Also, for example, in the case of receiving data of a moving image file that is linked to a simple web page or the like in the data communication mode, the mobile phone 1100 receives a signal transmitted from a base station via the antenna 1114 using the transmission/reception circuit unit 1163, amplifies the signal, and further performs frequency conversion processing and analog-to-digital conversion processing thereon. The mobile phone 1100 performs spectrum inverse spread processing on the received signal to restore original multiplexed data using the modulation/demodulation circuit unit 1158. The mobile phone 1100 demultiplexes the multiplexed data into encoded image data and audio data using the multiplexer/demultiplexer unit 1157.

The mobile phone 1100 decodes the encoded image data using the image decoder 1156 to generate reproduced moving image data, and causes the data to be displayed on the liquid crystal display 1118 via the LCD controller 1155. Accordingly, for example, the moving image data included in the moving image file linked to the simple web page is displayed on the liquid crystal display 1118.

The mobile phone 1100 includes the above-described image decoding apparatus 500 serving as the image decoder 1156 for performing such processing. That is, as in the case of the image decoding apparatus 500, the image decoder 1156 appropriately decodes encoded data for which the selection of the I_PCM mode is controlled in units of CUs, which are smaller than LCUs. Thus, the image decoder 1156 is capable of realizing a decrease in redundant processing for encoding and a decrease in redundant information included in the encoded data. Accordingly, the image decoder 1156 is capable of realizing enhanced encoding efficiency while suppressing a decrease in the efficiency of encoding processing.

At this time, the mobile phone 1100 converts digital audio data into an analog audio signal using the audio codec 1159, and causes the signal to be output from the speaker 1117. Accordingly, for example, audio data included the moving image file linked to the simple web page is reproduced.

Note that, as in the case of an electronic mail, the mobile phone 1100 is also capable of causing the received data linked to the simple web page or the like to be recorded (stored) in the storage unit 1123 via the recording/reproducing unit 1162.

Also, the mobile phone 1100 is capable of analyzing a two-dimensional code obtained by the CCD camera 1116 through image capturing and obtaining information recorded in the two-dimensional code using the main controller 1150.

Furthermore, the mobile phone 1100 is capable of communicating with an external apparatus through an infrared ray using an infrared communication unit 1181.

By including the image encoding device 300 serving as the image encoder 1153, the mobile phone 1100 is capable of enhancing encoding efficiency while suppressing a decrease in the efficiency of encoding processing, for example, when encoding and transmitting image data generated by the CCD camera 1116.

Also, by including the image decoding apparatus 500 serving as the image decoder 1156, the mobile phone 1100 is capable of realizing enhanced encoding efficiency of data while suppressing a decrease in the efficiency of encoding processing at the time of generating the data (encoded data) of a moving image file linked to a simple web page or the like.

Note that, although a description has been given above that the mobile phone 1100 includes the CCD camera 1116, an image sensor using a CMOS (Complementary Metal Oxide Semiconductor) (CMOS image sensor) may be used instead of the CCD camera 1116. In this case, too, the mobile phone 1100 is capable of capturing an image of a subject and generating image data of the image of the subject, as in the case of using the CCD camera 1116.

Also, although a description has been given above of the mobile phone 1100, the image encoding apparatus 300 and the image decoding apparatus 500 can be applied to any apparatus having an image capturing function and a communication function similar to those of the mobile phone 1100, such as a PDA (Personal Digital Assistants), a smart phone, a UMPC (Ultra Mobile Personal Computer), a net book, or a notebook personal computer, as in the case of the mobile phone 1100.

6. Sixth Embodiment

[Hard Disk Recorder]

Figure 24:
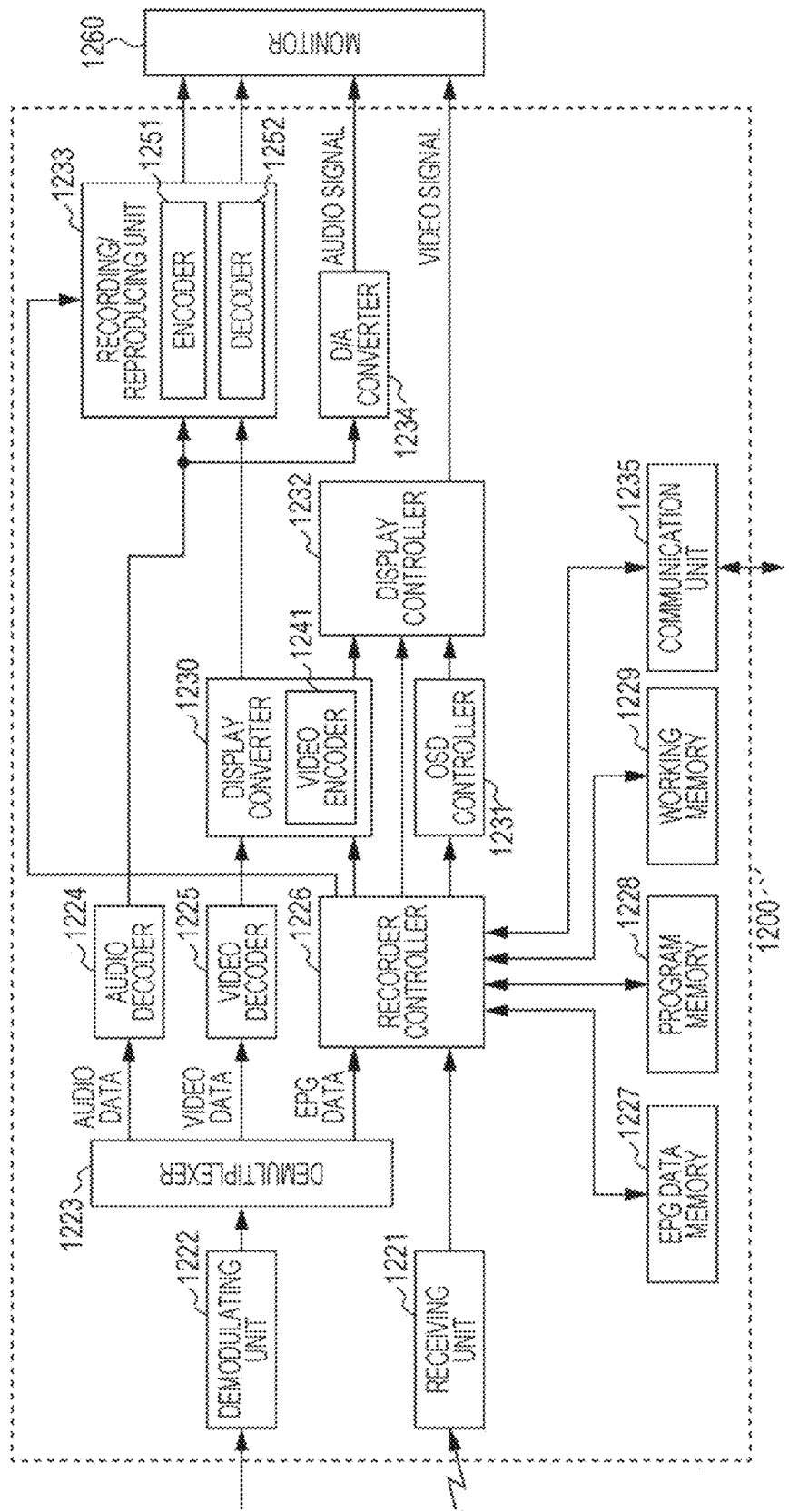
FIG. 24 is a block diagram illustrating a main example configuration of a hard disk recorder.

FIG. 24 is a block diagram illustrating a main example configuration of a hard disk recorder that includes the image encoding apparatus 300 and the image decoding apparatus 500.

The hard disk recorder (HDD recorder) 1200 illustrated in FIG. 24 is an apparatus that stores, in a hard disk built therein, audio data and video data of a broadcast program included in a broadcast wave signal (television signal) that is transmitted by a satellite, an antenna on the ground, or the like and that is received by a tuner, and that provides the stored data to a user at a timing corresponding to an instruction provided by the user.

The hard disk recorder 1200 is capable of, for example, extracting audio data and video data from a broadcast wave signal, appropriately decoding them, and causing them to be stored in the hard disk built therein. Also, the hard disk recorder 1200 is capable of, for example, obtaining audio data and video data from another apparatus via a network, appropriately decoding them, and causing them to be stored in the hard disk built therein.

Furthermore, the hard disk recorder 1200 is capable of, for example, decoding audio data and video data recorded on the hard disk built therein, supplying them to a monitor 1260, causing the image thereof to be displayed on the screen of the monitor 1260, and causing the audio thereof to be output from the speaker of the monitor 1260. Also, the hard disk recorder 1200 is capable of, for example, decoding audio data and video data extracted from a broadcast wave signal obtained via a tuner or audio data and video data obtained from another apparatus via a network, supplying them to the monitor 1260, causing the image thereof to be displayed on the screen of the monitor 1260, and causing the audio thereof to be output from the speaker of the monitor 1260.

Of course, another operation can be performed.

As illustrated in FIG. 24, the hard disk recorder 1200 includes a receiving unit 1221, a demodulating unit 1222, a demultiplexer 1223, an audio decoder 1224, a video decoder 1225, and a recorder controller 1226. The hard disk recorder 1200 further includes an EPG data memory 1227, a program memory 1228, a working memory 1229, a display converter 1230, an OSD (On Screen Display) controller 1231, a display controller 1232, a recording/reproducing unit 1233, a D/A converter 1234, and a communication unit 1235.

Also, the display converter 1230 includes a video encoder 1241. The recording/reproducing unit 1233 includes an encoder 1251 and a decoder 1252.

The receiving unit 1221 receives an infrared signal from a remote control (not illustrated), converts the signal into an electric signal, and outputs the electric signal to the recorder controller 1226. The recorder controller 1226 is constituted by, for example, a microprocessor or the like, and executes various processing operations in accordance with a program stored in the program memory 1228. At this time, the recorder controller 1226 uses the working memory 1229 as necessary.

The communication unit 1235 is connected to a network, and performs communication processing with another apparatus via the network. For example, the communication unit 1235 is controlled by the recorder controller 1226, communicates with a tuner (not illustrated), and outputs a channel selection control signal mainly to the tuner.

The demodulating unit 1222 demodulates the signal supplied from the tuner and outputs the signal to the demultiplexer 1223. The demultiplexer 1223 demultiplexes the data supplied from the demodulating unit 1222 into audio data, video data, and EPG data, and outputs them to the audio decoder 1224, the video decoder 1225, and the recorder controller 1226, respectively.

The audio decoder 1224 decodes the audio data input thereto, and outputs the audio data to the recording/reproducing unit 1233. The video decoder 1225 decodes the video data input thereto, and outputs the video data to the display converter 1230. The recorder controller 1226 supplies the EPG data input thereto to the EPG data memory 1227 so as to store it therein.

The display converter 1230 encodes, with the video encoder 1241, the video data supplied from the video decoder 1225 or the recorder controller 1226 into video data of an NTSC (National Television Standards Committee) format, for example, and outputs the video data to the recording/reproducing unit 1233. Also, the display converter 1230 converts the size of the screen of the video data supplied from the video decoder 1225 or the recorder controller 1226 into the size corresponding to the size of the monitor 1260, converts the video data into video data of the NTSC format with the video encoder 1241, converts the video data into an analog signal, and outputs the analog signal to the display controller 1232.

The display controller 1232 superposes the OSD signal output from the OSD (On Screen Display) controller 1231 on the video signal input from the display converter 1230 under control performed by the recorder controller 1226, outputs it to the display of the monitor 1260, and causes it to be displayed thereon.

Also, the monitor 1260 is supplied with the audio data which has been output from the audio decoder 1224 and which has been converted into an analog signal by the D/A converter 1234. The monitor 1260 outputs this audio signal from the speaker built therein.

The recording/reproducing unit 1233 includes a hard disk serving as a storage medium for holding video data, audio data, and the like recorded thereon.

The recording/reproducing unit 1233 encodes, with the encoder 1251, the audio data supplied from the audio decoder 1224, for example. Also, the recording/reproducing unit 1233 encodes, with the encoder 1251, the video data supplied from the video encoder 1241 of the display converter 1230. The recording/reproducing unit 1233 combines, with a multiplexer, the encoded data of the audio data and the encoded data of the video data. The recording/reproducing unit 1233 performs channel coding on the composite data to amplify it, and writes the data on the hard disk via a recording head.

The recording/reproducing unit 1233 reproduces the data recorded on the hard disk via a reproducing head, amplifies the data, and demultiplexes the data into audio data and video data using a demultiplexer. The recording/reproducing unit 1233 decodes, with the decoder 1252, the audio data and the video data. The recording/reproducing unit 1233 D/A-converts the decoded audio data and outputs the audio data to the speaker of the monitor 1260. Also, the recording/reproducing unit 1233 D/A-converts the decoded video data and outputs the video data to the display of the monitor 1260.

The recorder controller 1226 reads out the latest EPG data from the EPG data memory 1227 on the basis of a user instruction represented by an infrared signal which is supplied from the remote control and which is received via the receiving unit 1221, and supplies the EPG data to the OSD controller 1231. The OSD controller 1231 generates image data corresponding to the input EPG data, and outputs the image data to the display controller 1232. The display controller 1232 outputs the video data input from the OSD controller 1231 to the display of the monitor 1260, and causes the video data to be displayed thereon. Accordingly, an EPG (electronic program guide) is displayed on the display of the monitor 1260.

Also, the hard disk recorder 1200 is capable of obtaining various pieces of data, such as video data, audio data, or EPG data, supplied from another apparatus via a network, such as the Internet.

The communication unit 1235 is controlled by the recorder controller 1226, obtains encoded data of video data, audio data, EPG data, and so forth transmitted from another apparatus via a network, and supplies the encoded data to the recorder controller 1226. For example, the recorder controller 1226 supplies the obtained encoded data of video data and audio data to the recording/reproducing unit 1233, and causes the hard disk to store the encoded data. At this time, the recorder controller 1226 and the recording/reproducing unit 1233 may perform processing, such as re-encoding, as necessary.

Also, the recorder controller 1226 decodes the obtained encoded data of video data and audio data, and supplies the obtained video data to the display converter 1230. The display converter 1230 processes the video data supplied from the recorder controller 1226, like the video data supplied from the video decoder 1225, supplies the video data to the monitor 1260 via the display controller 1232, and causes the image thereof to be displayed thereon.

Also, in accordance with display of the image, the recorder controller 1226 may supply decoded audio data to the monitor 1260 via the D/A converter 1234 and cause the audio to be output from the speaker.

Furthermore, the recorder controller 1226 decodes the obtained encoded data of the EPG data, and supplies the decoded EPG data to the EPG data memory 1227.

The hard disk recorder 1200 described above includes the image decoding apparatus 500 serving as the video decoder 1225, the decoder 1252, and the decoder included in the recorder controller 1226. That is, the video decoder 1225, the decoder 1252, and the decoder included in the recorder controller 1226 appropriately decodes encoded data for which the selection of the I_PCM mode is controlled in units of CUs, which are smaller than LCUs, as in the case of the image decoding apparatus 500. Accordingly, the video decoder 1225, the decoder 1252, and the decoder included in the recorder controller 1226 is capable of realizing a decrease in redundant processing for encoding and a decrease in redundant information included in the encoded data. Accordingly, the video decoder 1225, the decoder 1252, and the decoder included in the recorder controller 1226 are capable of realizing enhanced encoding efficiency while suppressing a decrease in the efficiency of encoding processing.

Therefore, the hard disk recorder 1200 is capable of realizing enhanced encoding efficiency of data while suppressing a decrease in the efficiency of encoding processing when generating video data (encoded data) received by the tuner or the communication unit 1235 or video data (encoded data) reproduced by the recording/reproducing unit 1233.

Also, the hard disk recorder 1200 includes the image encoding apparatus 300 serving as the encoder 1251. Thus, the encoder 1251 controls the selection of the I_PCM mode in units of CUs, which are smaller than LCUs, as in the case of the image encoding apparatus 300. That is, the encoder 1251 is capable of further reducing redundant processing for encoding and is also capable of reducing redundant information included in encoded data. Accordingly, the encoder 1251 is capable of enhancing encoding efficiency while suppressing a decrease in the efficiency of encoding processing.

Therefore, the hard disk recorder 1200 is capable of enhancing encoding efficiency while suppressing a decrease in the efficiency of encoding processing, for example, when generating encoded data to be recorded on a hard disk.

Note that, although a description has been given above of the hard disk recorder 1200 that records video data and audio data on a hard disk, any types of recording media may of course be used. For example, the image encoding apparatus 300 and the image decoding apparatus 500 can be applied to a recorder that uses a recording medium other than a hard disk, for example, a flash memory, an optical disc, or video tape, as in the case of the above-described hard disk recorder 1200.

7. Seventh Embodiment

[Camera]

Figure 25:
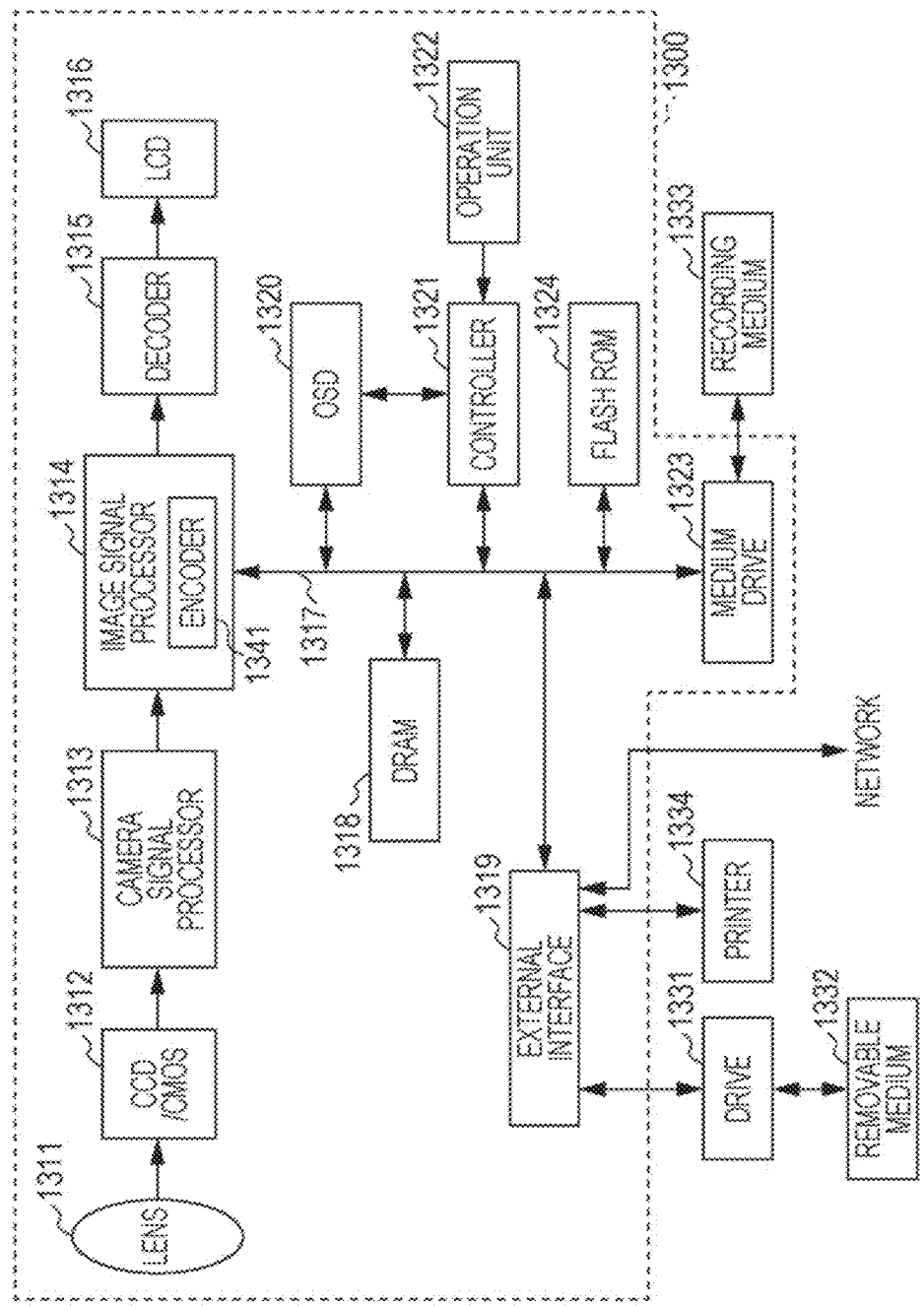
FIG. 25 is a block diagram illustrating a main example configuration of a camera.

FIG. 25 is a block diagram illustrating a main example configuration of a camera that includes the image encoding apparatus 300 and the image decoding apparatus 500.

The camera 1300 illustrated in FIG. 25 captures an image of a subject, causes an LCD 1316 to display the image of the subject, and records it as image data on a recording medium 1333.

A lens block 1311 causes light (that is, an image of a subject) to enter a CCD/CMOS 1312. The CCD/CMOS 1312 is an image sensor including a CCD or CMOS, converts the intensity of received light into an electric signal, and supplies the electric signal to a camera signal processor 1313.

The camera signal processor 1313 converts the electric signal supplied from the CCD/CMOS 1312 into color-difference signals of Y, Cr, and Cb, and supplies them to an image signal processor 1314. The image signal processor 1314 performs certain image processing on an image signal supplied from the camera signal processor 1313 and encodes, with an encoder 1341, the image signal under control performed by a controller 1321. The image signal processor 1314 supplies encoded data which is generated by encoding the image signal to a decoder 1315. Furthermore, the image signal processor 1314 obtains data to be displayed generated by an on screen display (OSD) 1320, and supplies the data to the decoder 1315.

In the foregoing process, the camera signal processor 1313 uses a DRAM (Dynamic Random Access Memory) 1318 connected via a bus 1317 as appropriate, and causes the DRAM 1318 to hold image data, encoded data obtained by encoding the image data, or the like as necessary.

The decoder 1315 decodes encoded data supplied from the image signal processor 1314, and supplies the image data obtained thereby (decoded image data) to the LCD 1316. Also, the decoder 1315 supplies the data to be displayed supplied from the image signal processor 1314 to the LCD 1316. The LCD 1316 combines the image of the decoded image data supplied from the decoder 1315 and the image of the data to be displayed as appropriate, and displays the composite image.

The on screen display 1320 outputs data to be displayed, such as a menu screen made up of symbols, characters, or figures, and icons, to the image signal processor 1314 via the bus 1317 under control performed by the controller 1321.

The controller 1321 executes various processing operations on the basis of a signal representing the detail of an instruction provided from a user using an operation unit 1322, and controls the image signal processor 1314, the DRAM 1318, an external interface 1319, the on screen display 1320, a medium drive 1323, and so forth via the bus 1317. Programs, data, and so forth which are necessary for the controller 1321 to execute various processing operations are stored in a flash ROM 1324.

For example, the controller 1321 is capable of encoding image data stored in the DRAM 1318 and decoding encoded data stored in the DRAM 1318 on behalf of the image signal processor 1314 or the decoder 1315. At this time, the controller 1321 may perform encoding/decoding processing using a format similar to an encoding/decoding format of the image signal processor 1314 or the decoder 1315, or may perform encoding/decoding processing using a format incompatible with the image signal processor 1314 or the decoder 1315.

Also, for example, in a case where an instruction to start printing an image is provided from the operation unit 1322, the controller 1321 reads out image data from the DRAM 1318 and supplies it to a printer 1334 connected to the external interface 1319 via the bus 1317 to print it.

Furthermore, for example, in a case where an instruction to record an image is provided from the operation unit 1322, the controller 1321 reads out encoded data from the DRAM 1318 and supplies it to the recording medium 1333 loaded in the medium drive 1323 via the bus 1317 to store it.

The recording medium 1333 is, for example, an arbitrary readable and writable removable medium, such as a magnetic disk, a magneto-optical disc, an optical disc, or a semiconductor memory. Of course, the recording medium 1333 may be a removable medium of any type, and may be a tape device, disc, or memory card. Of course, the recording medium 1333 may be a noncontact IC card or the like.

Also, the medium drive 1323 and the recording medium 1333 may be integrated together, and may be constituted by, for example, a non-transportable storage medium, such as a built-in hard disk drive or an SSD (Solid State Drive).

The external interface 1319 is constituted by, for example, a USB input/output terminal or the like, and is connected to the printer 1334 in the case of printing an image. Also, a drive 1331 is connected to the external interface 1319 as necessary, a removable medium 1332, such as a magnetic disk, an optical disc, or a magneto-optical disc, is loaded thereto as appropriate, and a computer program read out therefrom is installed into the flash ROM 1324 as necessary.

Furthermore, the external interface 1319 includes a network interface connected to a certain network, such as a LAN or the Internet. The controller 1321 is capable of, for example, reading out encoded data from the DRAM 1318 and supplying it from the external interface 1319 to another apparatus connected via a network, in accordance with an instruction provided from the operation unit 1322. Also, the controller 1321 is capable of obtaining, via the external interface 1319, encoded data or image data supplied from another apparatus via a network, and causing the DRAM 1318 to hold it or supplying it to the image signal processor 1314.

The camera 1300 described above includes the image decoding apparatus 500 serving as the decoder 1315. That is, the decoder 1315 appropriately decodes encoded data for which the selection of the I_PCM mode is controller in units of CUs, which are smaller than LCUs, as in the case of the image decoding apparatus 500. Accordingly, the decoder 1315 is capable of realizing a decrease in redundant processing for encoding and a decrease in redundant information included in encoded data. Accordingly, the decoder 1315 is capable of realizing enhanced encoding efficiency while suppressing a decrease in the efficiency of encoding processing.

Therefore, the camera 1300 is capable of, for example, realizing enhanced encoding efficiency of data while suppressing a decrease in the efficiency of encoding processing when generating image data generated by the CCD/CMOS 1312, encoded data of video data read out from the DRAM 1318 or the recording medium 1333, or encoded data of video data obtained via a network.

Also, the camera 1300 includes the image encoding apparatus 300 serving as the encoder 1341. The encoder 1341 controls the selection of the I_PCM mode in units of CUs, which are smaller than LCUs, as in the case of the image encoding apparatus 300. That is, the encoder 1341 is capable of further reducing redundant processing for encoding and is also capable of further reducing redundant information included in encoded data. Accordingly, the encoder 1341 is capable of enhancing encoding efficiency while suppressing a decrease in the efficiency of encoding processing.

Therefore, the camera 1300 is capable of enhancing encoding efficiency while suppressing a decrease in the efficiency of encoding processing, for example, when generating encoded data to be recorded on the DRAM 1318 or the recording medium 1333 or encoded data to be provided to another apparatus.

In addition, the decoding method of the image decoding apparatus 500 may be applied to decoding processing performed by the controller 1321. Likewise, the encoding method of the image encoding apparatus 300 may be applied to encoding processing performed by the controller 1321.

Also, the image data captured by the camera 1300 may be a moving image or a still image.

Of course, the image encoding apparatus 300 and the image decoding apparatus 500 can be applied to an apparatus or a system other than the above-described apparatuses.

The present technology can be applied to an image encoding apparatus and an image decoding apparatus which are used to, for example, receive image information (bit stream) compressed through an orthogonal transform such as the discrete cosine transform and by motion compensation via a network medium such as satellite broadcasting, cable TV, the Internet, or a mobile phone, or to process the image information on a storage medium such as an optical or magnetic disk or a flash memory, as in MPEG, H.26x, or the like.

In addition, the present technology may also provide the following configurations.

(1) An image processing apparatus including:
an encoding mode setter that sets, in units of coding units having a hierarchical structure, whether a non-compression mode is to be selected as an encoding mode for encoding image data, the non-compression mode being an encoding mode in which the image data is output as encoded data; and
an encoder that encodes the image data in units of the coding units in accordance with a mode set by the encoding mode setter.

(2) The image processing apparatus according to (1), further including:
a shift processing controller that performs control, on a coding unit for which the non-compression mode has been set by the encoding mode setter, to skip shift processing in which a bit precision for encoding or decoding is increased; and
a shift processor that performs the shift processing on a coding unit of the image data, the coding unit being controlled by the shift processing controller so as to undergo the shift processing.

(3) The image processing apparatus according to (1) or (2), further including:
a filter processing controller that performs control, on a coding unit for which the non-compression mode has been set by the encoding mode setter, to skip filter processing in which filtering is performed on a locally decoded image;
a filter coefficient calculator that calculates a filter coefficient for the filter processing by using image data corresponding to a coding unit which is controlled by the filter processing controller so as to undergo the filter processing; and
a filter processor that performs the filter processing in units of blocks, which are units of the filter processing, by using the filter coefficient calculated by the filter coefficient calculator.

(4) The image processing apparatus according to (3), wherein the filter processor performs the filter processing on only pixels which are controlled by the filter processing controller so as to undergo the filter processing, the pixels being included in a current block which is a target to be processed.

(5) The image processing apparatus according to (3) or (4), further including:
a filter identification information generator that generates filter identification information in units of the blocks, the filter identification information being flag information indicating whether the filter processing is to be performed.

(6) The image processing apparatus according to any of (3) to (5), wherein the filter processor performs adaptive loop filtering on the locally decoded image, the adaptive loop filtering being adaptive filter processing using classification processing.

(7) The image processing apparatus according to any of (1) to (6), wherein, in a case where an amount of code of encoded data, which is obtained by encoding the image data corresponding to a current coding unit as a target of encoding processing, is smaller than or equal to an amount of input data, which is a data amount of the image data corresponding to the current coding unit, the encoding mode setter sets an encoding mode of the current coding unit to be the non-compression mode.

(8) The image processing apparatus according to (7), further including:
an input data amount calculator that calculates the amount of input data,
wherein the encoding mode setter compares, regarding the current coding unit, the amount of input data calculated by the input data amount calculator with the amount of code.

(9) The image processing apparatus according to any of (1) to (8), further including:
an identification information generator that generates identification information in units of the coding units, the identification information indicating whether the non-compression mode has been set by the encoding mode setter.

(10) An image processing method for an image processing apparatus, including:
setting, with an encoding mode setter, in units of coding units having a hierarchical structure, whether a non-compression mode is to be selected as an encoding mode for encoding image data, the non-compression mode being an encoding mode in which the image data is output as encoded data; and
encoding, with an encoder, the image data in units of the coding units in accordance with a set mode.

(11) An image processing apparatus including:
an encoding mode determiner that determines, in units of coding units having a hierarchical structure, whether a non-compression mode has been selected as an encoding mode for encoding image data, the non-compression mode being an encoding mode in which the image data is output as encoded data; and
a decoder that decodes the encoded data in units of the coding units in accordance with a mode determined by the encoding mode determiner.

(12) The image processing apparatus according to (11), further including:
a shift processing controller that performs control, on a coding unit for which the encoding mode determiner has determined that the non-compression mode has been selected, to skip shift processing in which a bit precision for encoding or decoding is increased; and
a shift processor that performs the shift processing on a coding unit of the image data, the coding unit being controlled by the shift processing controller so as to undergo the shift processing.

(13) The image processing apparatus according to (11) or (12), further including:
a filter processing controller that performs control, on a coding unit for which the encoding mode determiner has determined that the non-compression mode has been selected, to skip filter processing in which filtering is performed on a locally decoded image; and
a filter processor that performs the filter processing on the image data in units of blocks, which are units of the filter processing,
wherein the filter processor performs the filter processing on only pixels which have been controlled by the filter processing controller so as to undergo the filter processing, the pixels being included in a current block which is a target to be processed.

(14) The image processing apparatus according to (13), wherein the filter processor performs adaptive loop filtering on the locally decoded image, the adaptive loop filtering being adaptive filter processing using classification processing.

(15) The image processing apparatus according to (13) or (14), wherein the filter processor performs the filter processing, in a case where filter identification information indicating whether or not the filter processing has been performed indicates that the filter processing has been performed on image data corresponding to the current block which is a target to be processed, only when control is performed by the filter processing controller so as to perform the filter processing on all pixels included in the current block.

(16) The image processing apparatus according to any of (11) to (15), wherein the encoding mode determiner determines whether the non-compression mode has been selected, on the basis of identification information indicating whether the non-compression mode has been selected in units of the coding units.

(17) An image processing method for an image processing apparatus, including:

determining, with an encoding mode determiner, in units of coding units having a hierarchical structure, whether a non-compression mode has been selected as an encoding mode for encoding image data, the non-compression mode being an encoding mode in which the image data is output as encoded data; and decoding, with a decoder, the encoded data in units of the coding units in accordance with a determined mode.

REFERENCE SIGNS LIST 300 image encoding apparatus
303 adaptive shift-to-left unit
307 lossless encoder
312 loop filter
313 adaptive shift-to-right unit
315 adaptive shift-to-left unit
320 rate controller
321 PCM encoder
331 NAL encoder
332 CU encoder
341 I_PCM_flag generator
342 PCM deciding unit
351 deblocking filter
352 pixel sorting unit
353 filter coefficient calculator
354 filtering unit
361 input data amount calculator
362 PCM determining unit
363 encoding controller
364 adaptive shift controller
365 filter controller
500 image decoding apparatus
502 lossless decoder
506 loop filter
507 adaptive shift-to-right unit
511 adaptive shift-to-left unit
516 PCM decoder
531 NAL decoder
532 CU decoder
541 I_PCM_flag buffer
542 PCM controller
551 deblocking filter
552 pixel sorting unit
553 filtering unit

The invention claimed is:

1. An image processing apparatus comprising:
a decoder configured to decode encoded data including a coding unit for which a non-compression mode has been set as an encoding mode for encoding image data, the coding unit being formed by recursively splitting a largest coding unit into smaller coding units as block partitioning, and the non-compression mode being an encoding mode in which the image data is output as encoded data; and
a filter processing controller configured to perform control, on the coding unit for which the non-compression mode has been set, to skip filter processing in which filtering is performed on a decoded image after a deblocking filter,
wherein the decoder and the filter processing controller are each implemented via at least one processor.

2. The image processing apparatus according to claim 1, wherein the filter processing controller is further configured to perform control to skip adaptive loop filtering on the decoded image, the adaptive loop filtering comprising adaptive filter processing using classification processing.

3. The image processing apparatus according to claim 1, further comprising:
a filter processor configured to perform the filter processing, in a case where filter identification information indicating whether or not the filter processing has been performed indicates that the filter processing has been performed on the decoded image data.

4. An image processing method, implemented via at least one processor, the method comprising:
decoding encoded data including a coding unit for which a non-compression mode has been set as an encoding mode for encoding image data, the coding unit being formed by recursively splitting a largest coding unit into smaller coding units as block partitioning, and the non-compression mode being an encoding mode in which the image data is output as encoded data; and
performing control, on the coding unit for which the non-compression mode has been set, to skip filter processing in which filtering is performed on a decoded image after a deblocking filter.

5. The image processing method according to claim 4, wherein the control is performed to skip adaptive loop filtering on the decoded image, the adaptive loop filtering comprising adaptive filter processing using classification processing.

6. The image processing method according to claim 4, wherein the filter processing is performed, in a case where filter identification information indicating whether or not the filter processing has been performed indicates that the filter processing has been performed on the decoded image data.

* * * * *